United States Patent
Kadono

(10) Patent No.: US 8,520,730 B2
(45) Date of Patent: Aug. 27, 2013

(54) PICTURE CODING METHOD AND PICTURE CODING APPARATUS

(75) Inventor: Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 573 days.

(21) Appl. No.: 12/745,135

(22) PCT Filed: Nov. 28, 2008

(86) PCT No.: PCT/JP2008/003530
§ 371 (c)(1), (2), (4) Date: May 27, 2010

(87) PCT Pub. No.: WO2009/069316
PCT Pub. Date: Jun. 4, 2009

(65) Prior Publication Data
US 2010/0303153 A1    Dec. 2, 2010

(30) Foreign Application Priority Data

| Nov. 28, 2007 | (JP) | 2007-308054 |
| Sep. 18, 2008 | (JP) | 2008-239815 |
| Sep. 29, 2008 | (JP) | 2008-250075 |

(51) Int. Cl.
*H04N 7/12* (2006.01)

(52) U.S. Cl.
USPC .................. 375/240.13; 386/345

(58) Field of Classification Search
None
See application file for complete search history.

(56) References Cited

U.S. PATENT DOCUMENTS

| 5,491,509 A | 2/1996 | Jeong et al. |
| 5,737,022 A | 4/1998 | Yamaguchi et al. |
| 5,742,729 A | 4/1998 | Ema et al. |
| 6,259,736 B1 * | 7/2001 | Chujoh et al. ........... 375/240.13 |
| 2001/0026677 A1 * | 10/2001 | Chen et al. ..................... 386/68 |

(Continued)

FOREIGN PATENT DOCUMENTS

| JP | 3-64190 | 3/1991 |
| JP | 3-136587 | 6/1991 |

(Continued)

OTHER PUBLICATIONS

International Search Report issued Mar. 3, 2009 in International (PCT) Application No. PCT/JP2008/003530.

(Continued)

*Primary Examiner* — Sath V Perungavoor
*Assistant Examiner* — Dakshesh Parikh
(74) *Attorney, Agent, or Firm* — Wenderoth, Lind & Ponack, L.L.P.

(57) ABSTRACT

A picture coding apparatus that reduces a computational complexity, improves a compression rate, and reduces frequency of stream transmission loss without interfering with pipelining and paralleling includes: a dividing unit that divides a picture into an I-slice and a P slice, each of the I-slice and P slice including blocks; and a coding unit that codes each slice per block so as to code temporally consecutive pictures, wherein the dividing unit changes a position of the I-slice in each of the temporally consecutive pictures so that positions of I-slices circulate in a to-be-determined number of pictures among the temporally consecutive pictures, and divides each of the temporally consecutive pictures so that a sum of the number of blocks included in the I-slice and the number of blocks included in one or more P slices between the I-slice and an I-slice subsequent to the I-slice becomes a predetermined value.

6 Claims, 57 Drawing Sheets

(56) References Cited

U.S. PATENT DOCUMENTS

| | | | |
|---|---|---|---|
| 2003/0039308 A1* | 2/2003 | Wu et al. | 375/240.12 |
| 2005/0008240 A1* | 1/2005 | Banerji et al. | 382/238 |
| 2007/0071094 A1* | 3/2007 | Takeda et al. | 375/240.04 |

FOREIGN PATENT DOCUMENTS

| | | |
|---|---|---|
| JP | 4-207780 | 7/1992 |
| JP | 6-217282 | 8/1994 |
| JP | 6-311502 | 11/1994 |
| JP | 7-59085 | 3/1995 |
| JP | 8-279978 | 10/1996 |
| JP | 11-220733 | 8/1999 |
| JP | 2005-12630 | 1/2005 |

OTHER PUBLICATIONS

ISO/IEC 13818-2, "Information Technology-Generic Coding of Moving Pictures and Associated Audio Information: Video", International Standard, Second Edition, Dec. 2000.

ISO/IEC 14496-2, "Information Technology-Coding of Audio-Visual Objects-Part 2: Visual", International Standard, Third Edition, Jun. 2004.

* cited by examiner

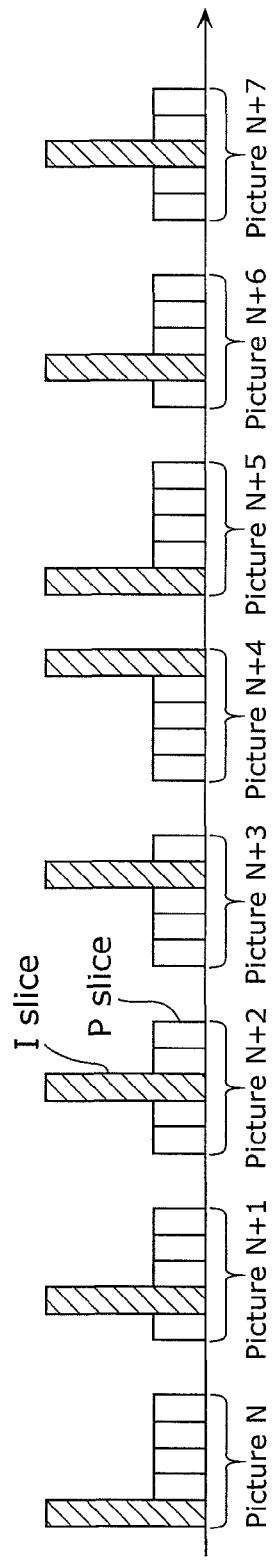
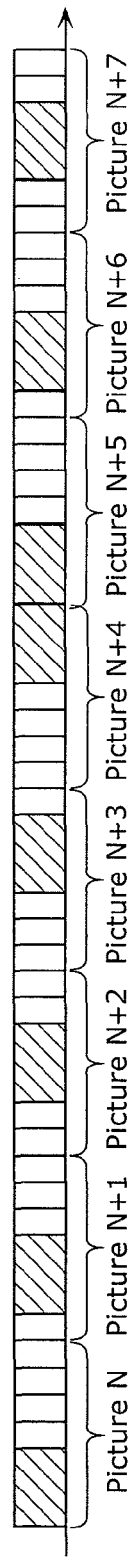
FIG. 9A
FIG. 9B

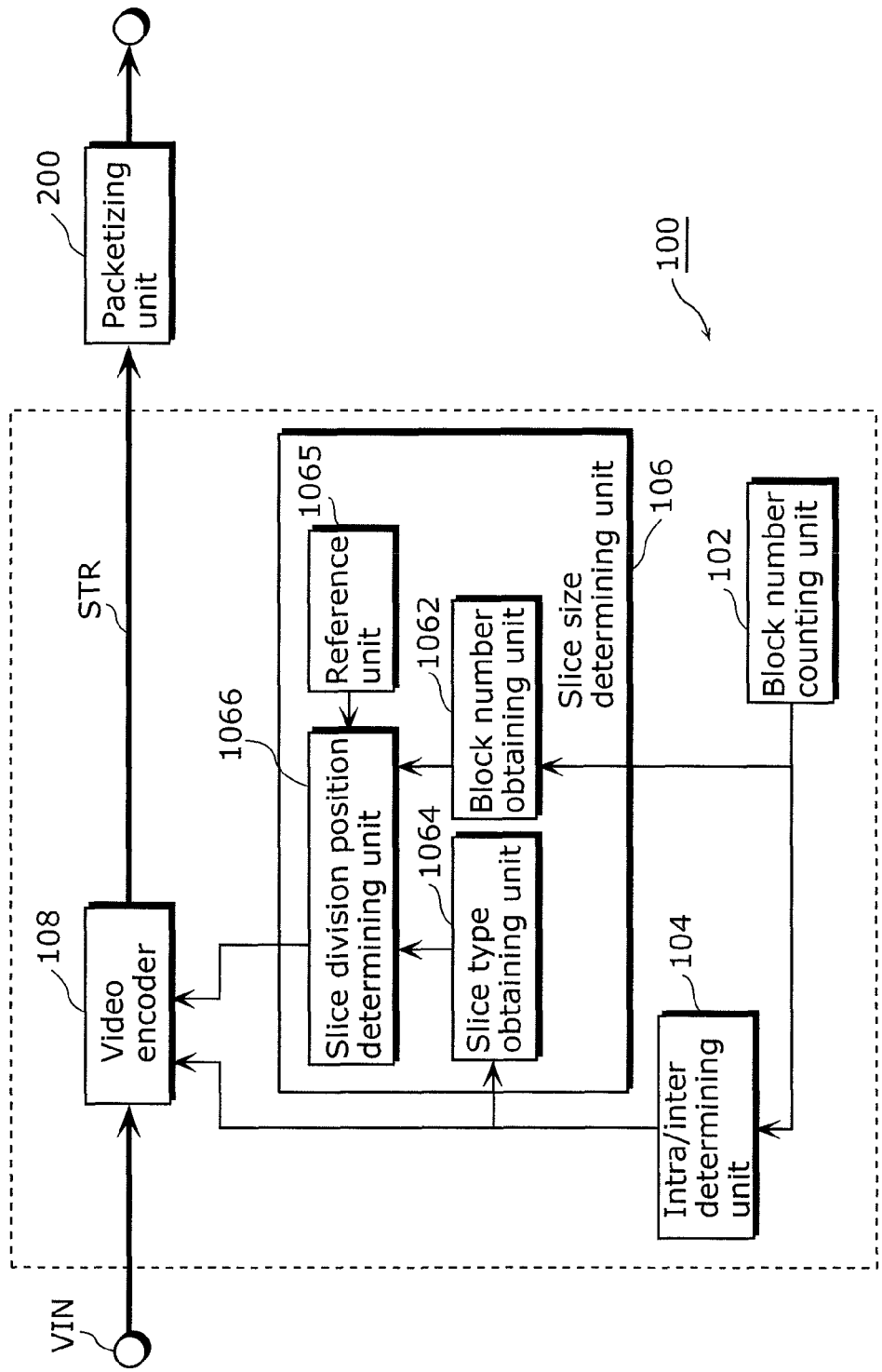

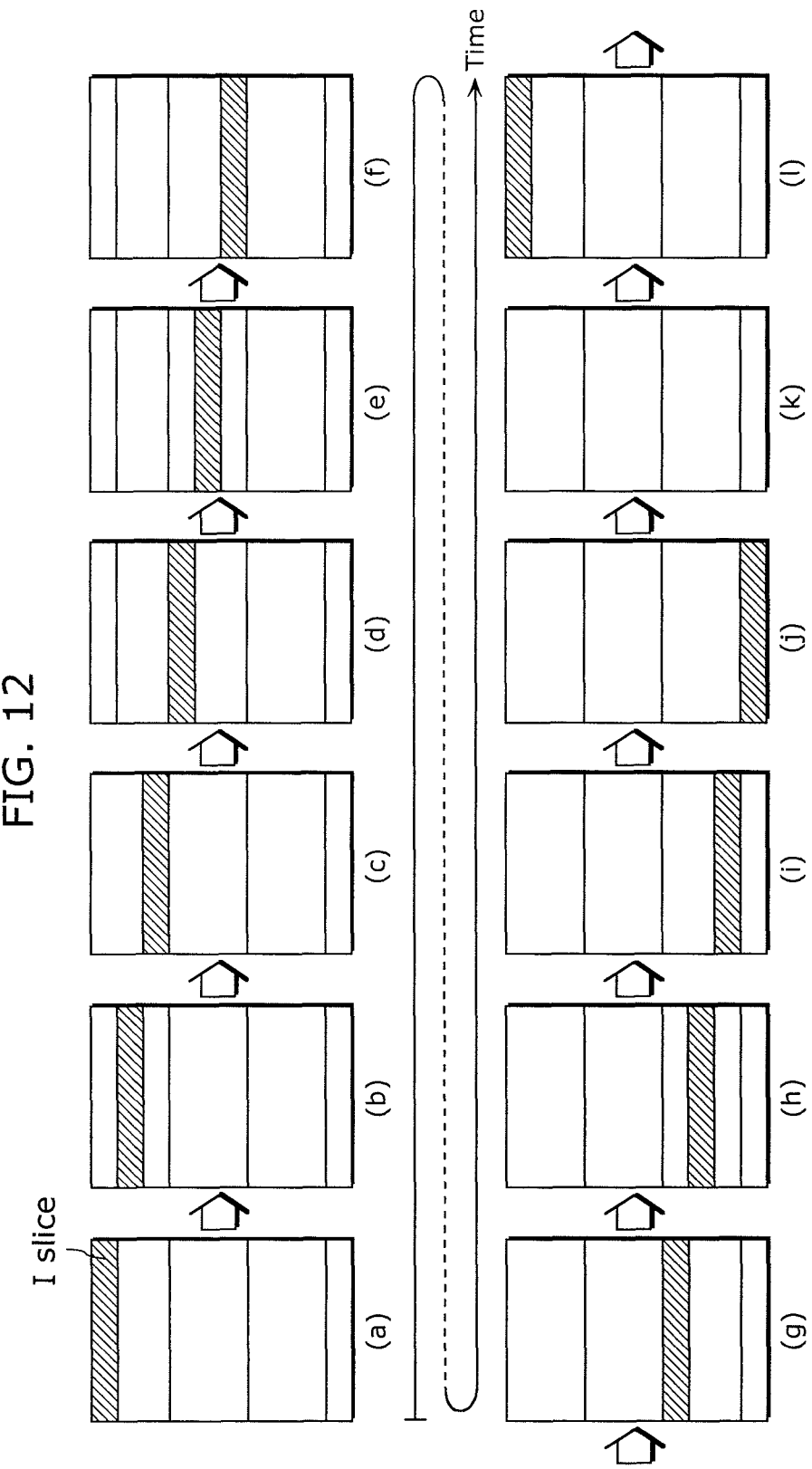

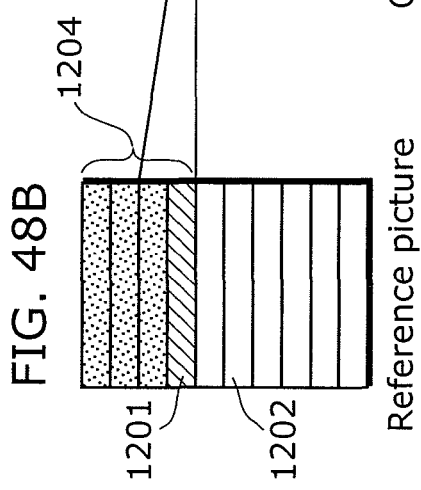
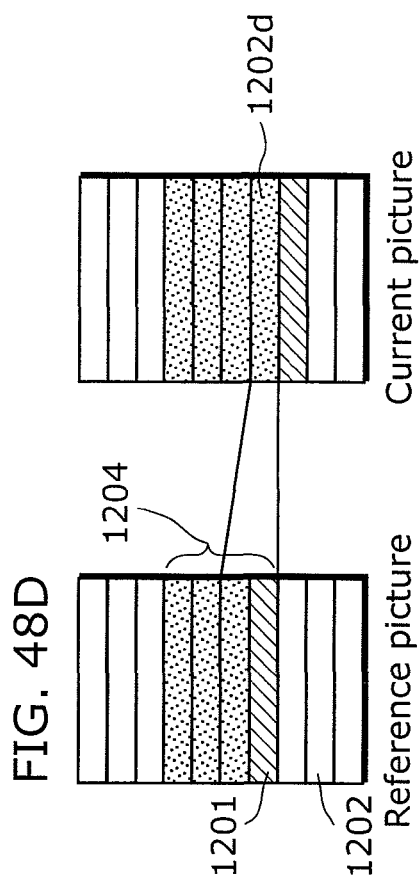
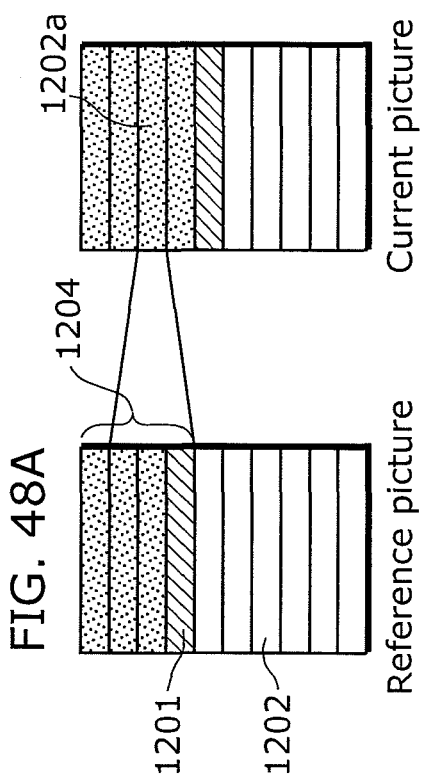
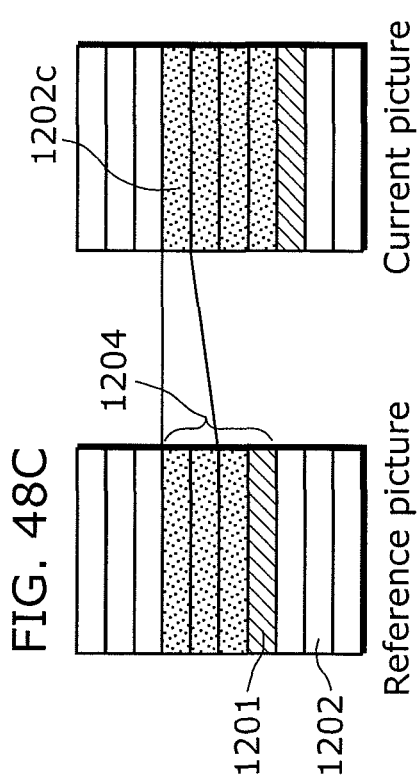

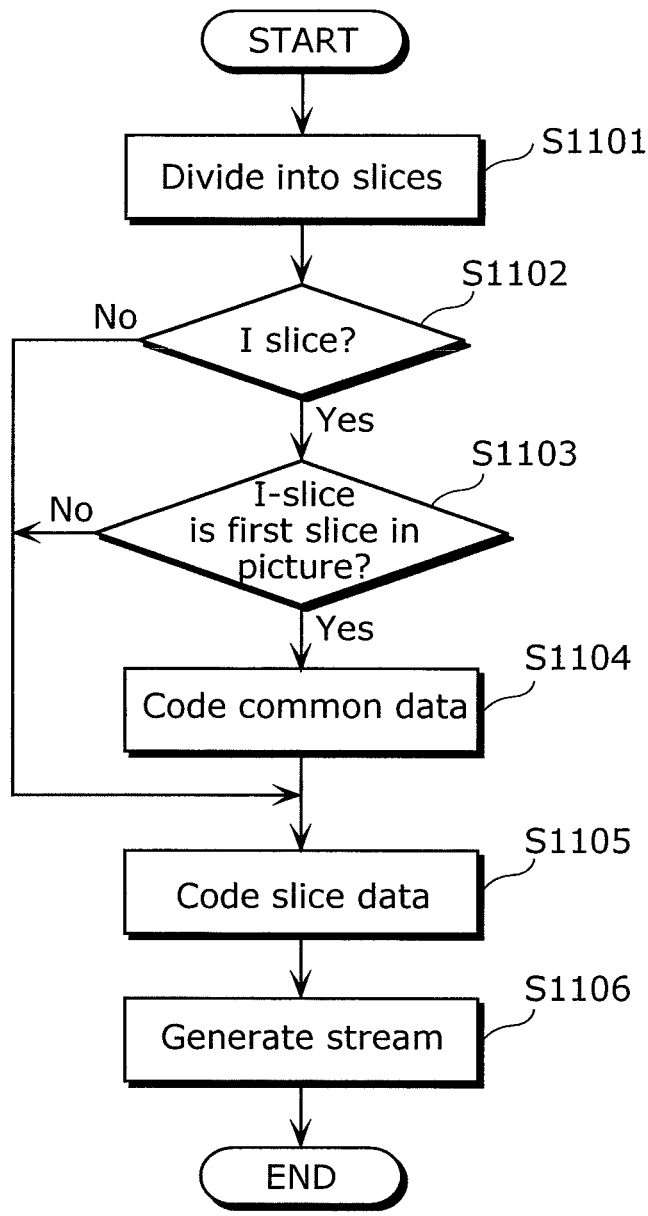

PICTURE CODING METHOD AND PICTURE CODING APPARATUS

TECHNICAL FIELD

The present invention relates to a picture coding method and a picture coding apparatus, and particularly to a picture coding method and a picture coding apparatus for dividing a picture signal into slices each including blocks, and coding, per block, each of the slices, in accordance with the Moving Picture Experts Group (MPEG)-4 standard or the ITU-T H.264 standard.

BACKGROUND ART

Recently, with the advent of the age of multimedia which handles audio, pictures and other pixel values in an integrated manner, conventional information media, such as newspapers, journals, TVs, radios, and telephones, through which information is carried to people, have come under the scope of multimedia. Generally, multimedia refers to a representation in which not only text but also graphics, audio, particularly pictures, and/or others are simultaneously associated with one another. The information for the above conventional information media must first be digitized before it can be handled as multimedia information.

However, the estimated amount of the multimedia information as digital data is only 1 or 2 bytes per character of text, but 64 Kbits per second of (telephone quality) audio, and 100 Mbits or higher per second of video (at current television receiver quality). It is therefore not practical to handle these massive amounts of the multimedia information in digital form. For example, video telephony service is available over Integrated Services Digital Network (ISDN) lines with a transmission speed of 64 Kbit/s to 1.5 Mbit/s, but video for a television and a camera cannot be sent as it is over the ISDN lines.

Data compression therefore becomes essential. Video telephony service, for example, is implemented using video compression techniques standardized in International Telecommunication Union, Telecommunication Standardization Sector (ITU-T) Recommendations H.261 and H.263. Using the data compression techniques defined in MPEG-1, picture information can be recorded together with audio information on a conventional audio compact disc (CD).

The Moving Picture Experts Group (MPEG) is an international standard for compressing moving picture signals, and has been standardized by the International Organization for Standardization and the International Electrotechnical Commission (ISO/IEC). MPEG-1 is a standard that enables transmission of a moving picture signal at 1.5 Mbps, that is, compression of information in a television signal approximately to a hundredth part of its original size. The moderate picture quality is targeted in MPEG-1 because the transmission speed for MPEG-1 moving pictures is limited to approximately 1.5 Mbit/s. Therefore, MPEG-2, which has been standardized to meet the demand for higher picture quality, enables transmission of a moving picture signal at 2 to 15 Mbit/s to satisfy television broadcast quality.

Furthermore, the working group (ISO/IEC JTC1/SC29/WG11) that has worked on the standardization of MPEG-1 and MPEG-2 has standardized MPEG-4 that achieved a compression rate higher than those of MPEG-1 and MPEG-2. MPEG-4 not only enables coding, decoding and operating on a per object basis, but also introduces a new capability required in the multimedia age. MPEG-4 achieved a compression rate higher than those of MPEG-1 and MPEG-2, and further enables coding, decoding and operating on a per object basis.

At first, MPEG-4 had been developed for the purpose of the standardization of a coding method for a smaller bit rate. Then, it was extended to a more versatile coding method including a method for coding even interlaced pictures at a higher bit rate. The MPEG-4 AVC and ITU-T H.264 have been standardized as a method for coding a picture at a higher compression rate through collaboration between the ISO/IEC and the ITU-T.

Here, a picture signal can be consecutive pictures (also referred to as frames or fields) that are groups of pixels at a same time. Since pixels have a strong correlation with adjacent pixels in each picture, pictures are compressed using the correlation in each picture. Furthermore, the consecutive pictures are compressed using a correlation between pixels in different pictures because the consecutive pictures have the strong correlation between pixels. Here, compression using a correlation between pixels in different pictures and a correlation between pixels in a picture is referred to as inter picture coding, whereas compression using the correlation between pixels in a picture without using the correlation between pixels in different pictures is referred to as intra-picture coding. The inter picture coding that uses the correlation between pictures can achieve a compression rate higher than that of the intra-picture coding.

Furthermore, in accordance with MPEG-1, MPEG-2, MPEG-4, MPEG-4 AVC, and H.264, each picture includes blocks (or macroblocks) that are groups of pixels in a two-dimensional rectangular area, and the inter picture coding and the intra-picture coding are switched per block.

On the other hand, with widespread high-speed network environment using Asymmetric Digital Subscriber Lines (ADSLs) and optical fibers, general households can transmit and receive information at a bit rate over several Mbit/s. Furthermore, it is expected that information can be transmitted and received at several tens of Mbit/s in the next few years. Thereby, the expectation is that with the picture coding technique, not only companies using dedicated lines but also general households will introduce video telephony service and teleconferencing systems that guarantee the television broadcast quality and HDTV broadcast quality.

When coded picture data, that is, a stream is transmitted through a network, a part of the stream may be lost due to network congestions and/or others. When the part of the stream is lost, the receiver cannot accurately decode a picture corresponding to the lost part of the stream. Furthermore, with the compression using the correlation between pixels in different pictures, the state where the receiver cannot accurately decode the picture is continued in the subsequent pictures. In other words, picture quality of the subsequent pictures is continuously deteriorated. Thus, defined is slices which are units of coding and each of which includes blocks. The slice is the minimum unit per which coding and decoding are independently possible. Even when a part of a stream is lost, pictures can be decoded per slice.

FIG. 1 illustrates a relationship between slices and blocks using a slice division method in accordance with MPEG-2. The picture (1 frame) in FIG. 1 includes blocks. Furthermore, blocks in a same row compose a slice, from among the blocks included in the picture. For example, the diagonally shaded slice is an I-slice, and the remaining slices are P slices. An I-slice contains only intra-coded blocks, and a P slice contains inter coded blocks or intra-coded blocks.

In accordance with H.264, generally, the I-slice is coded using only a correlation between pixels within the I-slice, whereas the P slice is coded using a correlation between pixels within the P slice and a correlation between pixels of different slices. Here, "of slices" means between a current slice and a slice other than the current slice, and may mean between slices of different pictures excluding the current slice in a picture. In other words, the I-slice is a slice that does not employ predictive coding using adjacent picture signals (signals outside the current slice), that is, a slice including only intra-macroblocks to be intra-coded. In contrast, the P slice is a slice that enhances compression efficiency with the predictive coding, that is, a slice including both inter macroblocks to be inter coded and the intra-macroblocks.

There are operational standards in accordance with which inclusion of both I-slices and P slices within a picture is not allowed, unlike H.264. Thus, the I-slices in Description even including specific P slices that are intentionally coded using only the correlation between pixels within a slice are collectively referred to as I-slices for convenience.

FIG. 2 illustrates a coding order of blocks included in a picture. The blocks in the picture in FIG. 1 are coded in an order indicated in FIG. 2, that is, an order from left to right and from up to down per slice in the picture to generate a coded stream.

Even when a decoder receives the stream of the slices without any loss in the transmission path and decodes the stream per slice, there is no guarantee that pixels that have been processed to be decoded cannot be accurately decoded. Even when the slices are not accurately decoded due to the transmission loss in a part of the stream in previous time, when the slices are intra-coded, the decoder can accurately decode pixels only with the intra-coded slices in the stream. However, when a picture subsequent to a lost part of stream is decoded, in the case where the slices of the picture are inter coded, the picture is decoded with reference to a picture immediate previously decoded. Thus, when a picture with deteriorated picture quality due to a loss in a part of the stream in previous time is referred to, the pixels of the picture cannot be accurately decoded.

Thus, there is a problem that, when a part of stream is lost and a picture subsequent to the lost part of the stream is inter coded, the picture cannot be accurately decoded, and recursively, pictures subsequent to the picture cannot be accurately decoded.

Accordingly, a method to be described hereinafter prevents recursive occurrence of deteriorated picture quality of pictures.

FIG. 3 illustrates an example of divided slices in pictures that are temporally consecutive. Here, the diagonally shaded slices are I-slices, and the remaining slices are P slices as in FIG. 1. Slices are on a per row basis. Furthermore, (a) to (l) in FIG. 3 are the pictures that are temporally consecutive. Furthermore, in time order, (a) in FIG. 3 is the first picture, and (l) in FIG. 3 is the last picture. In FIG. 3, an I-slice is moved down one row in the subsequent picture in time order. When the I-slice is moved to the lowest row, it comes back to the highest row (from (j) to (k) in FIG. 3).

Each picture includes an I-slice that is resilient to loss in a part of a stream, and P slices that are not resilient to loss in a part of the stream but include inter coded slices each having a higher compression rate. Here, the positions of I-slices circulate within pictures in time order. Even when a part of a stream is lost at some point in time and picture quality of a P slice is deteriorated, in the case where a slice in a position where the P slice corresponding to the lost stream becomes an I-slice in the subsequent picture in time order, pictures subsequent to the picture including the I-slice are accurately decoded. In other words, a stream can be restored from the deteriorated picture quality. Thus, the picture quality of subsequent pictures can be prevented from being continuously deteriorated.

Next, a picture coding apparatus 800 that prevents the continuation of deteriorated picture quality in FIG. 3 will be described.

FIG. 4 illustrates a block diagram of a configuration of the picture coding apparatus 800 using a slice division method in accordance with MPEG-2.

The picture coding apparatus 800 includes a block number counting unit 802, an intra/inter determining unit 804, a slice determining unit 806, and a video encoder 808.

The block number counting unit 802 counts the number of blocks in a picture to be coded by the video encoder 808. Furthermore, the block number counting unit 802 notifies the intra/inter determining unit 804 and the slice determining unit 806 of a position of a block to be coded by the video encoder 808, in the picture.

The intra/inter determining unit 804 determines whether a slice, in the picture, to be coded by the video encoder 808 is an I-slice or a P slice, from the position of the block notified by the block number counting unit 802. The intra/inter determining unit 804 notifies the video encoder 808 of the determined slice type (I-slice or P slice).

The slice determining unit 806 includes a block position obtaining unit 8062 and a slice boundary determining unit 8066.

The slice determining unit 806 determines, from the position of the block notified by the block number counting unit 802, whether or not the notified block is at a slice boundary, that is, the notified block is the last block in the rows each composed by blocks corresponding to a slice. In the slice determining unit 806, the block position obtaining unit 8062 obtains the position of the block notified by the block number counting unit 802, and the slice boundary determining unit 8066 determines whether or not the notified block is a last block in a slice. The slice boundary determining unit 8066 notifies the video encoder 808 of information of the determined position of the block (whether the block is a last block in a slice).

The video encoder 808 codes an input picture VIN per block using a coding method available by a corresponding slice (intra-picture coding method or inter picture coding method), based on the slice boundary (on a per slice basis) notified by the slice boundary determining unit 8066 in the slice determining unit 806, and on the slice type notified by the intra/inter determining unit 804. The video encoder 808 provides the coded input picture VIN to a packetizing unit 820 as a stream STR.

Since the slices in accordance with MPEG-2 are used as described hereinbefore, the unit of slices in a picture to be coded by the video encoder 808 is based on a unit of rows each including blocks included in the picture.

The packetizing unit 820 converts the stream STR into a format appropriate for its transmission through a network.

FIG. 5 illustrates an example of a relationship between slices and blocks using a slice division method in accordance with MPEG-4. Although slices can be composed on a row unit basis as MPEG-2 in FIG. 1, slices are often composed so that the number of bits obtained by coding slices becomes constant. Thus, the shape of each slice is not limited to a rectangle as illustrated in FIG. 1. Furthermore, the number of blocks included in each slice is variable, depending on an image pattern indicated by an input picture signal.

Here, a picture (1 frame) in FIG. 5 is composed of blocks. Furthermore, from among blocks included in the picture, blocks enclosed by a thick line compose a slice. For example, blocks included in diagonally shaded blocks and enclosed by a thick line compose an I-slice, whereas the rest of blocks simply enclosed by thick lines compose P slices.

Furthermore, the diagonally shaded blocks are indicative of blocks to be intra-coded. FIG. 5 indicates the example that the diagonally shaded positions of the blocks to be intra-coded do not need to match the unit of slices in accordance with MPEG-4.

FIG. 6 illustrates an example of divided slices in pictures that are temporally consecutive. The diagonally shaded blocks compose I-slices, and are blocks to be intra-coded. The rest of blocks enclosed by thick lines compose P slices. Furthermore, (a) to (l) in FIG. 6 are pictures that are temporally consecutive. As illustrated in FIG. 3, each picture includes an I-slice that is resilient to loss in a part of a stream, and P slices that are not resilient to loss in a part of the stream but include inter coded blocks each having a higher compression rate. Here, the positions of slices to be intra-coded and including an I-slice circulate within the pictures in time order. Thus, deteriorated picture quality can be prevented from being recursively continued in the subsequent pictures.

Next, a picture coding apparatus 900 that prevents the continuation of deteriorated picture quality in FIG. 6 will be described.

FIG. 7 illustrates a block diagram of a configuration of a picture coding apparatus apparatus 900 using the slice division method in accordance with MPEG-4.

The picture coding apparatus 900 includes the block number counting unit 802, the intra/inter determining unit 804, a slice size determining unit 906, and a video encoder 908. The units included in the block diagram of the picture coding apparatus in accordance with MPEG-2 in FIG. 4 are numbered by the same numerals in FIG. 7 when the units operate in the same manners, and thus the descriptions in FIG. 7 are omitted hereinafter.

The video encoder 908 codes the input picture VIN per block using an available coding method (intra-picture coding method or inter picture coding method), based on the slice boundary (on a per slice basis) notified by the slice size determining unit 906 and the slice type notified by the intra/inter determining unit 804. The video encoder 908 provides the coded input picture VIN to the packetizing unit 820 as a stream STR, and simultaneously, notifies the slice size determining unit 906 of the coded number of bits.

The slice size determining unit 906 includes a slice boundary determining unit 9066 and a coded bit number counting unit 9068. In the slice size determining unit 906, the coded bit number counting unit 9068 obtains the number of bits notified by the video encoder 908, and the slice boundary determining unit 9066 determines whether or not a block coded by the video encoder 908 indicates is a last block in a slice, based on the notified number of bits.

The coded bit number counting unit 9068 notifies the slice boundary determining unit 9066 of the number of bits notified by the video encoder 908 or information obtained when the notified number of bits becomes a predetermined number of bits.

The slice boundary determining unit 9066 determines, based on the information of the number of bits notified by the coded bit number counting unit 9068, whether or not a current block is the last block in a slice, that is, a last block in the slice. The slice boundary determining unit 9066 notifies the video encoder 908 of a result of the determination indicating that the block is at the slice boundary.

Although the diagonally shaded positions of blocks to be intra-coded move from the top to the bottom per picture as illustrated in FIGS. 5 and 6, the positions do not match the unit of slices.

Dividing a picture into slices is effective at preventing the picture quality from being deteriorated due to loss in a part of a stream in a network.

Hereinafter, the number of bits when a stream is transmitted per slice through a network will be described using an example.

FIG. 8 illustrates an example of divided slices in pictures that are temporally consecutive, and FIGS. 9A and 9B illustrate examples of number of bits obtained by coding each slice in time order. More specifically, FIGS. 9A and 9B illustrate the examples of the number of bits obtained by coding each slice in time order, when the stream is transmitted per slice through a network as illustrated in FIG. 8.

For example, each picture is composed of 5 slices, and includes an I-slice and 4 P slices, as illustrated in FIG. 8.

The I-slice has a larger number of bits, generally speaking, approximately several times to ten times larger than those of the P slices. FIG. 9A illustrates time on a horizontal axis, and the sizes of the number of bits obtained by coding slices on a vertical axis. The slices are included in each picture and coded in an order from the top to the bottom in each of the pictures. As seen from FIGS. 8 and 9A, the I-slices included in the pictures are positioned from the top to the bottom in time order, that is, cyclically circulate.

Furthermore, FIG. 9B illustrates that the pictures that are temporally consecutive are coded and the coded pictures are transmitted at a constant bit rate in coding order. Here, in FIG. 9B, the width (length) in the horizontal direction shows the size of the number of bits, representing the time necessary for transmitting data corresponding to the slices. Since each picture includes the same number of I-slices, the number of bits per picture is almost the same.

Non Patent Reference 1: MPEG-2 standard: ISO/IEC 13818-2, "Information Technology-Generic Coding Of Moving Pictures And Associated Audio Information: Video", International Standard, Second Edition, December 2000

Non Patent Reference 2: MPEG-4 standard: ISO/IEC 14496-2, "Information Technology-Coding Of Audio-Visual Objects-Part 2: Visual", International Standard, Third Edition, July 2004

SUMMARY OF THE INVENTION

Problems that Invention is to Solve

In order to reduce the number of bits of the I-slice whose number of bits is larger, the number of macroblocks included in the I-slice needs to be reduced. However, there is the following problem that the number of slices increases per picture, simply with the reduced number of blocks included in a slice.

1) Resetting the coding of slices needs a large amount of processing. This poses a problem, in particular, in coding processes where variables frequently need to be reset in the first slices, as the arithmetic coding employed in H.264 and using a significantly higher compression rate.

2) The coded amount of a slice header included in a picture (common data necessary for decoding macroblocks included in a slice) increases, and thus compression efficiency decreases. This poses a problem, in particular, when slices are coded at a lower bit rate.

3) When pictures are coded in hardware, since resetting per slice is necessary, pipeline processing for coding per block is also reset. Thus, the pipeline processing is frequently suspended.

Furthermore, when each picture is divided by the number of slices that are in accordance with the aforementioned MPEG-2 and MPEG-4, the following problem arises.

1) When slices in accordance with MPEG-2 are used, the restriction that a slice should be composed of blocks in one row within a picture cannot be basically altered.

Furthermore, uniquely stretching the idea of MPEG-2, blocks in k rows are assumed to be extended as a slice in order to reduce the number of slices per picture. Since the size of all slices becomes identical, the size of the I-slice becomes larger. In other words, the number of blocks that compose the I-slice increases. Putting it differently, the number of bits of the I-slice particularly increases. The I-slice is a slice to which only intra-picture coding is performed and has the number of bits larger than that by the inter picture coding. Considering that decoding is performed per slice, a part of the stream corresponding to the I-slice is frequently lost, and prevention of deteriorated picture quality from being continued using the I-slice will not effectively work.

2) When slices in accordance with MPEG-4 are used, each picture is divided per slice so that the number of bits becomes constant. However, the slice boundary is determined by the number of bits of an actually coded block. Until the blocks are coded, a position of the slice boundary cannot be determined. Thus, a picture coding apparatus having a configuration for high-speed parallel processing per slice cannot be achieved, resulting in a picture coding apparatus having a configuration for low-speed sequential coding per block.

Furthermore, in order to implement coding per block in the pipeline processing, at the time when the current block has been coded and slice division is to be determined, blocks subsequent to the current block (blocks that should be included in the subsequent slice) have already been coded in the pipeline processing. Thus, redo of the pipeline processing that starts from coding the subsequent blocks becomes necessary, and thus the coding is not suitable for the pipeline processing.

Furthermore, when the same number of I-slices are included in each picture as illustrated in FIG. 9A, pictures that are temporally consecutive are coded. When the coded pictures are transmitted through a network in coding order, two I-slices included in a picture N+4 and a picture N+5 are successively transmitted.

The coding is controlled by estimating the number of bits of an I-slice or a P slice to be coded, based on the number of bits of an I-slice or a P slice that has been immediate previously coded. However, since difficulty lies in the estimation in the following cases, controlling the average number of bits to be constant for a short period of time is also difficult.

1) When a position of a slice to be predicted in a picture significantly differs from that of the slice immediate previously coded, in particular, when the positions are in the lowest row and in the highest row within the picture.

2) When statistical features in each picture and between pictures are different from each other, in an image where an image pattern significantly differs depending on a position of the representation in the picture or in moving pictures whose motion are larger.

In the cases of 1) and 2), ratios of the required number of bits between a P slice and an I-slice for improving picture quality in coding significantly differ, depending on a position to be coded in a picture or on a unit of pictures to be coded. Thus, when I-slices having the larger number of bits as in the picture N+4 and the picture N+5 in FIG. 9B are successively coded, it is difficult to control the coding so that the number of bits become constant. Furthermore, the number of bits cannot be successfully controlled to be desired number of bits. Thus, there are cases where the number of bits cannot be constant, and where picture quality significantly deteriorates when the number of bits is forcedly made constant.

Thus, the present invention has been conceived in view of the problems, and has an object of implementing a picture coding method and a picture coding apparatus for reducing a computational complexity and improving a compression rate, while reducing the frequency of stream transmission loss, without interfering with the pipeline processing or the parallel processing.

Means to Solve the Problems

In order to solve the problems, the picture coding apparatus according to an aspect of the present invention is a picture coding apparatus that divides a picture signal into slices each including blocks, and codes, per block, each of the slices, and includes: a dividing unit configured to divide a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and a coding unit configured to code each of the slices per block so as to code pictures that are temporally consecutive, each of the pictures being the picture, wherein the dividing unit is configured to change a position of the I-slice in each of the temporally consecutive pictures so that positions of I-slices each of which is the I-slice circulate in a to-be-determined number of pictures among the temporally consecutive pictures, and to divide each of the temporally consecutive pictures so that a sum of the number of blocks included in the I-slice and the number of blocks included in one or more P slices that are between the I-slice and an I-slice subsequent to the I-slice becomes a predetermined value, each of the one or more P slices being the P slice.

With the configuration, even when a part of a stream is lost at some point in time and the picture quality of a P slice is deteriorated, in the case where a slice corresponding to the P slice where the stream is previously lost becomes an I-slice in the subsequent picture in time order, pictures subsequent to the picture including the I-slice can be accurately decoded and the endless continuation of deterioration in the picture quality can be prevented. Even when there are differences in the sizes of number of bits between the I-slices and the P slices, the variations of the number of bits in the I-slices having the larger number of bits can be made cyclical. In other words, since the I-slices having the differences in the sizes of number of bits can be prevented from being successively transmitted through a network, the number of bits for network transmission can be averaged. Thus, the picture coding method and the picture coding apparatus for reducing the computational complexity and improving the compression rate can be implemented, while reducing the frequency of the stream transmission loss without interfering with the pipelining and paralleling.

Furthermore, the dividing unit may be configured to divide the picture into the I-slice including M blocks, and the one or more P slices each of which includes N blocks and which exclude a P slice that is in a specific position within the picture, M being an integer value equal to or larger than zero, N being a positive integer value, and M<N With this configuration, since the number of slices in a picture can be reduced with the smaller number of blocks in an I-slice and the larger number of blocks in a P slice, the computational complexity can be reduced and the compression rate can be improved overall in the pictures.

Furthermore, the dividing unit may be configured to divide the picture into the I-slice and the one or more P slices so that the position of the I-slice is repeatedly moved from an edge of one of the pictures to an other edge of an other one of the pictures, for each group of a predetermined number of pictures in the temporally consecutive pictures, and the coding unit may include: a coded data generating unit configured to code (i) the I-slice using a correlation between pixels in the I-slice and (ii) each of the one or more P slices using a correlation between pixels in the slices or a correlation between pixels in the different slices and a pixel of an other corresponding one of the one or more P slices to generate coded data of the temporally consecutive pictures; and a stream generating unit configured to generate a stream including common data referred to by the temporally consecutive pictures and the coded data of the temporally consecutive pictures, and the stream generating unit may be configured to arrange the common data immediately prior to a part of the coded data obtained by coding one of the temporally consecutive pictures at the edge of which the I-slice is located.

With this configuration, when a picture decoding apparatus performs the halfway reproduction, the area to be accurately displayed increases from an edge to an other edge of each of the pictures by arranging common data referred to by the pictures, immediately prior to the picture including the I-slice at the edge. Since the display method is the same as scrolling a screen, and similar to the display method seen often on a daily basis, the viewer hardly feels it unconformable. Thus, a moving picture stream that is displayed as moving pictures that the viewer hardly feels unconformable can be generated during the halfway reproduction, with the picture coding method according to an implementation of the present invention.

In order to solve the problems, the picture coding apparatus according to an aspect of the present invention is a picture coding apparatus that divides a picture signal into slices each including blocks, and codes, per block, each of the slices, and includes: a dividing unit configured to divide a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and a coding unit configured to code each of the slices per block so as to code pictures that are temporally consecutive, each of the pictures being the picture, wherein the dividing unit is configured to change a position of the I-slice in each of the temporally consecutive pictures so that positions of I-slices each of which is the I-slice circulate in a to-be-determined number of pictures among the temporally consecutive pictures, and to divide each of the temporally consecutive pictures into the I-slice including M blocks, and one or more P slices each of which includes N blocks and which exclude a P slice that is in a specific position within the picture, M being an integer value equal to or larger than zero, N being a positive integer value, M<N, and each of the one or more P slices being the P slice.

With this configuration, since the number of slices in a picture can be reduced with the smaller number of blocks in an I-slice and the larger number of blocks in a P slice, the computational complexity can be reduced and the compression rate can be improved overall in the pictures. Furthermore, since a picture can be divided by the number of blocks that is defined for each of slices, the pipelining and paralleling are not interfered with. Furthermore, even when a part of a stream is lost at some point in time and the picture quality of a P slice is deteriorated, in the case where a slice corresponding to the P slice where the stream is previously lost becomes an I-slice in the subsequent picture in time order, the pictures can be accurately decoded and the endless continuation of deterioration in the picture quality can be prevented. Thus, the picture coding method and the picture coding apparatus for reducing the computational complexity and improving the compression rate can be implemented, while reducing the frequency of the stream transmission loss without interfering with the pipelining and paralleling.

Furthermore, the dividing unit may include: a block number counting unit configured to count the number of blocks to be coded; and an intra/inter determining unit configured to determine a slice type of a current slice, based on the number of the blocks counted by the block number counting unit, the dividing unit may be configured to divide each of the temporally consecutive pictures, by determining a division position between the I-slice and the one or more P slices based on the slice type determined by the intra/inter determining unit and the number of blocks counted by the block number counting unit.

With this configuration, according to the slice type of a current slice determined by the intra/inter determining unit, the number of blocks included in the current slice can be determined and the pictures can be divided according to the determined number of blocks.

Furthermore, the dividing unit may be configured to divide each of the temporally consecutive pictures into slices including a P slice that is immediately prior to the I-slice in coding order of blocks in each of the temporally consecutive pictures as a P slice having J blocks and being in the specific position, J being a positive integer value, and 3<N.

Furthermore, the dividing unit may be configured to divide each of the temporally consecutive pictures into slices including a P slice that is immediately prior to the I-slice in coding order of blocks in each of the temporally consecutive pictures as a P slice having J blocks and being in the specific position, 3 being a positive integer value, and 3<N.

Furthermore, the dividing unit may be configured to divide each of the temporally consecutive pictures into slices including a P slice that is in a lowest row in each of the temporally consecutive pictures as a P slice having K blocks and being in the specific position, K being a positive integer value, and K<N.

With the configuration, since the number of blocks included in a P slice in another position within a picture can be set to a constant value N by changing the size of the P slice in the specific position within the picture, the number of slices in the picture can be reduced.

Furthermore, the dividing unit may be configured to divide each of the temporally consecutive pictures into slices including the I-slice as a slice having M blocks having equal to or less than half blocks included in a row of the picture, M being an integer value equal to or larger than zero.

Thereby, while the number of bits when pictures are coded can be reduced with the smaller number of blocks in an I-slice, the total number of slices in the pictures can be reduced.

Furthermore, the dividing unit may be configured to divide each of the temporally consecutive pictures into slices including the I-slice as a slice having M blocks equal to blocks included in a row of the picture, M being an integer value equal to or larger than zero.

Thereby, not only the number of bits when pictures are coded can be reduced using I-slices each containing blocks that are of the smallest block size facilitating the coding on a per row unit basis, but also the total number of slices in the pictures can be reduced.

Furthermore, the dividing unit may be configured to divide at least one of the to-be-determined number of pictures from among the temporally consecutive pictures, into the I-slice whose block number is zero and the one or more P slices.

Thereby, the bit position of a coded I-slice can be adjusted in a stream. For example, when there are differences in the sizes of the number of bits between an I-slice and a P slice and, in particular, when the number of bits of the I-slice is larger than that of the P slice, the frequency of coding I-slices can be reduced with increase of the number of P slices between the I-slices. Thus, the transmission bit rate in a network can be reduced.

Furthermore, the dividing unit may be configured to divide a picture subsequent to a picture having the I-slice in a lowest row in the picture, into the one or more P slices having no I-slice. In other words, the dividing unit may divide a picture subsequent to a picture having an I-slice in the lowest row in the picture, into the I-slice whose block number is zero and P slices.

Thereby, the bit positions of coded I-slices can be almost at regular intervals in a stream. For example, even when the number of bits between an I-slice and a P slice are different, the differences are cyclical ones. Thus, a loss in the stream can be reduced in the network.

Furthermore, the dividing unit may be configured to divide each of the temporally consecutive pictures so that a sum of the number of blocks included in the I-slice and the number of blocks included in the one or more P slices that are between the I-slice and an I-slice subsequent to the I-slice becomes a predetermined value.

Thereby, even when there are differences in the sizes of the number of bits between the I-slices and the P slices, the variations of the number of bits in the I-slices can be made cyclical. In other words, since the I-slices having differences in the sizes of the number of bits can be prevented from being successively transmitted through a network, the number of bits for network transmission can be averaged.

Furthermore, the picture coding method according to an aspect of the present invention is a picture coding method of dividing a picture signal into slices each including blocks, and coding, per block, each of the slices, and includes: dividing a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and coding each of the slices per block so as to code pictures that are temporally consecutive, each of the pictures being the picture, wherein a position of the I-slice is changed in each of the temporally consecutive pictures so that positions of I-slices each of which is the I-slice circulate in a to-be-determined number of pictures among the temporally consecutive pictures, and each of the temporally consecutive pictures is divided into the I-slice including M blocks, and one or more P slices each of which includes N blocks and which exclude a P slice that is in a specific position within the picture, M being an integer value equal to or larger than zero, N being a positive integer value, M<N, and each of the one or more P slices being the P slice.

In order to solve the problems, the picture coding apparatus according to an aspect of the present invention is a picture coding apparatus that divides a picture signal into slices each including blocks, and codes, per block, each of the slices, and includes: a dividing unit configured to divide a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and a coding unit configured to code each of the slices per block so as to code pictures that are temporally consecutive, each of the pictures being the picture, wherein the dividing unit is configured to change a position of the I-slice in each of the temporally consecutive pictures so that positions of I-slices each of which is the I-slice circulate in a to-be-determined number of pictures among the temporally consecutive pictures, and to divide each of the temporally consecutive pictures so that a sum of the number of blocks included in the I-slice and the number of blocks included in one or more P slices that are between the I-slice and an I-slice subsequent to the I-slice becomes a predetermined value, each of the one or more P slices being the P slice.

With the configuration, the numbers of blocks included in each of P slices between I-slices can be made identical to each other. In particular, when the numbers of blocks included in P slices become constant, the numbers of I-slices and P slices that are included in a predetermined number of slices that are consecutive with respect to a slice position can be fixed, without any distinction between the I-slices and P slices. Thus, each time a slice is coded, coding control of making the number of bits of the predetermined number of slices constant is performed, so as to easily make an average number of bits constant without any significant deterioration in the picture quality, even when moving pictures to be coded include a fast motion or when statistics of the moving pictures largely vary due to change in scenes.

Furthermore, the dividing unit may be configured to divide at least one of the to-be-determined number of pictures among the temporally consecutive pictures, into P slices having no I-slice. In other words, the dividing unit may be configured to divide at least one of the to-be-determined number of pictures from among the temporally consecutive pictures, into the I-slice whose block number is zero and the one or more P slices.

Furthermore, the picture coding method according to an aspect of the present invention is a picture coding method of dividing a picture signal into slices each including blocks, and coding, per block, each of the slices, and includes: dividing a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and coding each of the slices per block so as to code pictures that are temporally consecutive, each of the pictures being the picture, wherein a position of the I-slice is changed in each of the temporally consecutive pictures so that positions of I-slices each of which is the I-slice circulate in a to-be-determined number of pictures among the temporally consecutive pictures, and each of the temporally consecutive pictures is divided so that a sum of the number of blocks included in the I-slice and the number of blocks included in one or more P slices that are between the I-slice and an I-slice subsequent to the I-slice becomes a predetermined value, each of the one or more P slices being the P slice.

The present invention can be implemented not only as an apparatus, but also as an integrated circuit including processing units included in such an apparatus, as a method using the processing units included in the apparatus as steps, as a program causing a computer to execute such steps, and as information, data, or a signal indicating the program. The program, information, data, and signal may be distributed through recording media such as a CD-ROM, or through communication media such as the Internet.

Effects of the Invention

According to an implementation of the present invention, the picture coding method and the picture coding apparatus for reducing the computational complexity and improving the compression rate can be implemented, while reducing the frequency of the stream transmission loss without interfering with the pipelining and paralleling.

More specifically, the picture coding method and the picture coding apparatus according to an implementation of the present invention allow for dividing pictures into slices so that the size of an I-slice (the number of blocks) can be smaller than that of P slice (the number of blocks). Thereby, there are advantages that (1) the number of slices in a picture can be reduced and increase in the computational complexity and decrease in a compression rate can be prevented, and (2) the number of bits of the I-slices can be smaller and the I-slices that are important for preventing the continuation of deterioration in the picture quality can be less subject to the loss in a part of a stream.

BRIEF DESCRIPTION OF DRAWINGS

FIG. 9A illustrates an example of the number of bits obtained by coding each slice in time order.

FIG. 9B illustrates an example of the number of bits obtained by coding each slice in time order.

FIG. 10 illustrates a block diagram of a configuration of a picture coding apparatus using a slice division method in accordance with an embodiment of the present invention.

FIG. 12 illustrates an example of divided slices in pictures that are temporally consecutive according to Embodiment 1 in the present invention.

FIG. 48A illustrates a relationship between a reference picture and a current picture according to Embodiment 9 in the present invention.

FIG. 48B illustrates a relationship between a reference picture and a current picture according to Embodiment 9 in the present invention.

FIG. 48C illustrates a relationship between a reference picture and a current picture when a GOP starts from a picture in which an I-slice is not at the top.

FIG. 48D illustrates a relationship between a reference picture and a current picture when a GOP starts from a picture in which an I-slice is not at the top.

FIG. 49 shows a flowchart of slice coding operations by a picture coding apparatus according to Embodiment 9 in the present invention.

Figure 1:
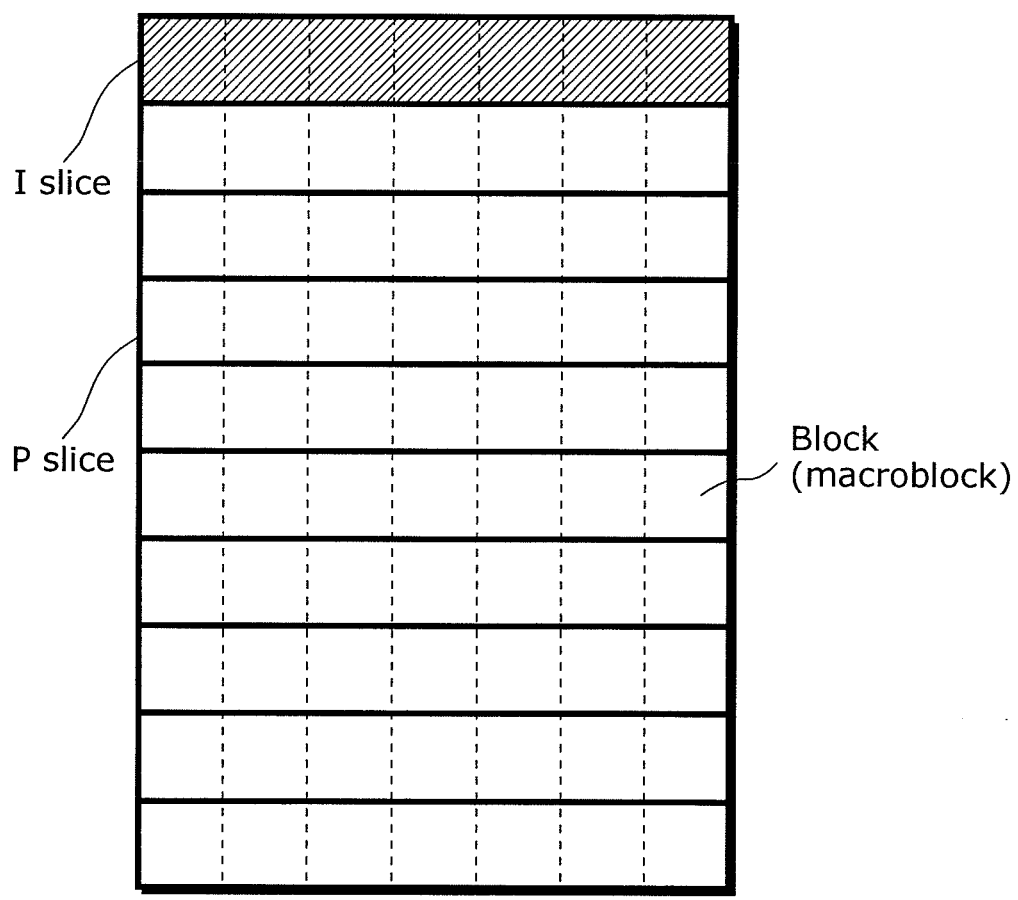
FIG. 1 illustrates a relationship between slices and blocks in accordance with MPEG-2.
Figure 2:
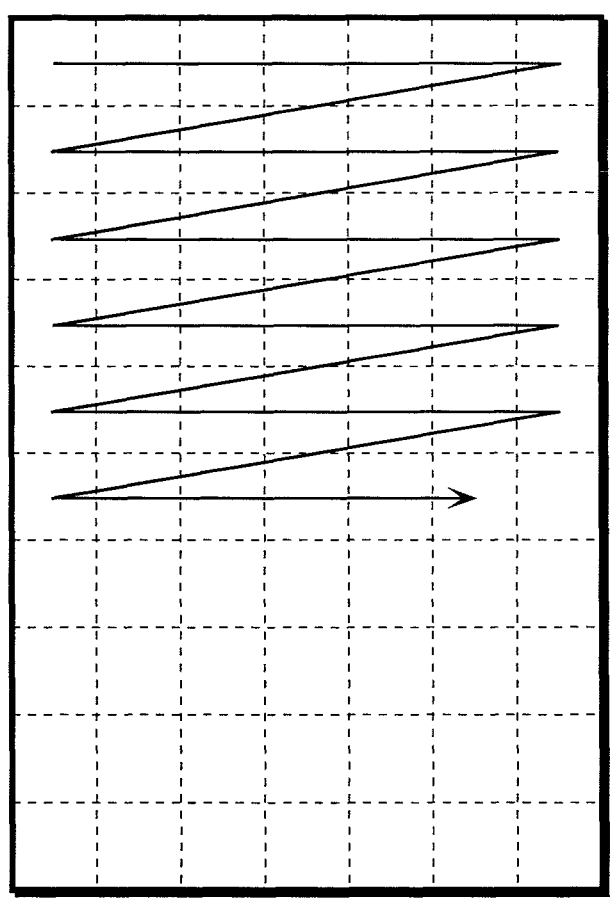
FIG. 2 illustrates a coding order of blocks included in a picture.
Figure 3:
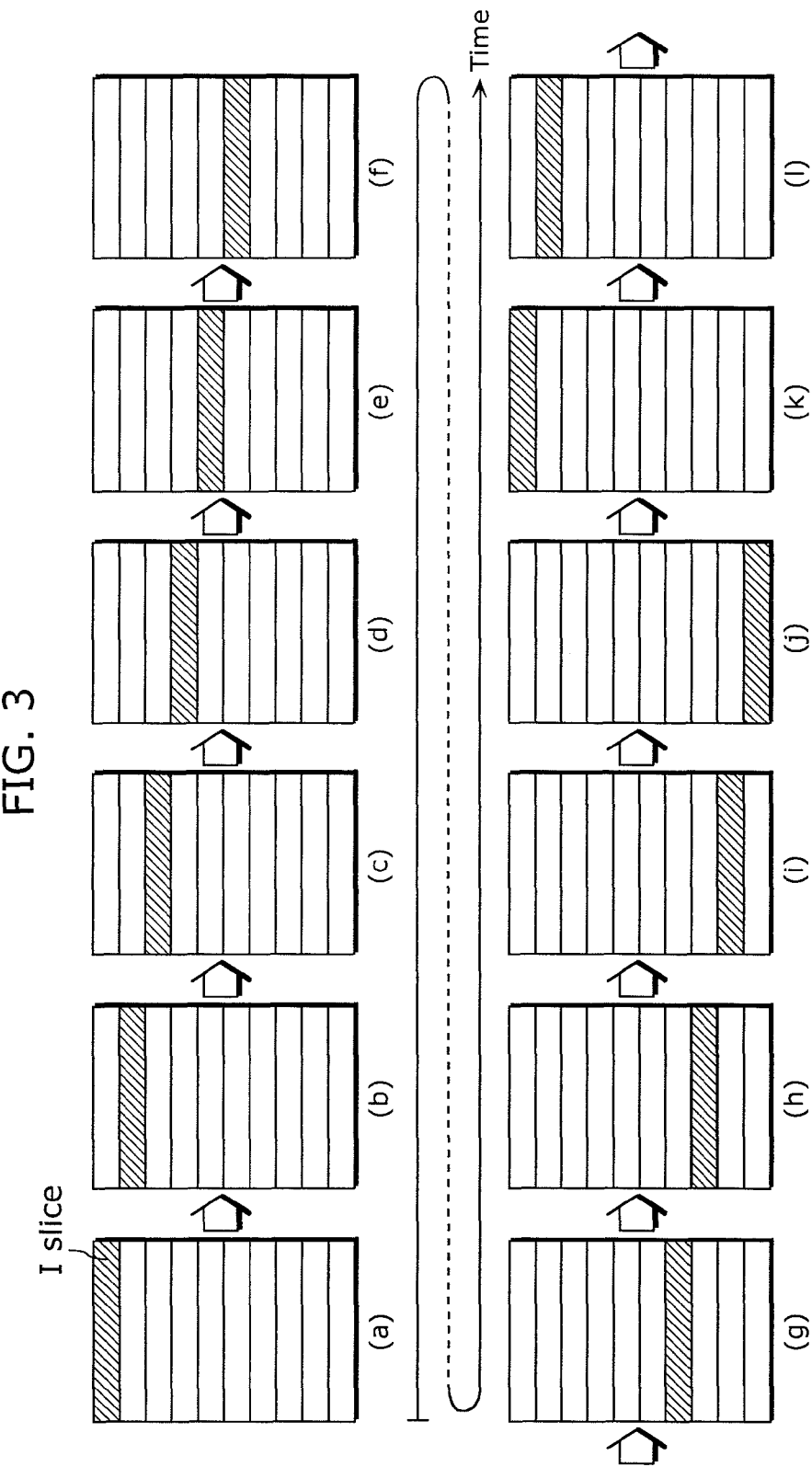
FIG. 3 illustrates an example of divided slices in pictures that are temporally consecutive.
Figure 4:
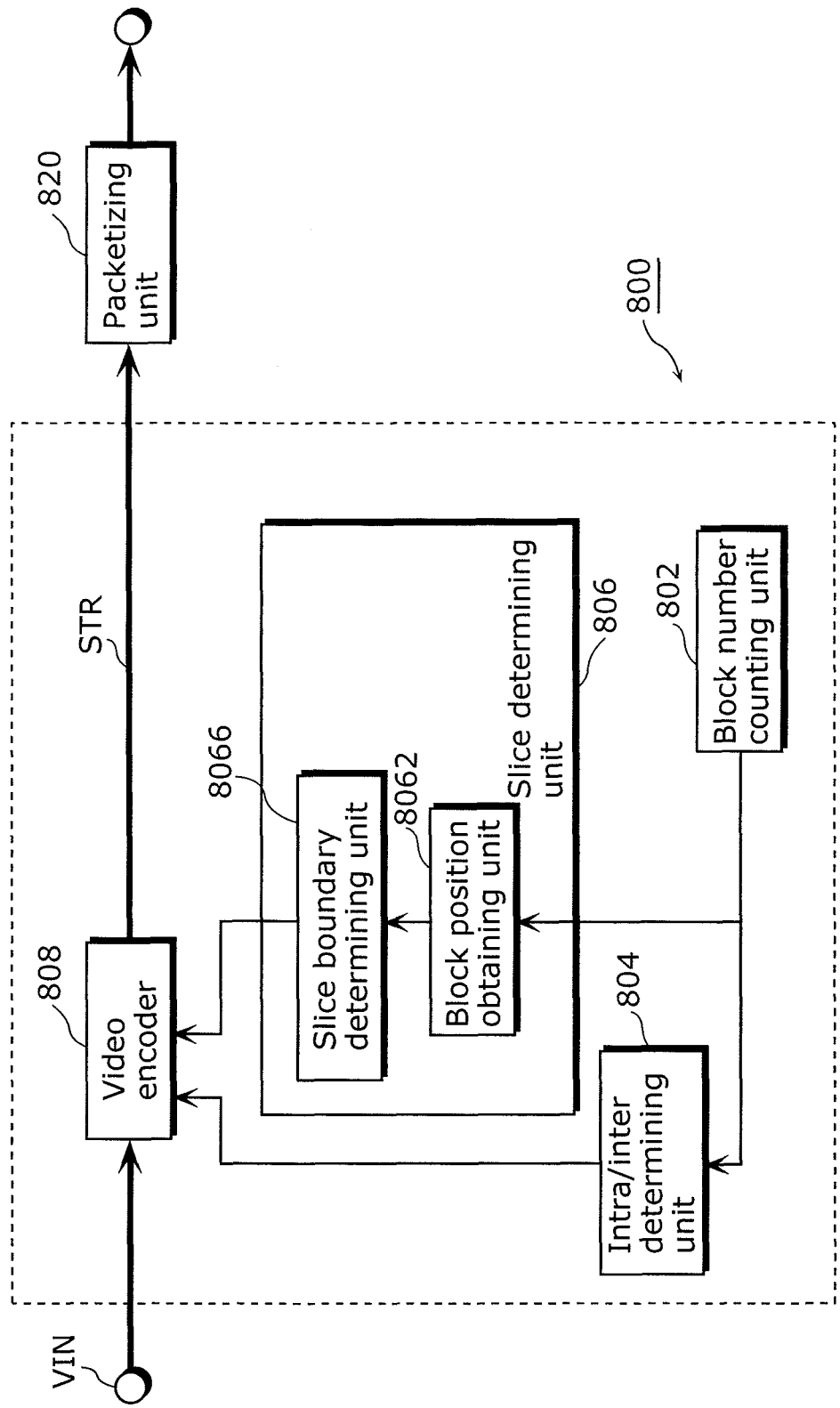
FIG. 4 illustrates a block diagram of a configuration of the picture coding apparatus 800 using a slice division method in accordance with MPEG-2.
Figure 5:
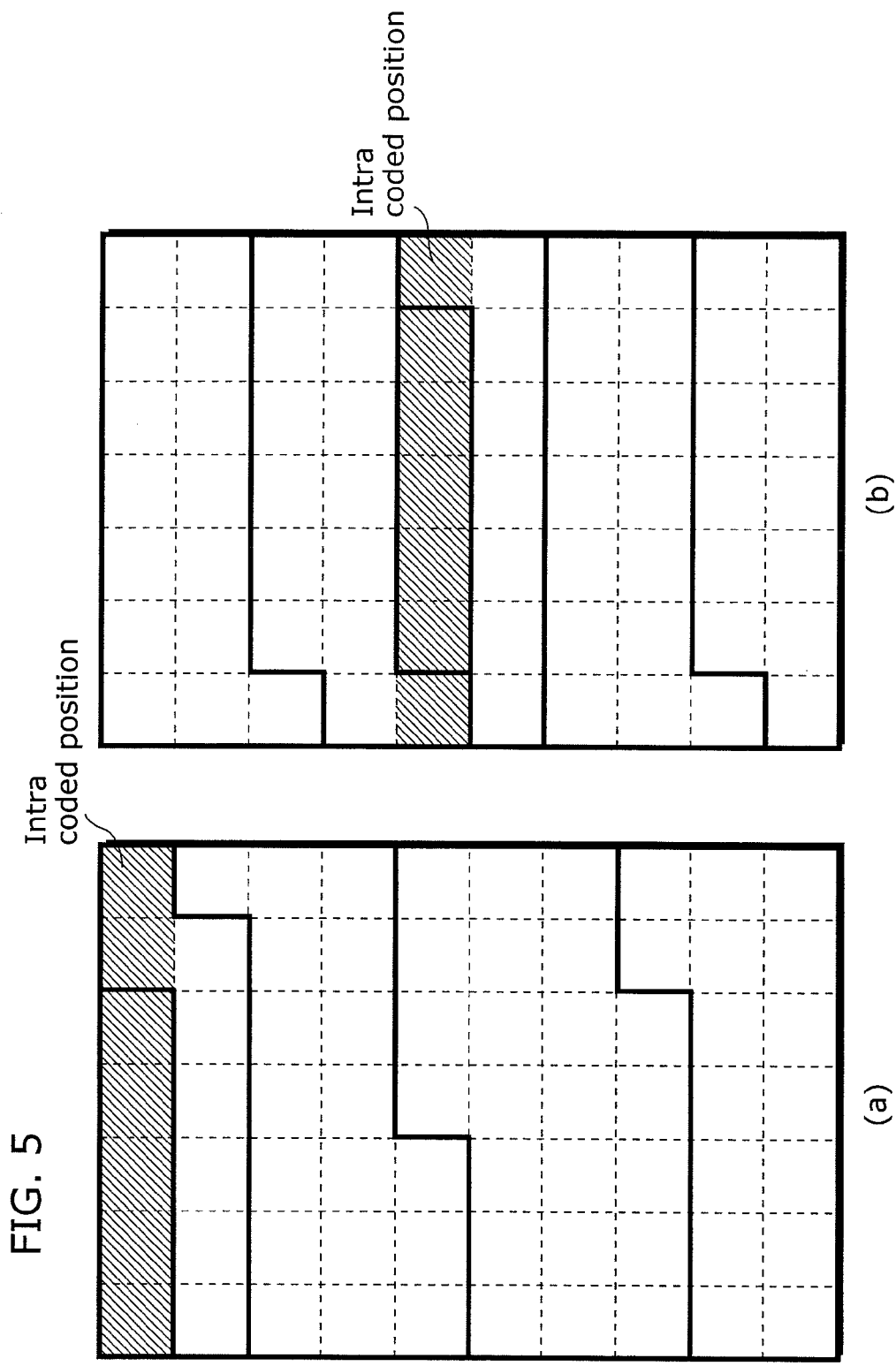
FIG. 5 illustrates an example of a relationship between slices and blocks using a slice division method in accordance with MPEG-4.
Figure 6:
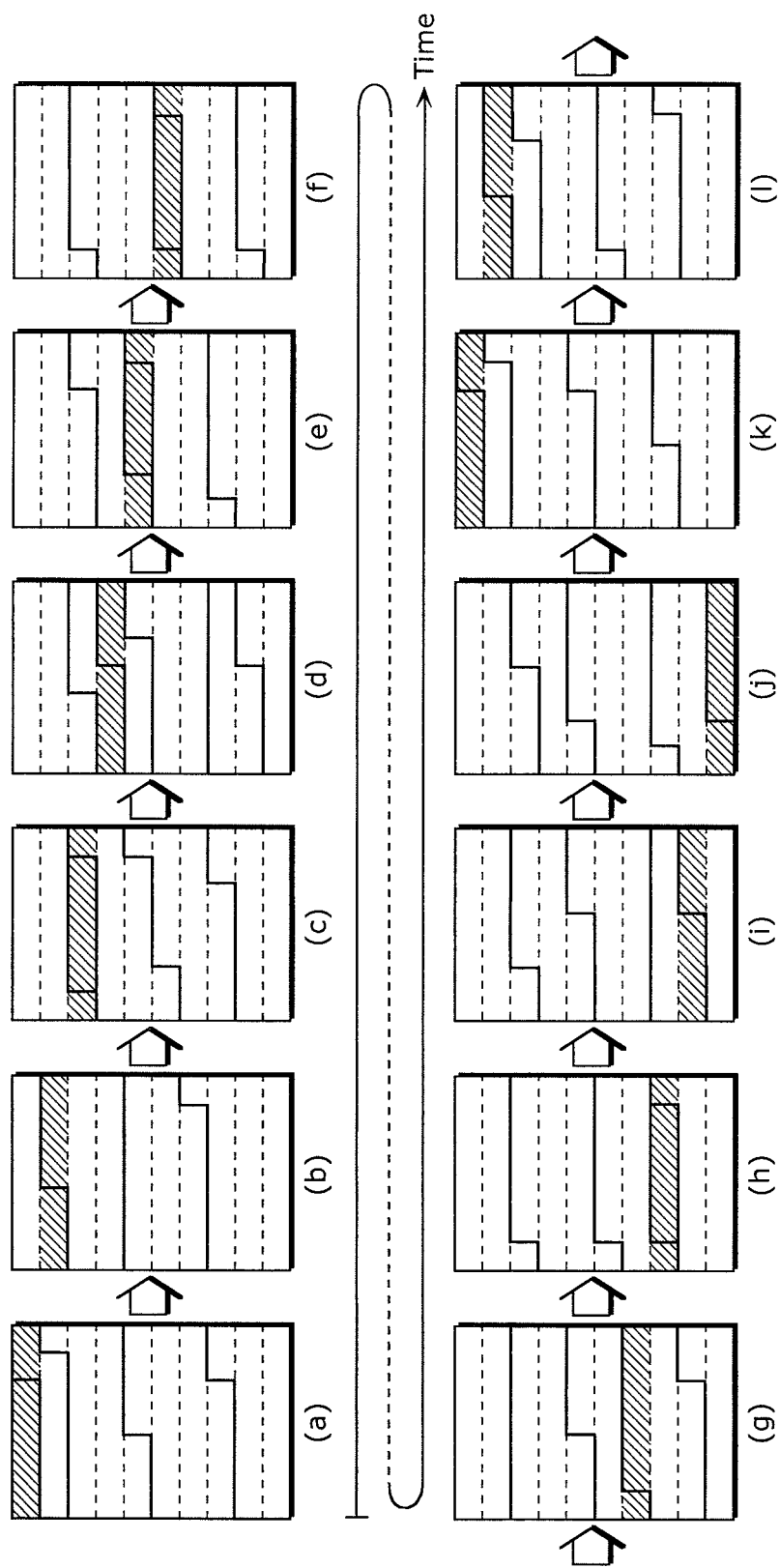
FIG. 6 illustrates an example of divided slices in pictures that are temporally consecutive.
Figure 7:
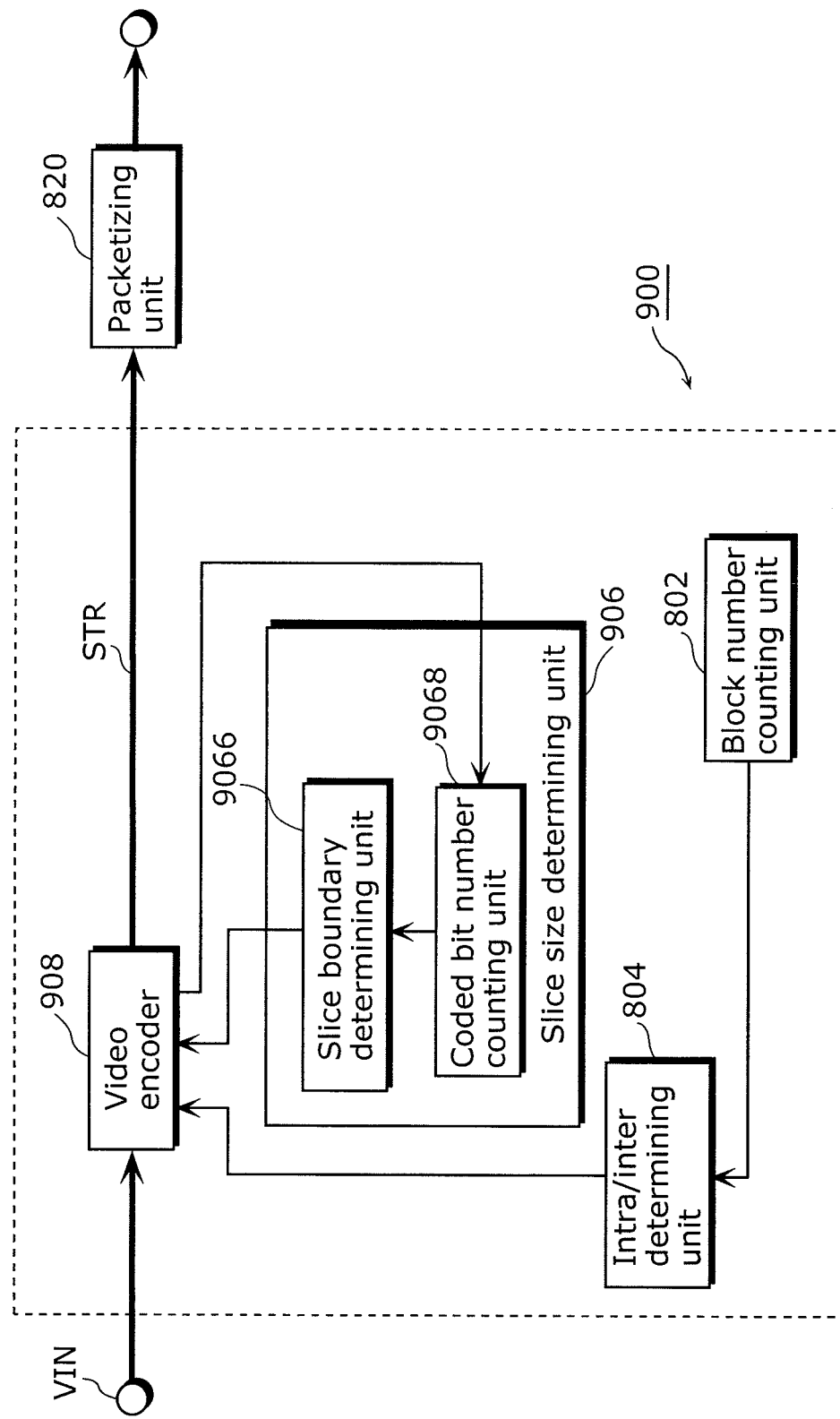
FIG. 7 illustrates a block diagram of a configuration of a picture coding apparatus using a slice division method in accordance with MPEG-4.
Figure 8:
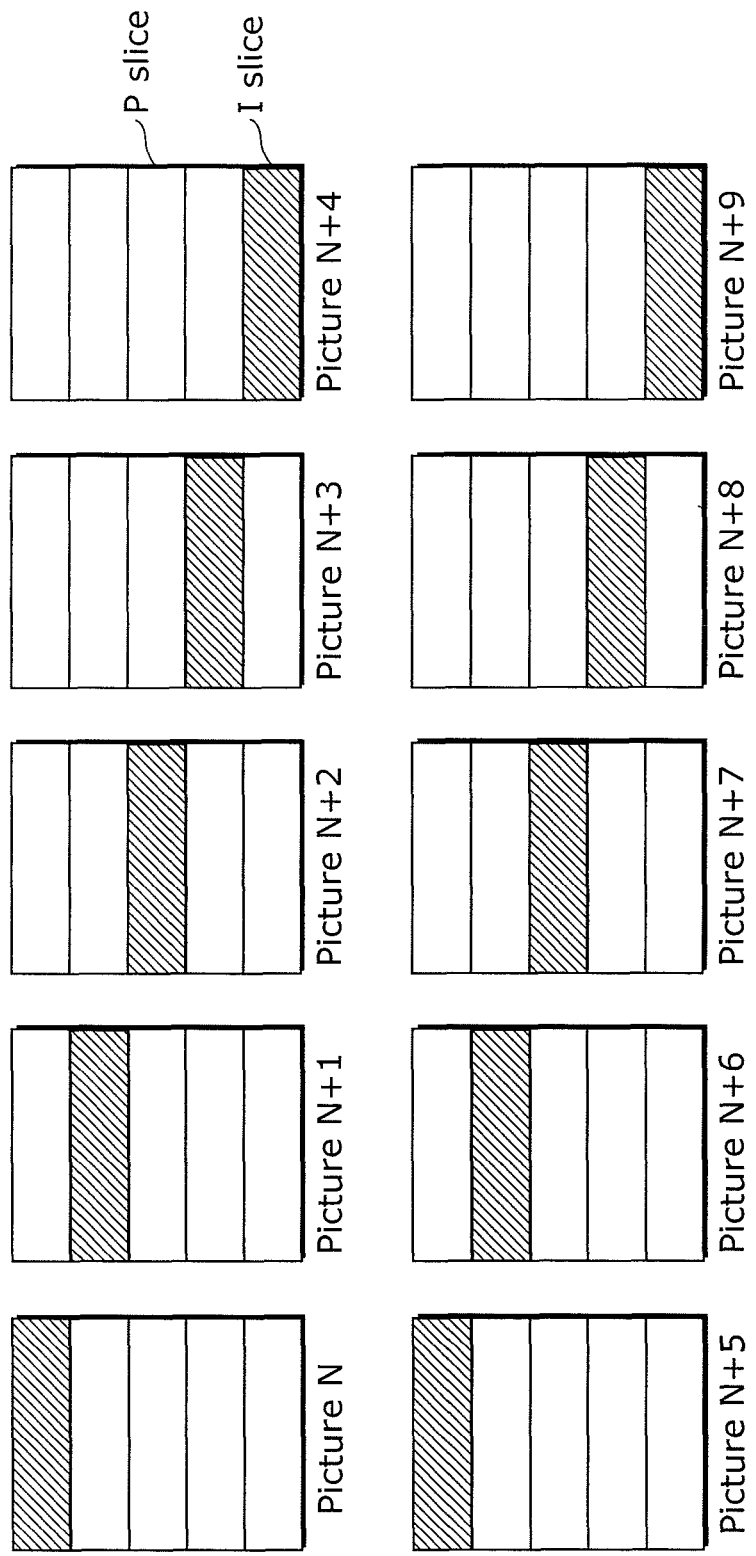
FIG. 8 illustrates an example of divided slices in pictures that are temporally consecutive.

NUMERICAL REFERENCES 100, 800, 900, 1000, 1100 Picture coding apparatus
102, 802, 1103 Block number counting unit
104, 804, 1104 Intra/inter determining unit
106, 906 Slice size determining unit
108, 808, 908 Video encoder
200, 820 Packetizing unit
806 Slice determining unit
1062 Block number obtaining unit
1064 Slice type obtaining unit
1065 Reference unit
1066 Slice division position determining unit
1101 Input picture
1102 Stream
1105 Slice coding unit
1106 Common data generation determining unit
1107 Common data generating unit
1108 Stream generating unit
1200, 1200a to 1200l, 1215a to 1215f, 1220a to 1220v, 1240a to 1240v, 1260a to 1260f, 1270a to 1270f, 1280a to 1280l Picture
1201, 1521 I-slice
1202, 1202a, 1202b, 1202c, 1202d, 1522 P slice
1204 Slice that can be accurately decoded
1211, 1513 Common data
1212, 1212a to 1212j, 1232a to 1232v, 1252a to 1252t Picture coded data
1213, 1233, 1253 Slice coded data
1300 Flexible disk
1301 Disk
1302 Case
1303 Tracks
1304 Sector
1310 Computer system
1311 Flexible disk drive
1501 I picture
1502 P picture
1511, 1512, 1514 Coded data
8062 Block position obtaining unit
8066, 9066 Slice boundary determining unit
9068 Coded bit number counting unit

DETAILED DESCRIPTION OF THE INVENTION

Embodiments of the present invention will be hereinafter described with reference to drawings.

FIG. 10 illustrates a block diagram of a configuration of a picture coding apparatus 100 using a slice division method according to an embodiment of the present invention.

The picture coding apparatus 100 includes a block number counting unit 102, an intra/inter determining unit 104, a slice size determining unit 106, and a video encoder 108.

The block number counting unit 102 counts the number of blocks in a slice to be coded.

Furthermore, the block number counting unit 102 notifies the intra/inter determining unit 104 and the slice size determining unit 106 of the number of blocks in the slice to be coded by the video encoder 108, that is, a something-th block in a slice.

The intra/inter determining unit 104 determines whether a slice to be coded by the video encoder 108 is an I-slice or a P slice, from the number of blocks notified by the block number counting unit 102.

The intra/inter determining unit 104 notifies the video encoder 108 and a slice type obtaining unit 1064 of the determined slice type (I-slice or P slice).

The slice determining unit 106 includes a block number obtaining unit 1062, the slice type obtaining unit 1064, a reference unit 1065, and a slice division position determining unit 1066.

The slice type obtaining unit 1064 obtains a type (I-slice or P slice) of a slice to be coded by the video encoder 108. The type is notified by the intra/inter determining unit 104.

The block number obtaining unit 1062 obtains the number of blocks included in a slice to be coded by the video encoder 108. The number of blocks is notified by the block number counting unit 102.

The slice division position determining unit 1066 determines whether or not a block is the last block in a slice (hereinafter referred to as a slice division position) to be coded by the video encoder 108, based on the number of blocks obtained by the block number obtaining unit 1062 and the slice type obtained by the slice type obtaining unit 1064.

The slice division position determining unit 1066 notifies the video encoder 108 of the determined slice division position. The video encoder 108 divides pictures into slices, based on the slice division position notified by the slice division position determining unit 1066. More specifically, when the slice type obtained by the slice type obtaining unit 1064 is I-slice, the slice division position determining unit 1066 determines, as the slice division position, a block at the time when the number of blocks in the slice notified by the block number counting unit 102 reaches M, and notifies the video encoder 108 of a result of the determination.

When the slice type obtained by the slice type obtaining unit 1064 is P slice, the slice division position determining unit 1066 determines, as the slice division position, a block at the time when the number of blocks in the slice notified by the block number counting unit 102 reaches N where N>M, and notifies the video encoder 108 of a result of the determination. Here, N and M are integer values.

Here, the slice division position determining unit 1066 determines a slice division position with reference to a rule described in a table and/or others that are stored in the reference unit 1065. The reference unit 1065 stores the table describing the slice division position determination rule including, for example, determining, as a P slice division position, a block at the time when the slice type is P slice and the number of blocks reaches N where N>M, and determining, as an I-slice division position, a block at the time when the slice type is I-slice and the number of blocks reaches M where N>M.

The video encoder 108 codes the input picture VIN per block using a coding method available (intra-picture coding method or inter picture coding method), based on the slice type notified by the intra/inter determining unit 104 on a per slice basis that is per slice division position notified by the slice size determining unit 106. The video encoder 108 provides the coded input picture VIN to the packetizing unit 200 as a stream STR.

The packetizing unit 200 converts the stream STR into a format appropriate for its transmission through a network. For example, the packetizing unit 200 converts the stream STR into a unit of network transmission per slice. Here, a slice in the stream STR may be converted into units of network transmission.

Embodiment 1

Figure 11:
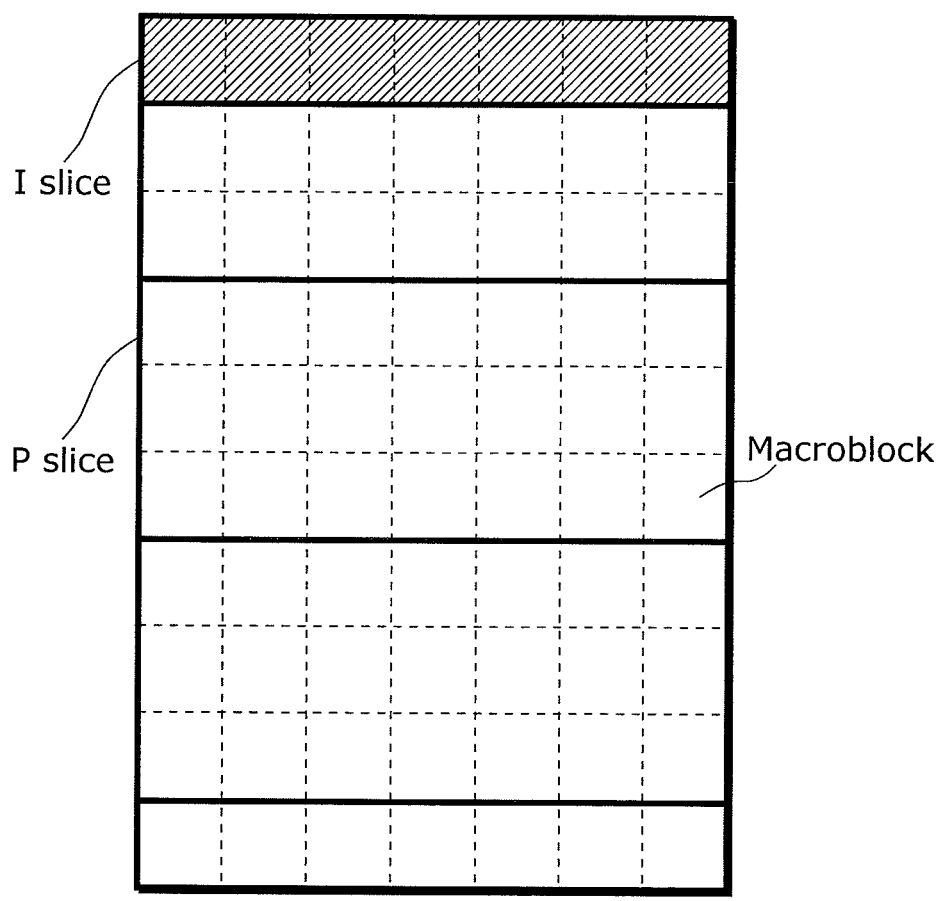
FIG. 11 illustrates a relationship between slices and blocks using a slice division method according to Embodiment 1 in the present invention.

FIG. 11 is an explanatory drawing showing a relationship between slices and blocks using a slice division method according to Embodiment 1 in the present invention. The picture (1 frame) in FIG. 11 is composed of blocks. Among the blocks composing the picture, an area of diagonally shaded blocks indicates a slice, that is, an I-slice. The blocks enclosed by thick lines compose another slices, that is, P slices. The example herein indicates that the picture is composed of I-slices and P slices. The difference with the slice division method in accordance with MPEG-2 in FIG. 1 is that blocks included in an I-slice is smaller in number than that of a P slice (slice size is smaller) in the slice division method in the present invention.

FIG. 12 illustrates an example of divided slices in pictures that are temporally consecutive according to Embodiment 1 in the present invention. The diagonally shaded slices indicate I-slices, and the rest of the slices indicate P slices.

In FIG. 12, the pictures (a) to (l) are the consecutive pictures alphabetically in the time order. The I-slice is moved down one row in the subsequent picture in time order. The slice division positions of P slices are fixed independent of the positions of the I-slices. In other words, the slice division position determining unit 1066 determines the slice division positions so that the number of blocks included in a P slice is in principle fixed. However, when an I-slice is inserted between P slices immediately prior to and immediately subsequent to the I-slice in a picture, the numbers of blocks included in the P slices exceptionally decrease. Thus, the slice division position determining unit 1066 determines the slice division positions by allowing such a case where the numbers of blocks in the P slices exceptionally decrease. Furthermore, when the blocks in a picture cannot be divided by P slices having the same size, the number of blocks in a P slice in the lowest row exceptionally decreases. The slice division position determining unit 1066 similarly determines the slice division positions by allowing such a case where the number of blocks in the P slice exceptionally decreases.

As such, the reduced number of blocks in an I-slice and the increased number of blocks in a P slice can lead to reduction in the number of slices in a picture. Furthermore, since the I-slice including only intra-coded blocks can circulate per picture, the picture coding resilient to loss in a part of the stream can be performed. In other words, even when a part of a stream is lost at some point in time and the picture quality of a P slice is deteriorated, in the case where the P slice corresponding to the part of the stream previously lost becomes an I-slice in a subsequent picture in time order, the pictures subsequent to the picture including the I-slice that is in the same slice position as the P slice can be accurately decoded and the stream having the deteriorated picture quality can be restored.

Furthermore, as illustrated in FIG. 12, a picture subsequent to the picture in which an I-slice is moved to the lowest row is coded as a picture including only P slices having no I-slice, and the next but one picture is coded so that the I-slice is moved to the highest row ((j) to (l) in FIG. 12). In other words, when the determined slice division position is in the lowest row in a picture and a slice to be coded by the video encoder 108 is an I-slice, the slice size determining unit 106 notifies the video encoder 108 that a picture to be next coded by the video encoder 108 should be composed of only the P slices having no I-slice. In response to the notification from the slice size determining unit 106, the video encoder 108 codes a picture that has the same slice division position as that of the immediately previous picture and that includes only P slices.

The picture including only P slices having no I-slice may be represented as a picture including an I-slice whose block number is zero and one or more P slices.

Furthermore, a method of coding a picture including only P slices having no I-slice is based on the rule described in the table stored in the reference unit 1065.

Thereby, the number of blocks to be coded in each P slice between an I-slice in a picture and the subsequent I-slice in the subsequent picture becomes constant during the circulation of the positions of the I-slices (for example, (a) to (l) in FIG. 12). As a result, the bit positions of the I-slices that have been coded and have the larger number of bits are almost at regular intervals in a stream. Thus, when the stream STR is transmitted per slice through a network, the number of bits subject to the network transmission can be averaged.

When the bit rate is lower or when a picture signal has less complex motion, the number of bits of the P slice becomes extremely smaller than that of the I-slice. There are cases where the number of bits per block for intra-picture coding becomes more than 10 times as large as that for inter picture coding. Thus, even when the number of blocks in a P slice is set larger than that of an I-slice, the number of bits of the I-slice sometimes becomes extremely larger. Since the bit positions of the I-slices that have been coded are almost at regular intervals in a stream, even when the number of bits between an I-slice and a P slice are different, the differences are cyclical ones. Thus, a transmission and reception buffer in the network can easily smooth out the differences, and the loss in a part of the stream that occurs more frequently when the differences become larger can be reduced in the network.

As such, a picture is composed of I-slices resilient to loss in the stream and P slices that is not resilient to loss in the stream but include inter coded blocks each having a higher compression rate. Here, the positions of the I-slices temporally circulate in the pictures. For example, when a part of a stream is lost and the picture quality of the P slice becomes deteriorated at some point in time, the deterioration in the picture quality is continued until a slice corresponding to the P slice where the stream is previously lost becomes an I-slice in the subsequent picture. However, when the slice in a position where the stream is lost becomes the I-slice in a subsequent picture in time order, since the I-slice is a slice to be coded using only the correlation between pixels in the slice, the slice in the position of the picture is accurately decoded. In other words, the stream in which the picture quality is deteriorated can be restored. Thus, the deterioration of picture quality can be prevented from being endlessly continued.

In order to more reliably prevent the continued deterioration of the picture quality, a range to which a P slice in each picture (for example, (a) to (l) in FIG. 12) refers (in which the correlation between pixels is used) is preferably limited to one of a P slice and an I-slice that are above (higher than) the P slice in each picture (for example, (a) to (l) in FIG. 12). However, even when such a limitation is not applied, in many cases, what is generally referred to is a slice in the same position as the slice in a temporally close (for example, immediately previous) picture. Thus, the probability that the previously occurring deterioration in the picture quality is continued to subsequent pictures is reduced. The subsequent pictures are pictures subsequent to a picture in which a slice including a pixel at the same position as the pixel where the picture quality deteriorates is an I-slice.

Figure 13A:
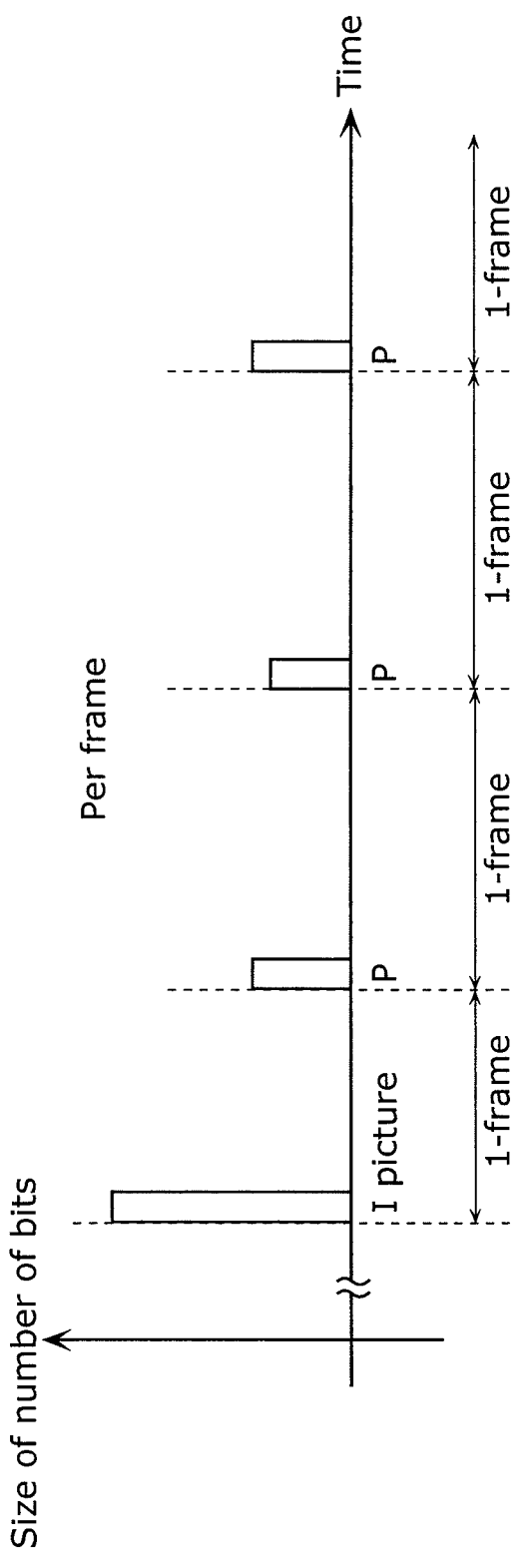
FIG. 13A illustrates a case where a stream is transmitted through a network according to Embodiment 1 in the present invention.
Figure 13B:
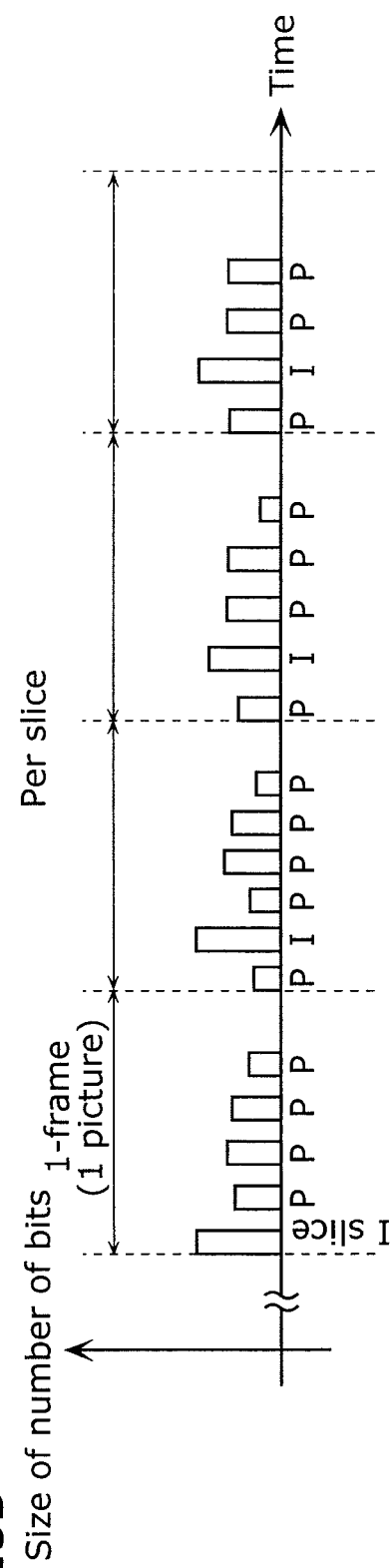
FIG. 13B illustrates a case where a stream is transmitted through a network according to Embodiment 1 in the present invention.

Hereinafter, FIGS. 13A and 13B illustrate the variations of the number of bits when a stream is transmitted through a network.

FIGS. 13A and 13B illustrate cases where the stream is transmitted through the network according to Embodiment 1 in the present invention.

FIG. 13A illustrates a conventional example for comparison when the stream is transmitted through the network per picture (frame).

FIG. 13B illustrates the case where the stream is transmitted through the network per slice.

Since the number of blocks in an I-slice is smaller than that of a P slice, differences in the sizes of the number of bits between the I-slices and the P slices can be reduced as illustrated in FIG. 13B according to an implementation of the present invention. Even when there are the differences in the sizes of the number of bits between the I-slices and the P slices, the variations of the number of bits in the I-slices become cyclical. Thus, the number of bits for network transmission can be averaged.

As described above, the picture (k) of FIG. 12 including only P slices having no I-slice is coded. Thereby, when consecutive frames (stream) are coded not only per frame as illustrated in FIG. 13B, the successive coding of I-slices in boundaries between the frames can prevent the continuation of the larger number of bits. In other words, making the variations of the number of bits in the I-slices cyclical can average the number of bits for network transmission.

As apparent from FIG. 12, the position of a macroblock to be a boundary between slices in a picture is fixed (though circulates) per picture. Thus, the position is independent of the details of an input picture signal. Thus, the coding is performed in parallel per slice, enabling a high-speed picture coding apparatus.

Figure 14:
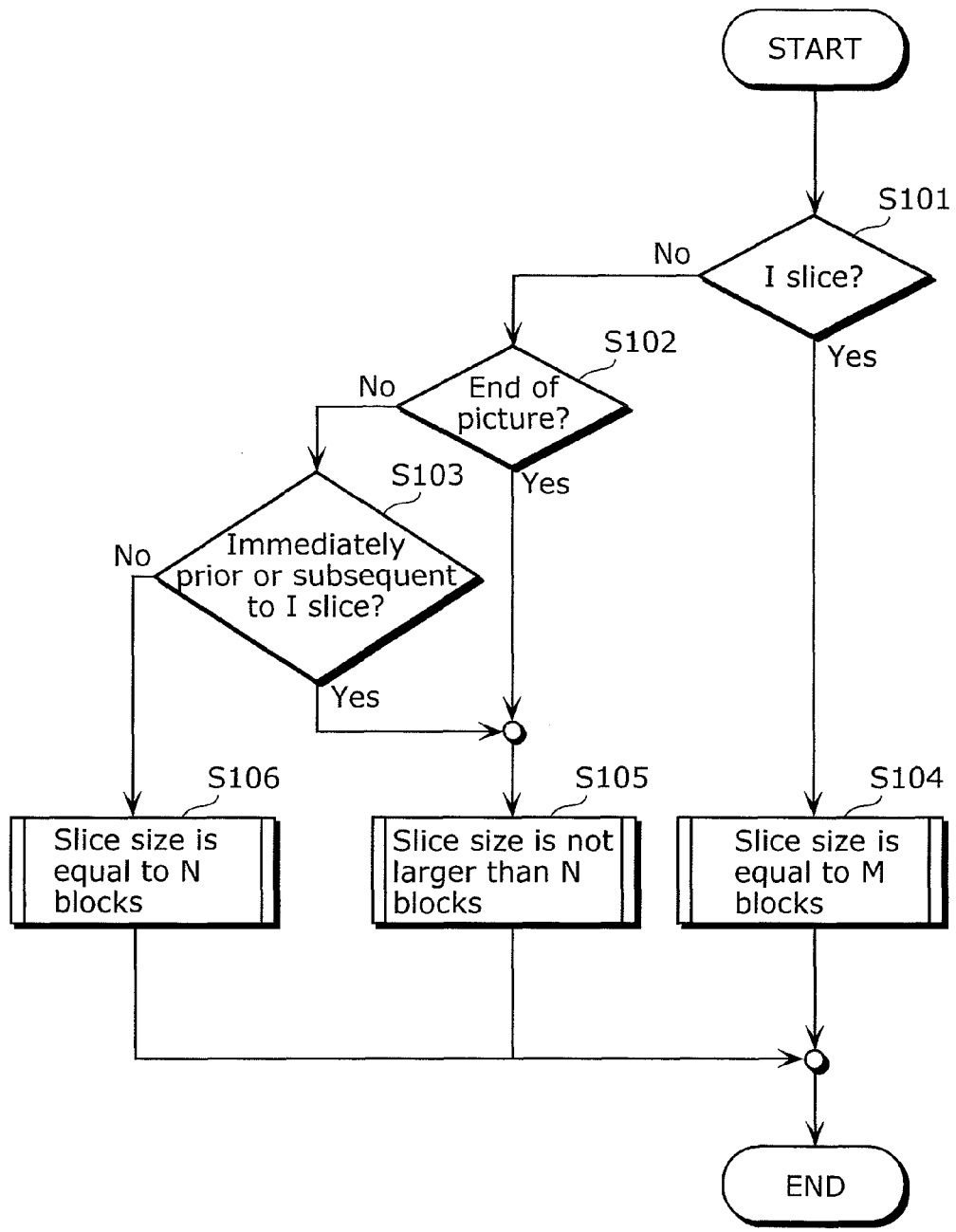
FIG. 14 illustrates a flowchart of coding processes performed by a picture coding apparatus according to Embodiment 1 in the present invention.

FIG. 14 illustrates a flowchart of coding processes performed by the picture coding apparatus 100 according to Embodiment 1 in the present invention.

First, the slice size determining unit 106 determines whether or not a slice to be coded by the video encoder 108 is an I-slice (S101). More specifically, the slice division position determining unit 1066 determines a slice type obtained by the slice type obtaining unit 1064.

When the slice type obtained by the slice type obtaining unit 1064 is the I-slice (Yes in S101), the slice division position determining unit 1066 determines a slice division position as a M-th block, based on the rule stored in the reference unit 1065. In other words, the slice division position determining unit 1066 determines, as the slice division position, the M-th block with respect to a block from which the I-slice starts based on the number of blocks obtained by the block number obtaining unit 1062. The video encoder 808 codes the size of the I-slice as the M blocks, based on the slice division position notified by the slice division position determining unit 1066 (S104).

Next, when the slice type obtained by the slice type obtaining unit 1064 is not the I-slice (No in S101), that is, when the slice type, obtained by the slice type obtaining unit 1064, of a slice to be coded is P slice, the slice division position determining unit 1066 determines whether or not the slice to be coded is at the end (lowest row) of the picture (S102). In other words, the slice division position determining unit 1066 determines whether or not the slice to be coded is a last slice in the picture, based on the number of blocks obtained by the block number obtaining unit 1062.

When the slice to be coded is a last slice in the picture, the slice division position determining unit 1066 determines a slice division position as a not-larger-than-N-th block (N>M), based on the rule stored in the reference unit 1065. The video encoder 808 codes the slice size of the last P slice in the picture as the number of blocks that is not larger than N (N>M), based on the slice division position notified by the slice division position determining unit 1066 (S105). The slice size of the last P slice in the picture, that is, the number of blocks included in the last P slice in the picture is determined by the number of blocks in the picture. For example, when the picture is composed of L blocks, the number of blocks in the last slice in the picture is obtained by the remainder of dividing L by N.

Next, when the slice to be coded is not a last slice in the picture, the slice division position determining unit 1066 determines whether or not a P slice to be coded is immediately prior or immediately subsequent to an I-slice, based on the number of blocks obtained by the block number obtaining unit 1062 and the slice type obtained by the slice type obtaining unit 1064 (S103).

When the P slice to be coded is immediately prior or immediately subsequent to an I-slice, the number of blocks in the P slice becomes smaller than N by insertion of an I-slice as illustrated in FIG. 12. Thus, the slice is determined according to the number of blocks (S105). In other words, when the P slice to be coded is immediately prior or immediately subsequent to an I-slice, the slice division position determining unit 1066 determines the slice division position of the P slice that is immediately prior or immediately subsequent to the I-slice, based on the number of blocks obtained by the block number obtaining unit 1062 and the slice type obtained by the slice type obtaining unit 1064 under an assumption that the number of blocks included in each of the slices is not larger than N.

Next, when a slice to be coded is neither immediately prior nor immediately subsequent to the I-slice, the slice is composed of N blocks (S106). In other words, the slice division position determining unit 1066 determines the slice division position of the P slice that is immediately prior or immediately subsequent to the I-slice, based on the number of blocks obtained by the block number obtaining unit 1062 and the slice type obtained by the slice type obtaining unit 1064 under an assumption that the number of blocks included in the P slice is equal to N.

The determination order of S101, S102, and S103 that are described with reference to FIG. 14 may be changed as long as the number of blocks included in a slice is not changed from the details described above. For example, the order of S102 and S103 is changeable.

According to Embodiment 1, even when a part of a stream is lost at some point in time and the picture quality of a P slice is deteriorated, in the case where a slice corresponding to the P slice where the stream is previously lost becomes an I-slice in the subsequent picture in time order, pictures subsequent to the picture including the I-slice can be accurately decoded and the stream having the deteriorated picture quality can be restored. Thus, the deterioration of picture quality can be prevented from being endlessly continued. As such, the reduced number of blocks in a slice and the increased number of blocks in a P slice can lead to reduction in the number of slices in a picture. Since the slice division position is determined per picture, the picture coding method and the picture coding apparatus for reducing the computational complexity and improving the compression rate can be implemented, while reducing the frequency of the stream transmission loss without interfering with the pipelining and paralleling.

In order to perform parallel processing of coding per slice according to an implementation of the present invention, a plurality of the picture coding apparatus 100 may be provided, and each of the block number counting units 102 may calculate the number of blocks per parallel processing as described above. For example, when a picture is divided into blocks in the first half of 6 rows and blocks in the second half of 4 rows, two sets of processing can be paralleled, in the examples of slice division in FIGS. 11 and 12. In other words, the boundary positions between P slices within a picture are in principle fixed in Embodiment 1. Thus, the processing can be paralleled per slice by simply dividing the pictures by the number of blocks at the fixed boundary positions, and causing processing units (processors or hardware) to perform the processing.

Embodiment 2

Next, Embodiment 2 will be hereinafter described. The description of the same configuration and operations as those of Embodiment 1 will be omitted.

Figure 15:
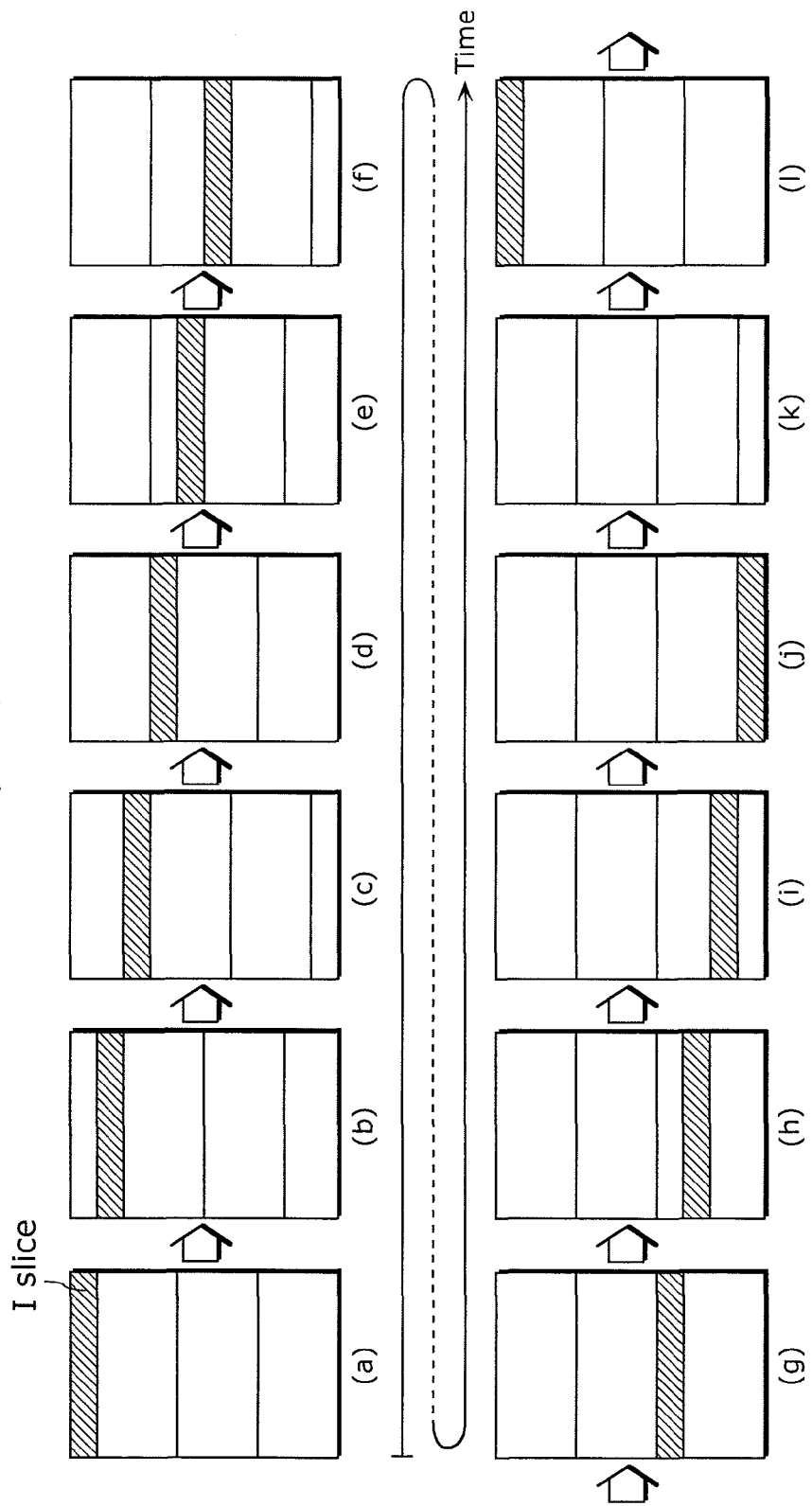
FIG. 15 illustrates an example of divided slices in pictures that are temporally consecutive according to Embodiment 2 in the present invention.

FIG. 15 illustrates an example of divided slices in pictures that are temporally consecutive according to Embodiment 2 in the present invention. The diagonally shaded slices are I-slices, and other slices are P slices. The difference with the slice division method in FIG. 12 according to Embodiment 1 is that in the slice division method in FIG. 15 according to Embodiment 2, the size of the P slices immediately subsequent to the I-slices is fixed (N blocks), and the boundary position (slice division position) between P slices that are below the I-slice are moved down by the number of rows corresponding to I-slices.

Thus, the number of slices included in the pictures according to Embodiment 2 is smaller than that of Embodiment 1. For example, FIG. 15 is compared with FIG. 12. Comparison between (a) in FIG. 12 and (a) in FIG. 15, (b) in FIG. 12 and (b) in FIG. 15, (d) in FIG. 12 and (d) in FIG. 15, and (e) in FIG. 12 and (e) in FIG. 15 indicate that each number of slices included in the pictures according to Embodiment 2 is smaller than that of Embodiment 1. Thus, the number of slices included in the pictures can be reduced, and the computational complexity can be reduced or the compression rate can be improved as advantages.

Figure 16:
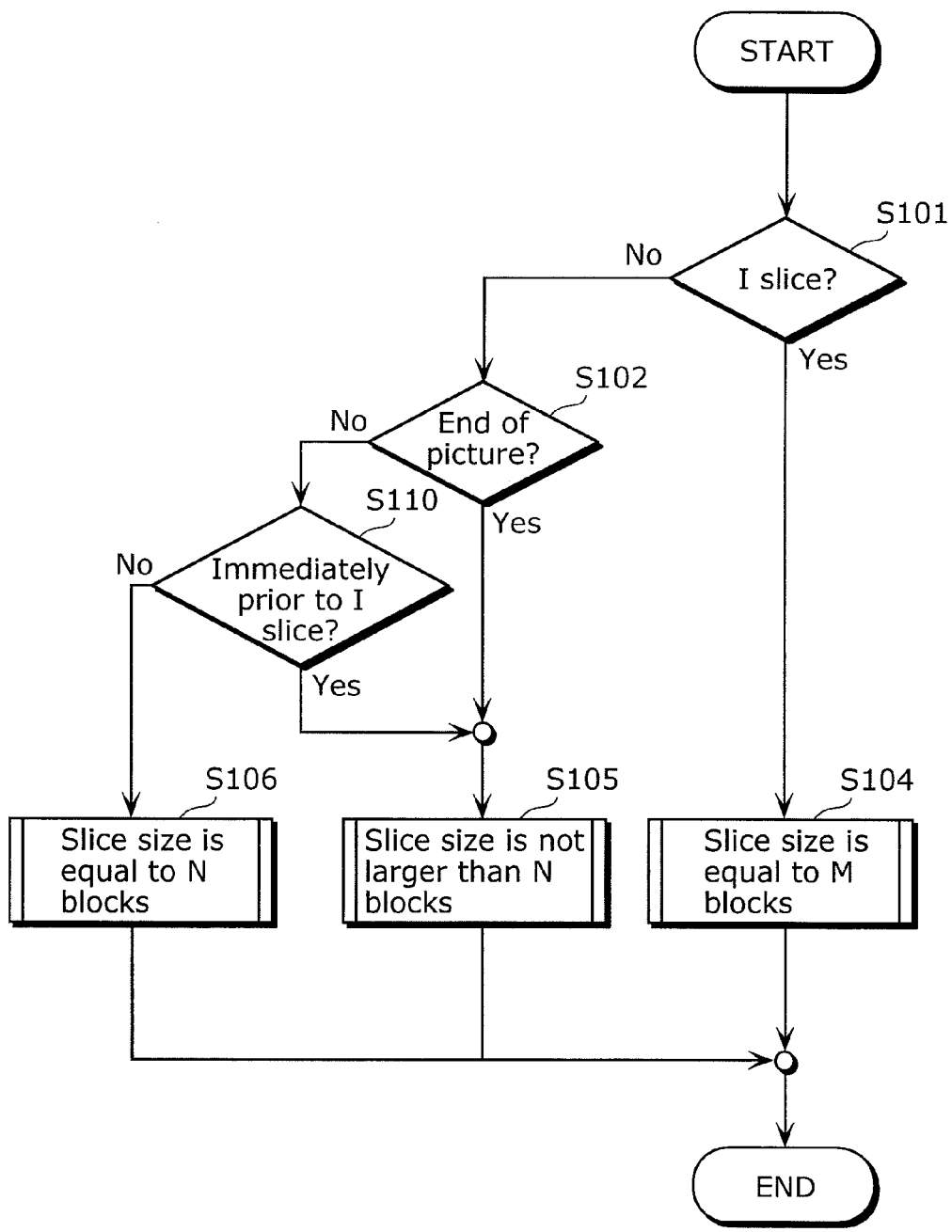
FIG. 16 illustrates a flowchart of coding processes performed by a picture coding apparatus according to Embodiment 2 in the present invention.

FIG. 16 illustrates a flowchart of coding processes performed by the picture coding apparatus 100 according to Embodiment 2 in the present invention. The same processing described with reference to FIG. 14 will be omitted using the numerals in FIG. 14.

The number of blocks in each of the P slices immediately subsequent to the I-slices in Embodiment 2 is N blocks except the last P slices in the pictures. Thus, instead of S103 in FIG. 14, when a P slice is immediately prior to an I-slice, the number of blocks in the P slice is smaller than N with the insertion of the I-slice in FIG. 15. Thus, the slice is determined according to the number of the blocks (S110). In other words, when a P slice to be coded is a slice immediately prior to an I-slice, the slice division position determining unit 1066 determines a slice division position of the P slice based on the number of blocks obtained by the block number obtaining unit 1062 and the slice type obtained by the slice type obtaining unit 1064 under an assumption that the number of blocks included in each of the P slices is not larger than N.

Embodiment 3

Next, Embodiment 3 will be hereinafter described. The same configuration and operations as those of Embodiments 1 and 2 will be omitted.

Figure 17:
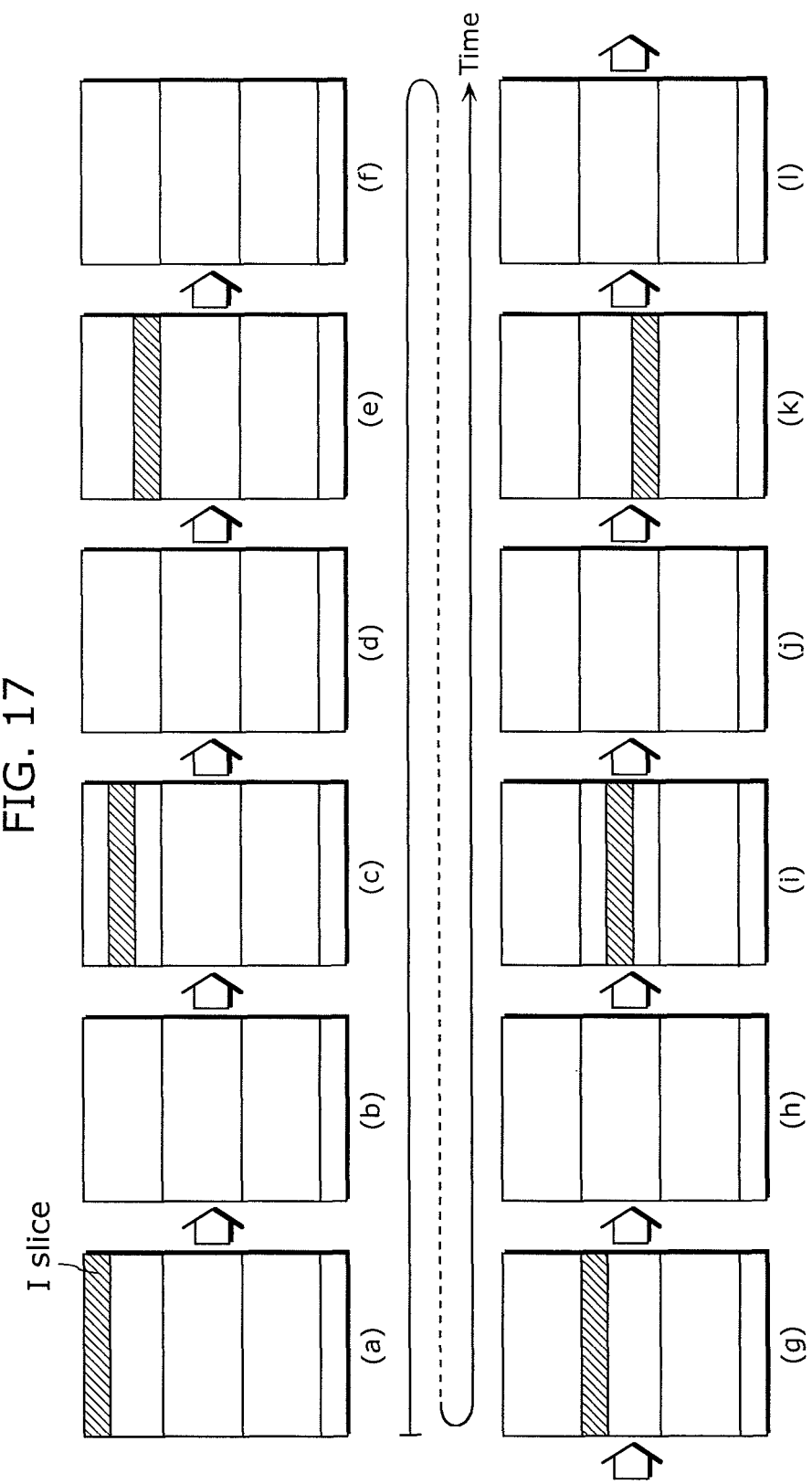
FIG. 17 illustrates an example of divided slices in pictures that are temporally consecutive according to Embodiment 3 in the present invention.

FIG. 17 illustrates an example of divided slices in pictures that are temporally consecutive according to Embodiment 3 of the present invention. The diagonally shaded slices are I-slices, and other slices are P slices.

Embodiment 1 shows the example that all of the pictures include I-slices except for the pictures between the pictures each having the I-slice in the lowest row and the pictures each having the I-slice in the highest row. In Embodiment 3, assumed is a case where the quality of network is higher and the I-slices may be less frequently inserted. In such a case, as shown in FIG. 17, a picture having no I-slice is regularly inserted.

When a stream is reproduced, in general, at least one I picture is desirably said to be inserted in the stream that lasts 2 seconds. For example, when 30 frames are needed per second for reproduction of a stream, an I picture is needed every 60 frames. Since the assumption here is transmission not per picture but per slice, the positions of I-slices in the pictures may be moved in time order, that is, cyclically moved.

Thus, as illustrated in FIG. 17, even when a picture having no I-slice is regularly inserted in every 2 pictures that are temporally consecutive, there is no influence on the reproduction of the stream. Thus, when the conditions of high quality network and the less frequently inserted I-slices are acceptable, the compression rate can be improved by reducing the number of intra-coded blocks having the larger number of bits.

Figure 18:
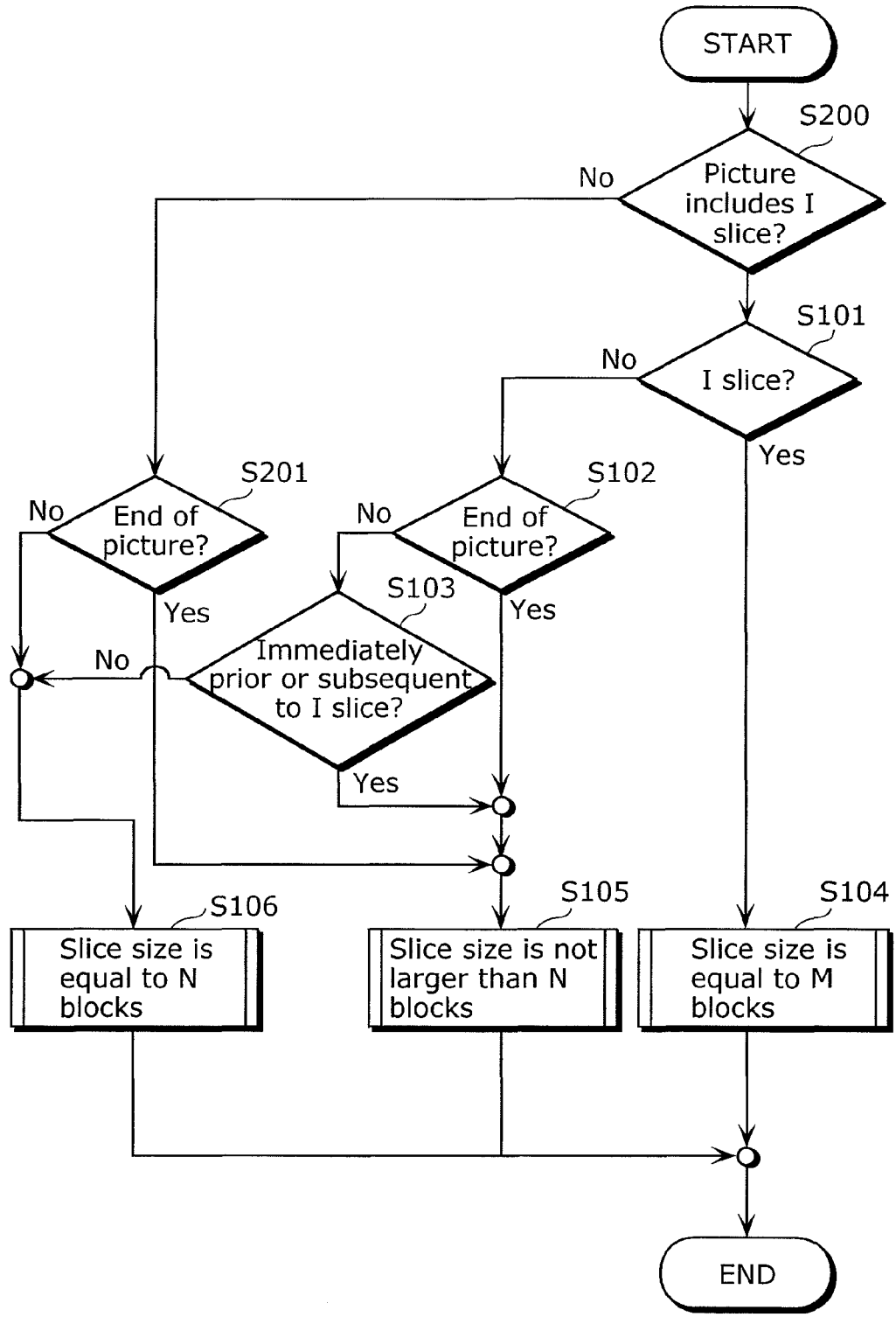
FIG. 18 illustrates a flowchart of coding processes performed by a picture coding apparatus according to Embodiment 3 in the present invention.

FIG. 18 illustrates a flowchart of coding processes performed by the picture coding apparatus 100 according to Embodiment 3 in the present invention. The same processing described with reference to FIG. 14 will be omitted using the numerals in FIG. 14.

First, the slice size determining unit 106 determines whether or not a picture including a current block to be coded by the video encoder 108 includes an I-slice (S200).

Here, the slice division position determining unit 1066 determines whether or not the picture including the current block to be coded includes any I-slice, with reference to the rule described in the table stored in the reference unit 1065. Here, as shown in FIG. 17, for example, the slice division position determining unit 1066 determines that a picture having no I-slice is included every 2 pictures.

When the slice size determining unit 106 determines that the picture including the current block to be coded by the video encoder 108 includes an I-slice (Yes in S200), since the same processing as that of the flowchart in FIG. 14 according to Embodiment 1 is performed, the description will be omitted.

Next, when the slice size determining unit 106 determines that the picture including the current block to be coded by the video encoder 108 does not include any I-slice (No in S200), the slice size determining unit 106 determines whether or not a slice to be coded by the video encoder 108 is a last slice in the picture (S201).

The video encoder 108 codes P slices excluding a last P slice in the picture assuming that the number of the blocks are N, based on the determination made by the slice size determining unit 106 (S106), and codes the last P slice in the picture assuming that the number of the blocks in the P slice is equal to that of the last P slice in a picture immediately prior or immediately subsequent to the picture to be coded.

Embodiment 4

Next, Embodiment 4 will be described. The same configuration and operations as those of Embodiments 1 and 2 will be omitted.

Figure 19:
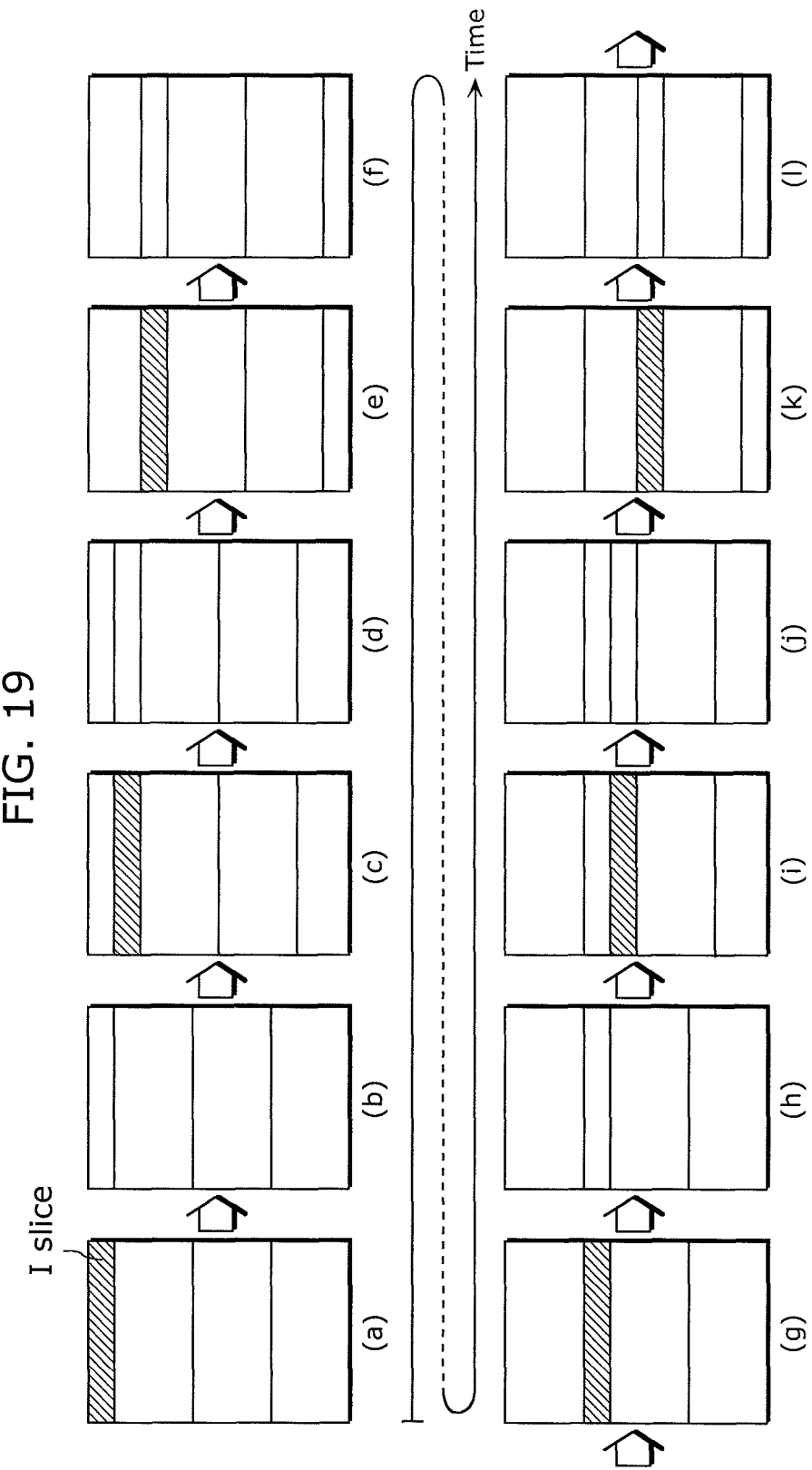
FIG. 19 illustrates an example of divided slices in pictures that are temporally consecutive according to Embodiment 4 in the present invention.

FIG. 19 illustrates an example of divided slices in pictures that are temporally consecutive according to Embodiment 4 in the present invention. The diagonally shaded slices indicate I-slices, and the rest of the slices indicate P slices. The difference with the slice division method in FIG. 15 according to Embodiment 2 is that a picture having no I-slice is regularly inserted in the slice division method in FIG. 19 according to Embodiment 4, in addition to the slice division method according to Embodiment 2. For example, (f), (h), and (l) in FIG. 19 are representative of the difference.

When the boundaries of the P slices are moved according to the positions where the slices are inserted in the pictures as described in Embodiment 2, the positions of the boundaries of the P slices in the pictures having no I-slice cannot be fixed in Embodiment 3. Thus, according to Embodiment 4, when a picture does not include an I-slice, P slices are determined such that each slice division position is located at the boundary of a corresponding one of the P slices in a picture immediately prior to the picture to be coded.

Thus, when a picture does not include an I-slice, pictures including the picture may be divided into P slices such that each slice division position is located at the boundary of a corresponding one of the P slices in a picture immediately prior to the picture to be coded. Furthermore, pictures may be divided into P slices such that each slice division position of a corresponding one of the P slices is fixed at the same slice division position as a picture having no I slice according to Embodiment 3.

Embodiment 5

Next, Embodiment 5 will be described. The same configuration and operations as those of Embodiments 1 and 4 will be omitted.

Figure 20:
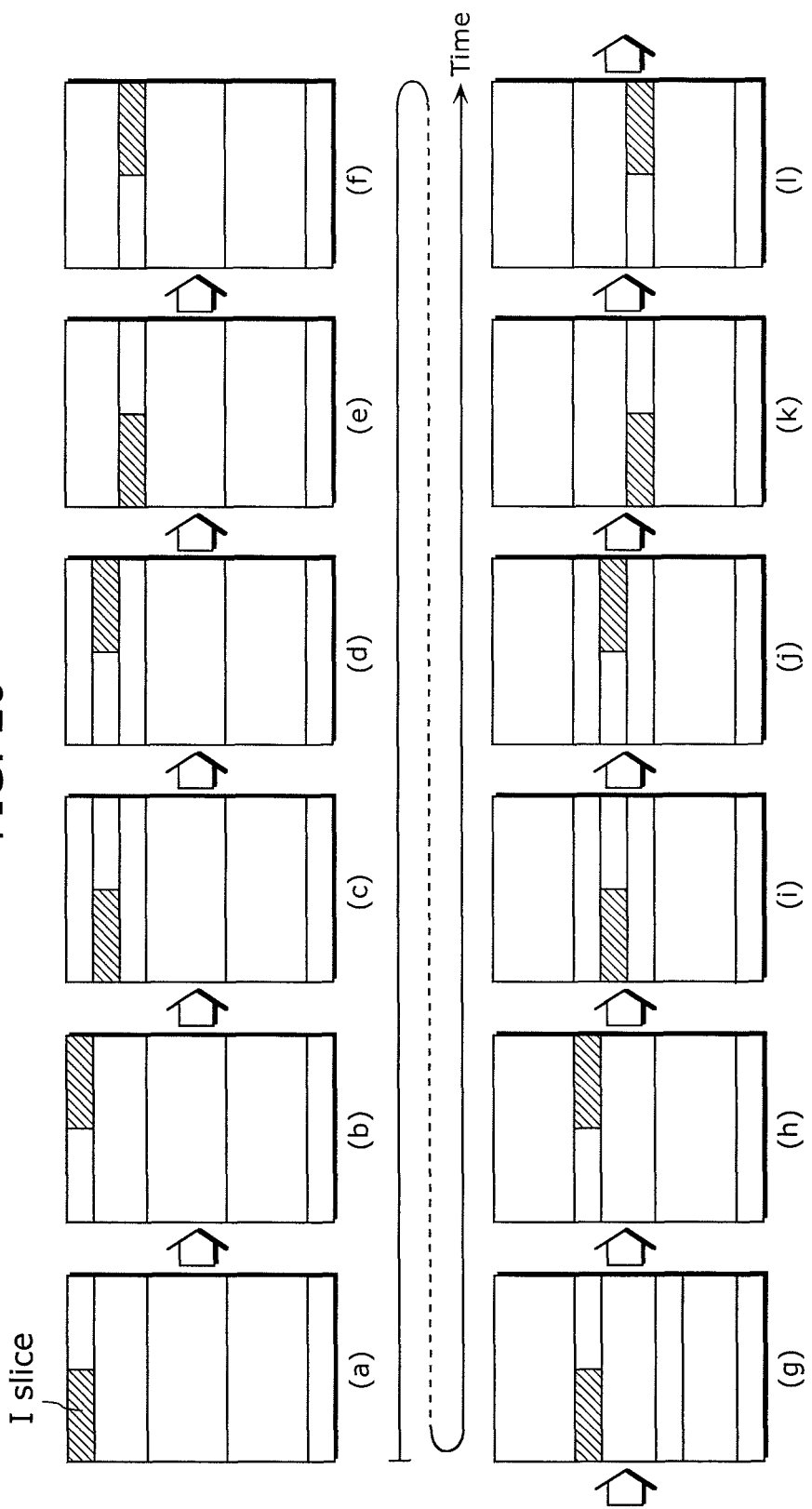
FIG. 20 illustrates an example of divided slices in pictures that are temporally consecutive according to Embodiment 5 in the present invention.

FIG. 20 illustrates an example of divided slices in pictures that are temporally consecutive according to Embodiment 5 in the present invention. The diagonally shaded slices indicate I-slices, and the rest of the slices indicate P slices.

The aforementioned description (Embodiments 1 and 4) is based on a case where blocks included in each I-slice correspond to blocks on a row unit basis in a picture. However, blocks included in an I-slice may be not blocks per row in a picture but blocks in a part of a row in a picture. FIG. 20 shows I-slices each including a half of the blocks in a row, and the left-half I-slices and the right-half I-slices are alternatively coded per picture.

Thus, when the conditions of high quality network and the less frequently inserted I-slices are acceptable, the compression rate can be improved by reducing the number of intra-coded blocks having the larger number of bits.

Embodiment 6

Next, Embodiment 6 will be described. The aforementioned description (Embodiments 1 and 5) is based on a case where the number of blocks included in an I-slice is smaller than that of a P slice. Embodiment 6 is described under an assumption that the number of blocks included in an I-slice is the same as that of a P slice.

Figure 21:
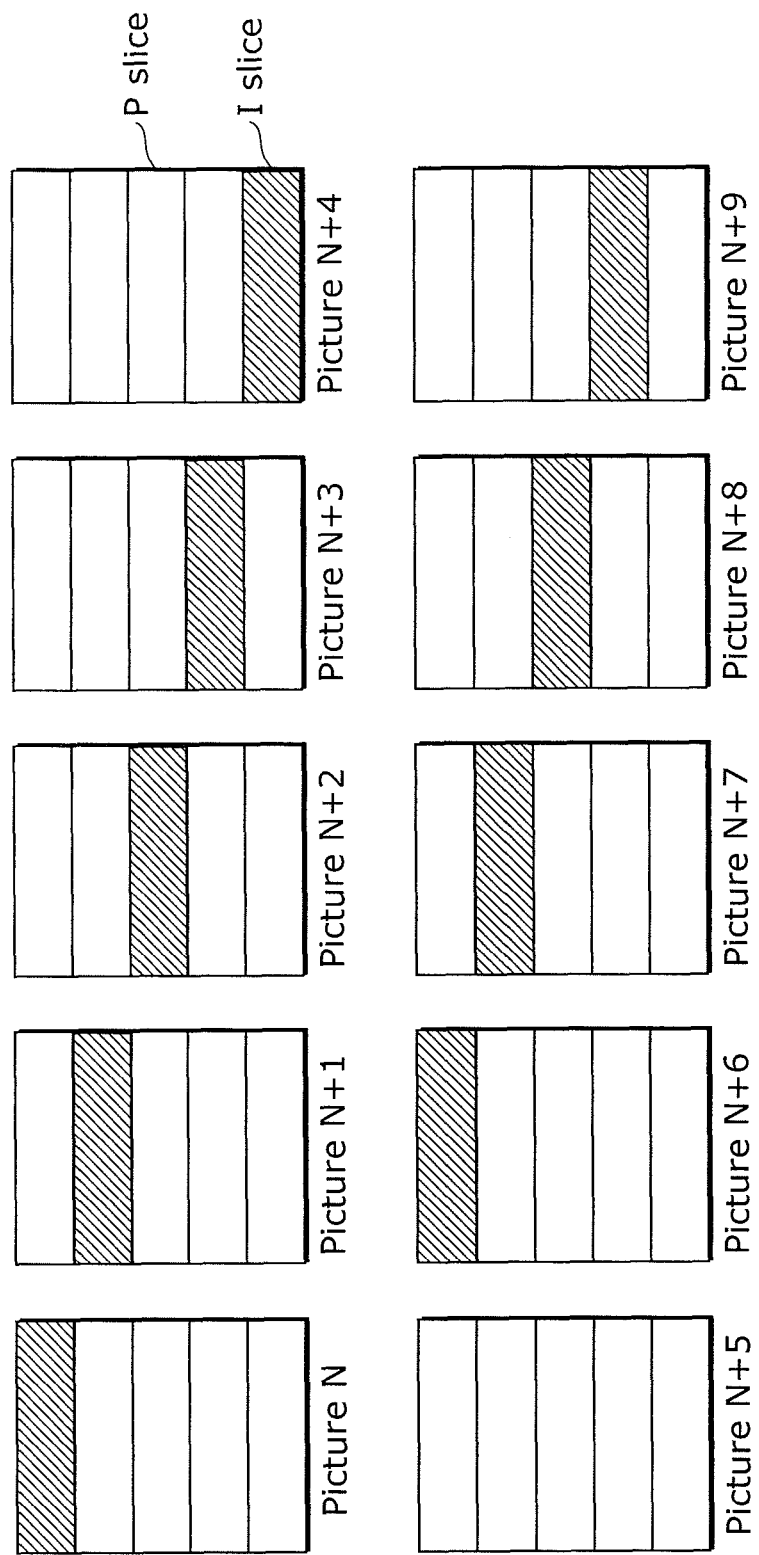
FIG. 21 illustrates an example of divided slices in pictures that are temporally consecutive according to Embodiment 6 in the present invention.

FIG. 21 illustrates an example of divided slices in pictures that are temporally consecutive according to Embodiment 6 in the present invention. The diagonally shaded slices indicate I-slices, and the rest of the slices indicate P slices. Furthermore, each of the pictures are composed of 5 slices herein.

In FIG. 21, pictures N to N+9 are temporally consecutive pictures in alphanumeric order. The positions of the I-slices are moved downward slice by slice in each picture from the pictures N to N+4 in alphanumeric order so that the I-slice is in the lowest position in the picture N+4. The picture N+5 is composed of P slices having no I-slice. An I-slice is in the highest position in the picture N+6. As illustrated in FIG. 21, the positions of the I-slices in the pictures that are temporally consecutive are moved.

Figure 22A:
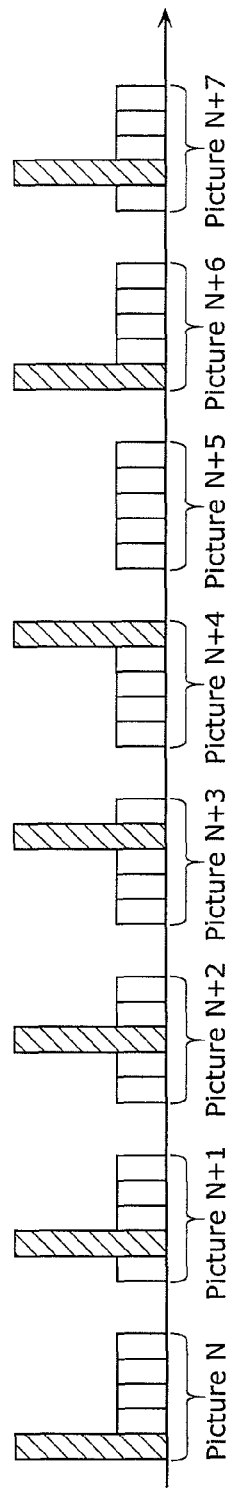
FIG. 22A illustrates an example of the number of bits obtained by coding each slice in time order according to Embodiment 6 in the present invention.
Figure 22B:
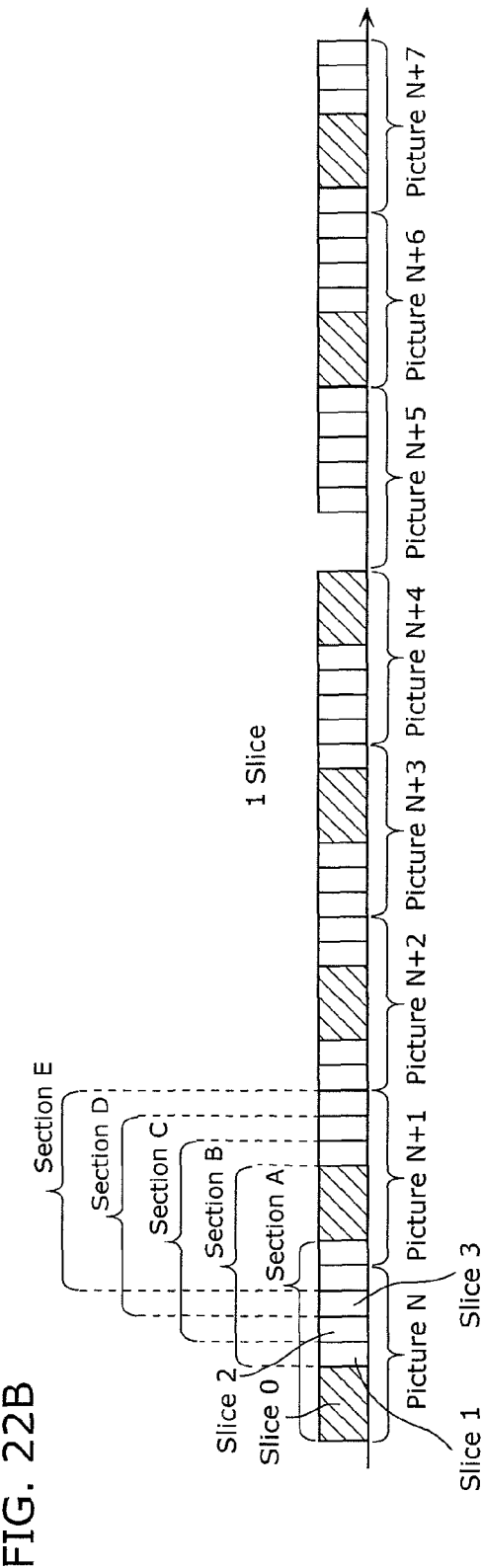
FIG. 22B illustrates an example of the number of bits obtained by coding each slice in time order according to Embodiment 6 in the present invention.

FIGS. 22A and 22B illustrate examples of the number of bits obtained by coding each slice in time order according to Embodiment 6 in the present invention. FIGS. 22A and 22B illustrate the examples of the number of bits obtained by coding each slice in time order when a stream is transmitted through a network per slice. FIG. 22A illustrates that the slices included in the pictures in FIG. 21 are coded from the top to the bottom, wherein the horizontal axis shows a time, and the vertical axis shows a size of the number of bits occurring when the slice are coded. As illustrated in FIGS. 21 and 22A, the positions of the I-slices included in the pictures circulate from the top to the bottom in time order, that is, cyclically.

Furthermore, FIG. 22B illustrates that pictures that are temporally consecutive are coded, and the coded pictures are transmitted at a predetermined bit rate in coding order. In FIG. 22B, the width (length) in the horizontal axis direction shows the size of the number of bits.

In the conventional example illustrated in FIG. 9B showing the same number of I-slices in each picture, the I-slices are two consecutive between the picture N+4 and the picture N+5. In contrast, according to Embodiment 6 in FIG. 22B, the number of P slices between an I-slice and the subsequent I-slice are fixed to 5, among the picture N+4, the picture N+5, and the picture N+6. In other words, when a stream is transmitted through a network per slice, prevention of two consecutive I-slices can average the number of bits for network transmission.

In the slice structure according to Embodiment 6, any of sections A to E in FIG. 22B includes six slices, that is, any of the six consecutive slices includes one I-slice and five P slices as illustrated in FIG. 22B.

Thus, when coding control is performed per slice by converting each set of slices into a network transmission unit of data so that a sum of the number of bits of the six consecutive slices becomes a predetermined value, the number of bits can be fixed in any of the sections as a result of the coding control. Thus, the number of bits for network transmission can be averaged.

For example, assume a case where the sum of the number of bits of the six consecutive slices is $\Sigma BIT$, and the number of bits occurring in one I-slice and one P slice are indicated as RI and RP, respectively.

First, as a result of a control for coding a slice 0 that is an I-slice in a section A with the BIT0(=$\Sigma BIT \times RI/(RI+5\times RP)$) bit, the bit actually occurring in the coding is assumed to be BIT0+$\Delta BIT0$ bit. In this case, the number of bits varies only by $\Delta BIT0$ in the section A.

Since the number of bits vary only by $\Delta BIT0$ in the section A, $\Sigma BIT-\Delta BIT0$ bit is allocated to a section B. Furthermore, RI is updated based on the actually occurring number of bits BIT0+$\Delta BIT0$.

Next, as a result of a control for coding a slice 1 with the BIT1(=$(\Sigma BIT-\Delta BIT0)\times RP/(RI+5\times RP)$) bit, the bit actually occurring in the coding is assumed to be BIT1+$\Delta BIT1$ bit. In this case, since the number of bits varies only by $\Delta BIT1$ in the section B, the $\Sigma BIT-\Delta BIT1$ bit is allocated to a section C as described above. Furthermore, RP is updated based on the actually occurring number of bits BIT1+$\Delta BIT1$.

Next, as a result of a control for coding a slice 2 with the BIT2(=$(\Sigma BIT-\Delta BIT1)\times RP/(RI+5\times RP)$) bit, the bit actually occurring in the coding is assumed to be BIT2+$\Delta BIT2$ bit. In this case, since the number of bits vary only by $\Delta BIT2$ in the section C, the $\Sigma BIT-\Delta BIT2$ bit is allocated to the section C as described above. Furthermore, RP is updated based on the actually occurring number of bits BIT2+$\Delta BIT2$.

Next, the variable number of bits obtained as a result of coding a slice 3 and the subsequent slices as described above is adjusted in a section subsequent to the section where the coded slice belongs to. Furthermore, one of RP and RI is updated based on the actually occurring number of bits of the slice.

The updating of one of RP and RI based on the actually occurring number of bits of the slice allows for (i) deriving the number of bits of a slice to be coded using a simpler computation expression even when moving pictures to be coded include a fast motion or when statistics of the moving pictures largely vary due to change in scenes, and (ii) appropriately controlling the number of bits per slice.

What is in particular important here is that the number of bits of the I-slices are far larger than those of the P slices, despite the variation in the occurring number of bits according to the statistics of the moving pictures. As a result, the difference between the actually occurring number of bits ($\Delta BIT0$, $\Delta BIT1$, $\Delta BIT2$, and others) increases in the case of the I-slices.

As in the conventional example described with reference to FIG. 9B, since the consecutive I-slices during the network transmission cause continuance of the larger differences in the number of bits, the picture quality is easily deteriorated, and coding control and using a predetermined bit rate become difficult. Thus, one of the number of P slices and the number of blocks, between an I-slice in a picture and an I-slice in the subsequent picture are fixed in temporally consecutive pictures according to Embodiment 6. Thus, when pictures are coded for network transmission, the variation of the differences in the actually occurring number of bits can be suppressed.

Figure 23:
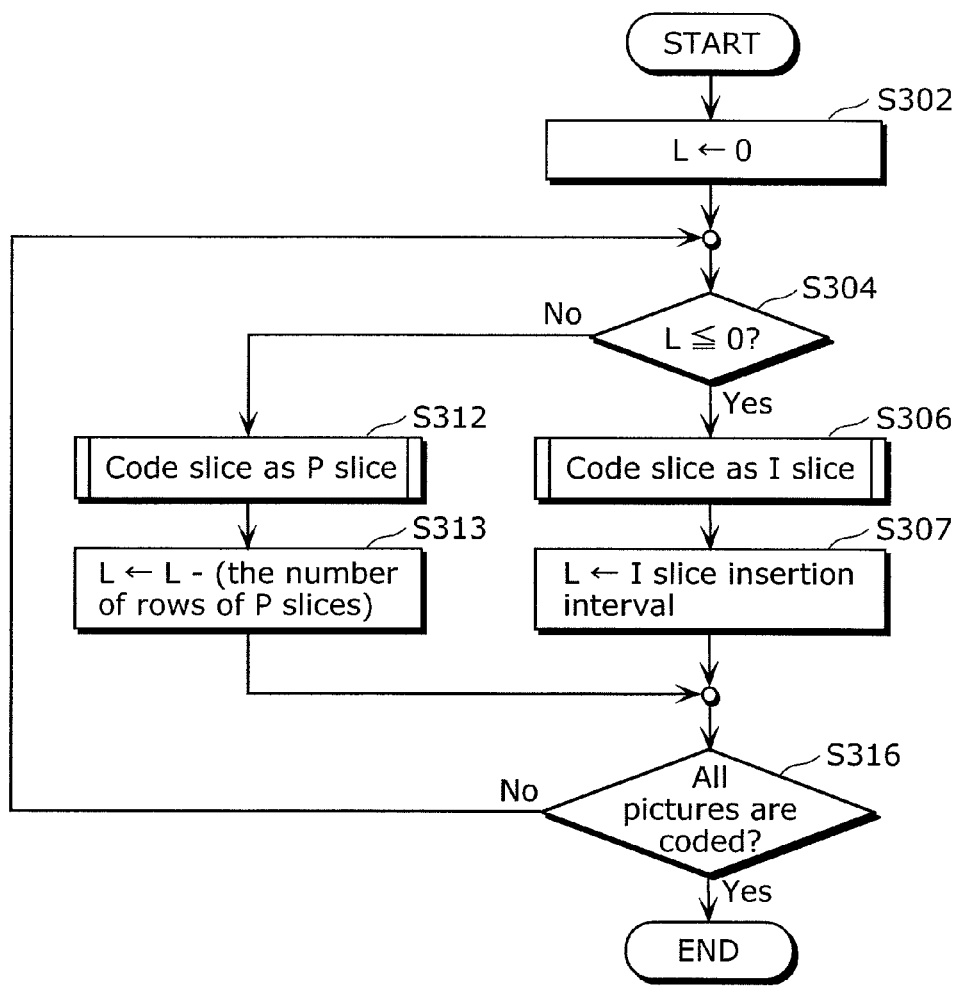
FIG. 23 illustrates a flowchart of coding processes performed by a picture coding apparatus according to Embodiment 6 in the present invention.

FIG. 23 illustrates a flowchart of coding processes performed by the picture coding apparatus 100 according to Embodiment 6 in the present invention.

The intra/inter determining unit 104 determines whether a slice to be coded by the video encoder 108 is an I-slice or a P slice, based on the number of blocks notified by the block number counting unit 102. The intra/inter determining unit 104 in Embodiment 6 holds a value indicating the number of rows of the P slices as a counter L. The intra/inter determining unit 104 determines a slice type using the number of blocks notified by the block number counting unit 102 and the counter L.

First, after resetting the counter L indicating the number of rows of the P slices (S302), the intra/inter determining unit 104 determines whether or not the slice to be coded by the video encoder 108 is an I-slice. In other words, the intra/inter determining unit 104 determines whether or not the counter L indicating the number of rows of the P slices is not larger than zero (S304).

Next, when the counter L is not larger than zero (Yes in S304), the intra/inter determining unit 104 determines that the slice to be coded by the video encoder 108 is the I-slice. The video encoder 108 codes a slice to be coded as an I-slice, based on the slice division position notified by the slice size determining unit 106 and the slice type notified by the intra/inter determining unit 104 (S306).

After the video encoder 108 codes the slice to be coded as an I-slice, the intra/inter determining unit 104 substitutes, into the counter L, a value of a sum of the number of rows of P slices between the I-slice and the subsequent I-slice. Here, the number of rows indicates intervals at which an I-slice is inserted, in consecutive pictures (S307).

Next, the intra/inter determining unit 104 verifies whether or not the video encoder 108 finishes coding all of the pictures (S316).

Here, when the counter L is larger than zero (No in S304), the intra/inter determining unit 104 determines that a slice to be coded by the video encoder 108 is a P slice. The video encoder 108 codes the slice to be coded as a P slice, based on the slice division position notified by the slice size determining unit 106 and the slice type notified by the intra/inter determining unit 104 (S312).

After the video encoder 108 codes the slice to be coded as a P slice, the intra/inter determining unit 104 subtracts the number of rows of the coded P slices from the counter L (S313).

Next, the intra/inter determining unit 104 verifies whether or not the video encoder 108 finishes coding all of the pictures (S316). When the video encoder 108 does not finish coding all of the pictures (No in S316), all of the processes S304 to S313 are repeated on all of the pictures.

As described above, the picture coding apparatus 100 according to Embodiment 6 in the present invention can insert a predetermined number of P slices between an I-slice and the subsequent I-slice in the consecutive pictures when the pictures are coded.

Figure 24:
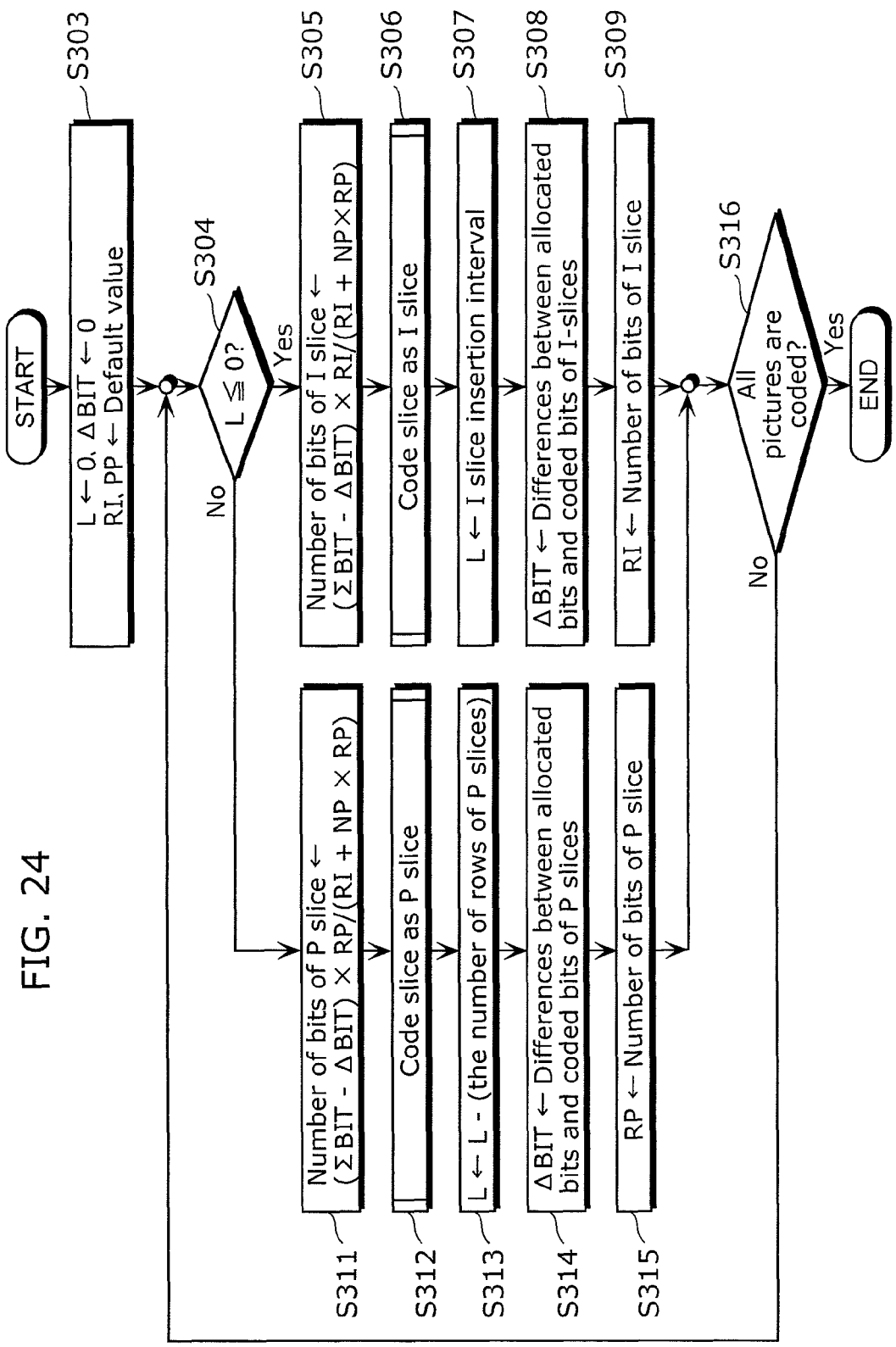
FIG. 24 illustrates a flowchart of coding processes performed by a picture coding apparatus according to Embodiment 6 in the present invention.

FIG. 24 illustrates a flowchart of coding processes performed by the picture coding apparatus 100 according to Embodiment 6 in the present invention. FIG. 24 illustrates the details of FIG. 23, wherein the same numerals are attached for the same processes as those of FIG. 23 and the description is omitted.

Assume that a sum of the number of bits of a predetermined number of slices that are consecutive, that is, a sum of (i) the number of bits of an I-slice and (ii) the number of bits of P slices between the I-slice and the subsequent I-slice is ΣBIT.

Here, the slice division position determining unit 1066 determines a slice division position of a slice to be coded by the video encoder 108, based on the number of blocks obtained by the block number obtaining unit 1062 and the slice type obtained by the slice type obtaining unit 1064. The slice division position determining unit 1066 in Embodiment 6 holds ΔBIT indicating a variable of ΣBIT to be used for determining the slice division position, PI indicating a value of the number of bits of an I-slice, and PR indicating a value of the number of bits of a P slice.

First, the intra/inter determining unit 104 resets the counter L indicating the number of rows of the P slices to zero. Furthermore, the slice division position determining unit 1066 resets ΔBIT indicating the variable of ΣBIT to zero, and substitutes respective default values into PI indicating the value of the number of bits of the I-slice, and into PR indicating the value of the number of bits of the P slice (S303).

Next, the intra/inter determining unit 104 determines whether or not the slice to be coded by the video encoder 108 is an I-slice. In other words, the intra/inter determining unit 104 determines whether or not the counter L indicating the number of rows of the P slices is not larger than zero (S304).

When the counter L is not larger than zero (Yes in S304), the intra/inter determining unit 104 determines that the slice to be coded by the video encoder 108 is the I-slice. When L is not larger than zero, the slice division position determining unit 1066 in the slice size determining unit 106 allocates the number of bits of (ΣBIT−ΔBIT)×RI/(RI+NP×RP) to an I-slice (S305). In other words, when the slice type obtained by the slice type obtaining unit 1064 is I-slice, the slice size determining unit 106 determines the slice division position based on the aforementioned number of bits, and notifies the video encoder 108 of the determined slice division position. Here, NP indicates the number of P slices between an I-slice and the subsequent I-slice in the consecutive pictures.

Next, the video encoder 108 codes a slice to be coded as an I-slice, based on the slice division position notified by the slice size determining unit 106 and the slice type notified by the intra/inter determining unit 104 (S306).

After the video encoder 108 codes the slice to be coded as an I-slice, the intra/inter determining unit 104 substitutes, into the counter L, a value of a sum of the number of rows of P slices between the I-slice and the subsequent I-slice. Here, the number of rows indicates intervals at which an I-slice is inserted, in the consecutive pictures (S307).

Here, the slice division position determining unit 1066 substitutes the number of bits corresponding to a difference between (i) the number of bits (ΣBIT−ΔBIT)×RI/(RI+NP×RP) allocated to a code of an I-slice by the video encoder 108 and (ii) the number of bits obtained by actually coding the I-slice, into the current ΔBIT (S308).

Furthermore, the slice division position determining unit 1066 substitutes the number of bits with which the video encoder 108 codes an I-slice into the current RI (S309).

Next, the intra/inter determining unit 104 verifies whether or not the video encoder 108 finishes coding all of the pictures (S316).

When the counter L is larger than zero (No in S304), the intra/inter determining unit 104 determines that the slice type of the slice to be coded by the video encoder 108 is P slice. When the counter L is larger than zero, the slice division position determining unit 1066 in the slice size determining unit 106 allocates the number of bits of (ΣBIT−ΔBIT)×RP/(RI+NP×RP) to the P slice (S311). In other words, when the slice type obtained by the slice type obtaining unit 1064 is P slice, the slice size determining unit 106 determines the slice division position based on the aforementioned number of bits, and notifies the video encoder 108 of the determined slice division position.

Next, the video encoder 108 codes the slice to be coded as a P slice, based on the slice division position notified by the slice size determining unit 106 and the slice type notified by the intra/inter determining unit 104 (S312).

After the video encoder 108 codes the slice to be coded as a P slice, the intra/inter determining unit 104 subtracts the number of rows of the coded P slices from the counter L (S313).

Here, the slice division position determining unit 1066 substitutes the number of bits corresponding to a difference between (i) the number of bits (ΣBIT−ΔBIT)×RI/(RI+NP×RP) allocated to a code of the P slice by the video encoder 108 and (ii) the number of bits obtained by actually coding the P slice into the current ΔBIT (S314).

Furthermore, the slice division position determining unit 1066 substitutes the number of bits with which the video encoder 108 codes the P slice into RP (S315).

Next, the intra/inter determining unit 104 verifies whether or not the video encoder 108 finishes coding all of the pictures (S316). When the video encoder 108 does not finish coding all of the pictures (No in S316), all of the processes S304 to S315 are repeated on all of the pictures (S316).

As described above, the picture coding apparatus 100 according to Embodiment 6 in the present invention can insert a predetermined number of P slices between an I-slice and the subsequent I-slice in the consecutive pictures, and codes the pictures by allocating an appropriate bit to each of the slices.

According to Embodiment 6, even when a part of a stream is lost at some point in time and the picture quality of a P slice is deteriorated, in the case where a slice corresponding to the P slice where the stream is previously lost becomes an I-slice in the subsequent picture in time order, pictures subsequent to the picture including the I-slice can be accurately decoded and the stream having the deteriorated picture quality can be restored. Thus, the deterioration of picture quality can be prevented from being endlessly continued. Since the number of bits for network transmission can be averaged, the computational complexity can be reduced and the compression rate can be improved, while reducing the frequency of the stream transmission loss without interfering with the pipelining and paralleling.

The processing illustrated in FIGS. 23 and 24 assumes the same number of the blocks in the I-slices and the P slices when the slice division position determining unit 1066 determines the slice division positions between the I-slices and the P slices. However, likewise Embodiments 1 to 5, the slice division positions may be determined based on the different number of blocks in the I-slices and the P slices. Such a case is also included in the scope of the present invention.

Although Embodiment 6 is described under an assumption that the number of blocks included in an I-slice is the same as that of a P slice, Embodiment 6 is not limited to such. For example, the number of blocks included in a P slice may be larger than that of an I-slice. Furthermore, the number of blocks in a P slice does not have to be fixed, because the number of blocks in the P slice is adjusted according to the positions of I-slices in pictures.

Embodiment 7

Next, Embodiment 7 will be described.

Figure 25:
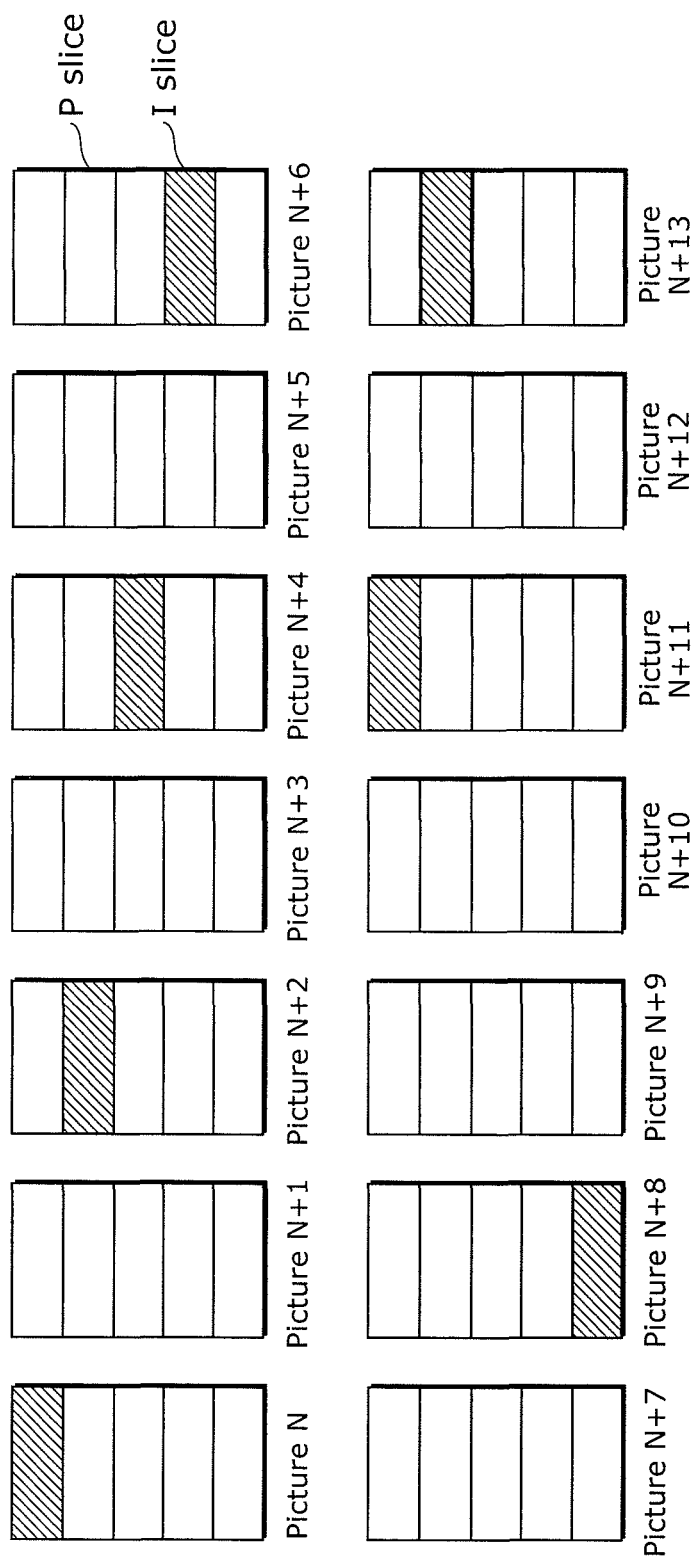
FIG. 25 illustrates an example of divided slices in pictures that are temporally consecutive according to Embodiment 7 in the present invention.

FIG. 25 illustrates an example of divided slices in pictures that are temporally consecutive according to Embodiment 7 in the present invention.

The difference between the slice division method in FIG. 21 according to Embodiment 6 and the slice division method in FIG. 25 according to Embodiment 7 is that a picture having no I-slice is regularly inserted, in addition to the slice division method according to Embodiment 6. For example, pictures N+1, N+3, N+5, N+9, and N+12 in FIG. 25 are representative of the difference.

As such, even when a picture having no I-slice is regularly inserted, the same advantage as that of Embodiment 6 can be obtained by fixing the number of blocks of P slices between an I-slice and the subsequent I-slice in temporally consecutive pictures.

As described above, when the number of slices included in each picture is fixed and the respective numbers of blocks included in an I-slice and a P slice are fixed, the same advantage as that of Embodiment 6 can be obtained by fixing the number of P slices between an I-slice and the subsequent I-slice in the temporally consecutive pictures. In other words, the number of I-slices in each of the temporally consecutive pictures is not limited to 1 at most as in the example illustrated in FIG. 25. The number of I-slices in each of the temporally consecutive pictures may be more than 2. Furthermore, the number of P slices between an I-slice and the subsequent I-slice in the temporally consecutive pictures is not limited to 10 as in the example shown in FIG. 25. As described above, when the number of slices included in each picture is fixed, and the respective numbers of blocks included in an I-slice and a P slice are fixed, the same advantage as that of Embodiment 6 can be obtained by fixing the number of P slices between an I-slice and the subsequent I-slice in each of the temporally consecutive pictures. The following shows the examples.

Figure 26:
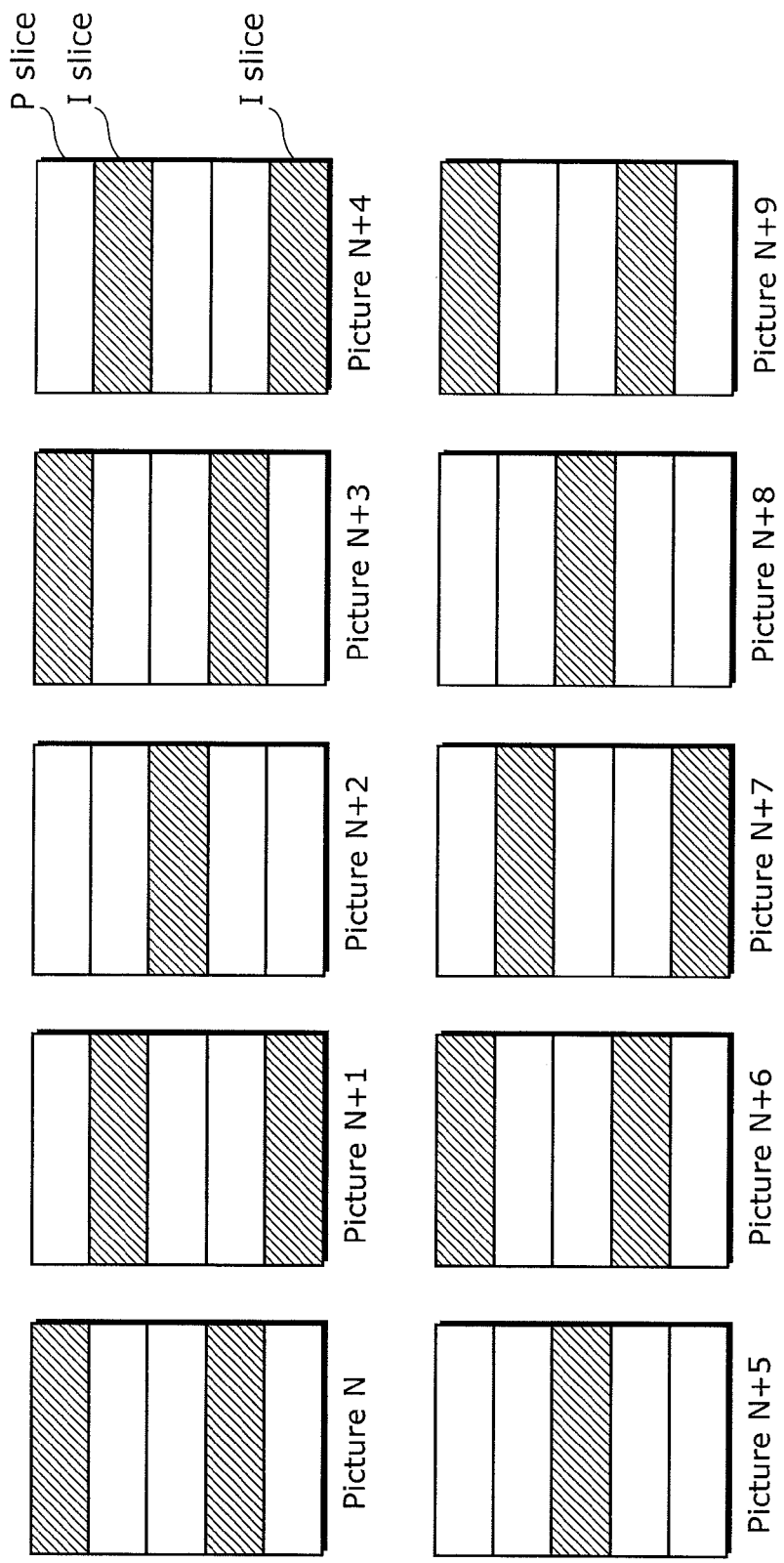
FIG. 26 illustrates an example of divided slices in pictures that are temporally consecutive according to Embodiment 7 in the present invention.
Figure 27A:
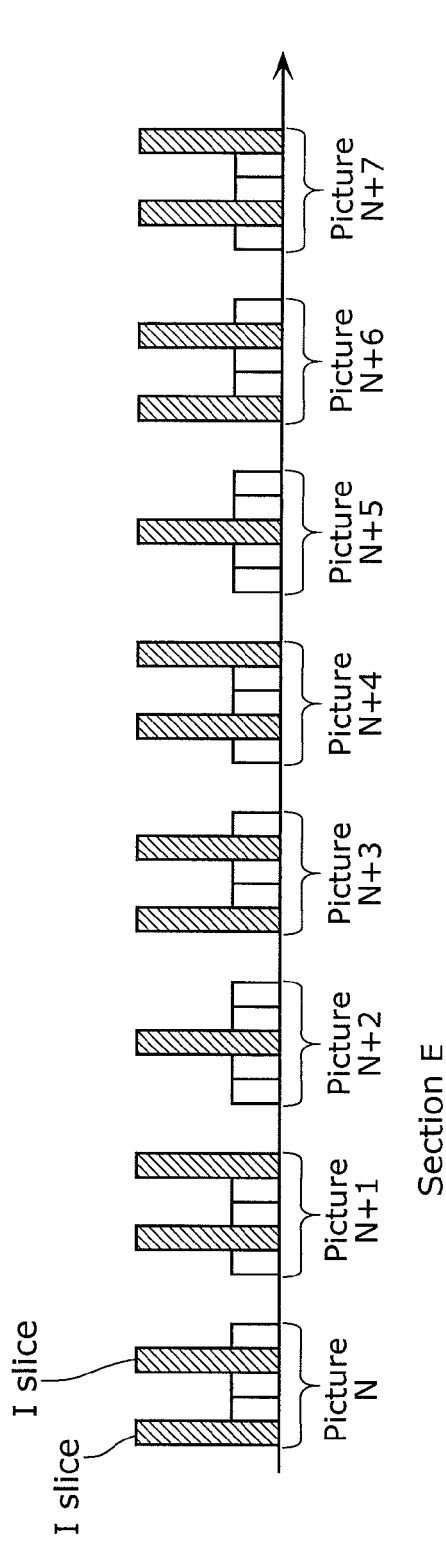
FIG. 27A illustrates an example of the number of bits obtained by coding each slice in time order according to Embodiment 7 in the present invention.
Figure 27B:
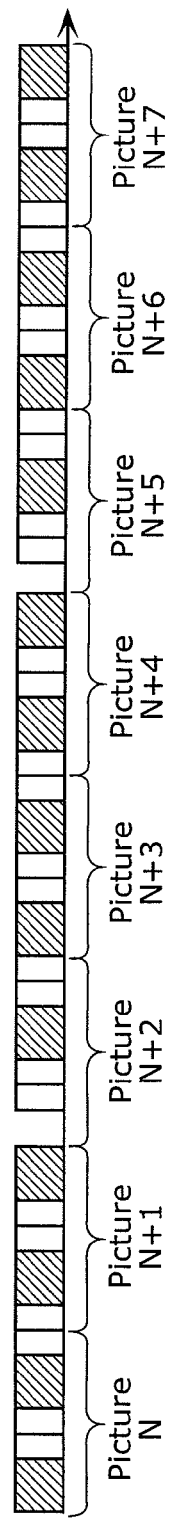
FIG. 27B illustrates an example of the number of bits obtained by coding each slice in time order according to Embodiment 7 in the present invention.

FIG. 26 illustrates an example of divided slices in pictures that are temporally consecutive according to Embodiment 7 in the present invention. FIGS. 27A and 27B illustrate examples of the number of bits obtained by coding each slice in time order according to Embodiment 7 in the present invention.

The difference with the slice division method in FIG. 21 is that each of the temporally consecutive pictures includes not one I-slice but two I-slices at most in the slice division method in FIG. 26. Furthermore, the number of P slices between an I-slice and the subsequent I-slice in the temporally consecutive pictures are 2. As illustrated in FIGS. 27A and 27B, the number of P slices between an I-slice and the subsequent I-slice in the temporally consecutive pictures is fixed (2 herein), so that the number of bits for network transmission can be averaged and the same advantage as that of Embodiment 6 can be obtained.

Furthermore, FIGS. 28, 29, 30, and 31 illustrate another example of divided slices in pictures that are temporally consecutive according to Embodiment 7 in the present invention.

Figure 28:
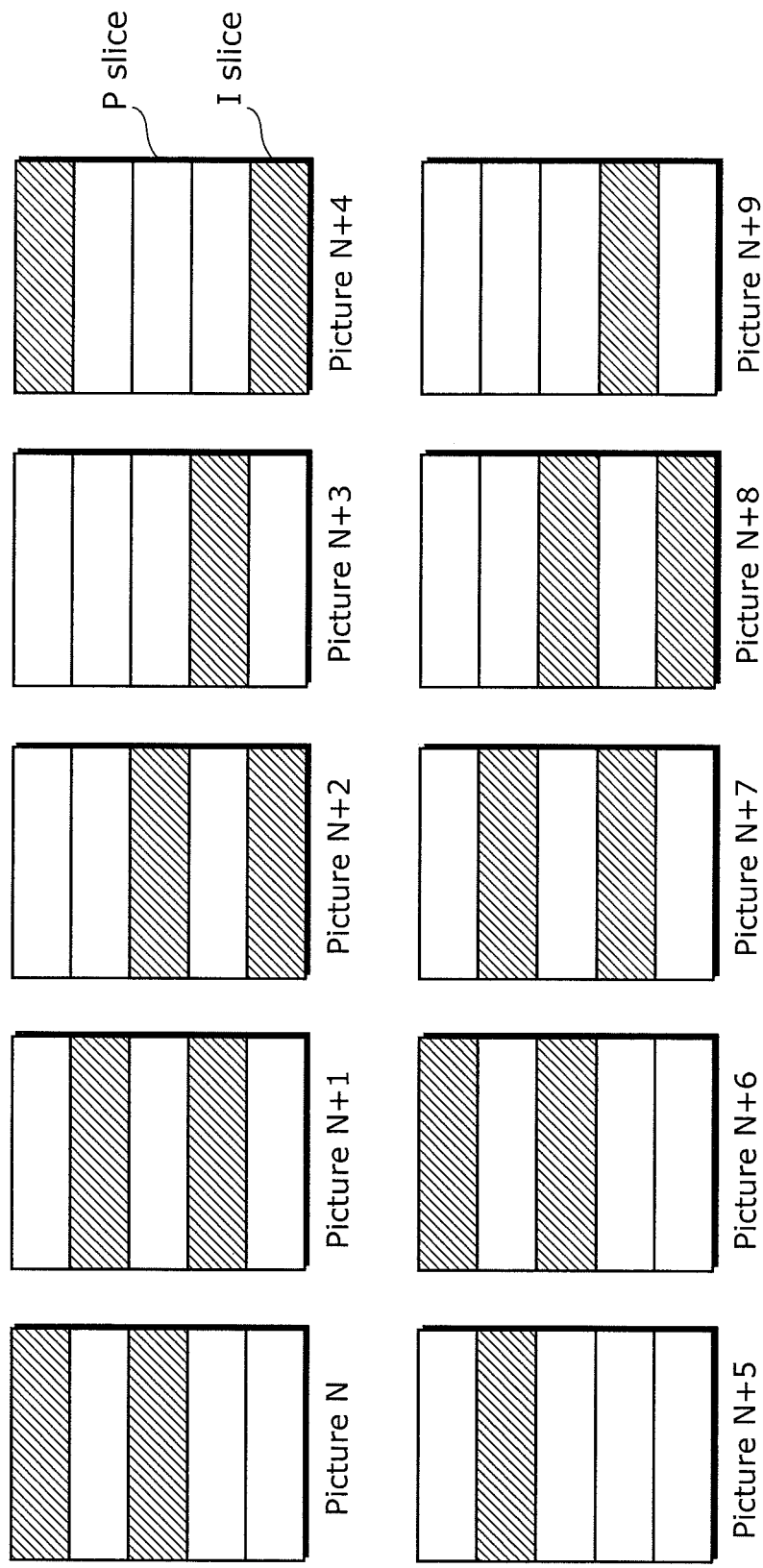
FIG. 28 illustrates another example of divided slices in pictures that are temporally consecutive according to Embodiment 7 in the present invention.

The slice division method in FIG. 28 shows that each of the temporally consecutive pictures includes two I-slices at most. Furthermore, the number of P slices between an I-slice and the subsequent I-slice in the temporally consecutive pictures are 1 and 2.

Figure 29:
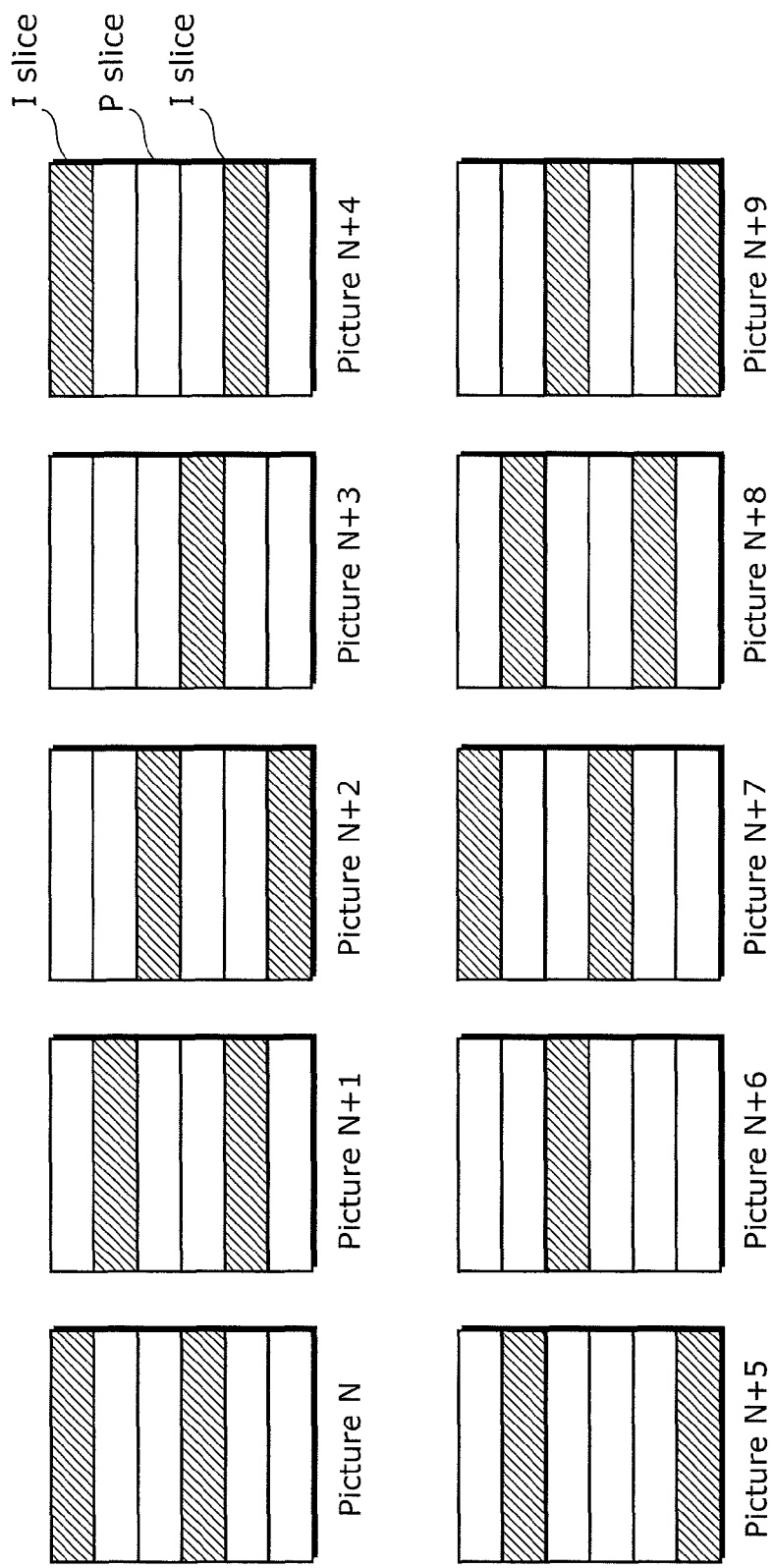
FIG. 29 illustrates another example of divided slices in pictures that are temporally consecutive according to Embodiment 7 in the present invention.
Figure 30:
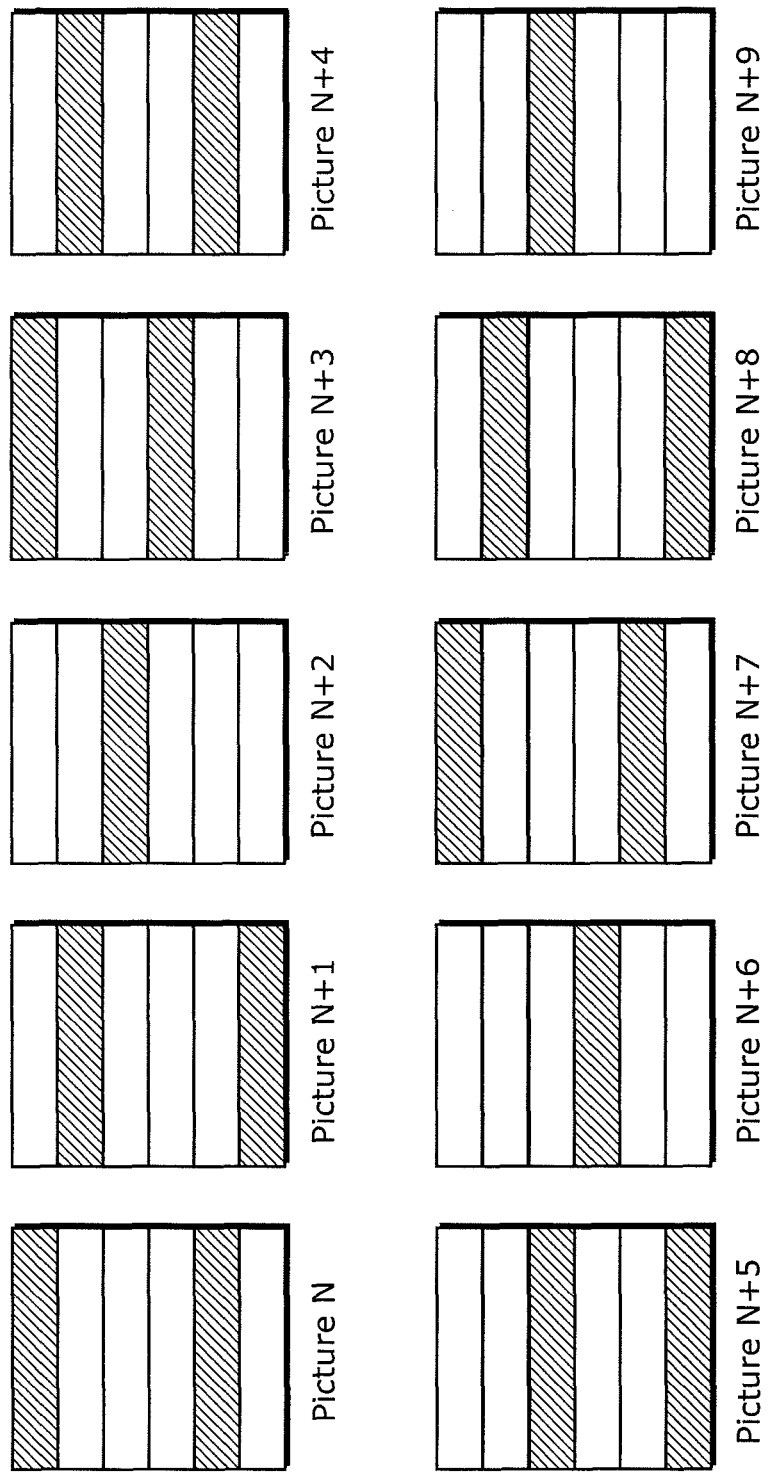
FIG. 30 illustrates another example of divided slices in pictures that are temporally consecutive according to Embodiment 7 in the present invention.

The slice division method in FIGS. 29 and 30 show that each of the temporally consecutive pictures includes two I-slices at most. Furthermore, in the temporally consecutive pictures, the number of P slices between an I-slice and the subsequent I-slice and the number of P slices between the subsequent I-slice and the next but one I-slice are continuously 3 and 2.

Figure 31:
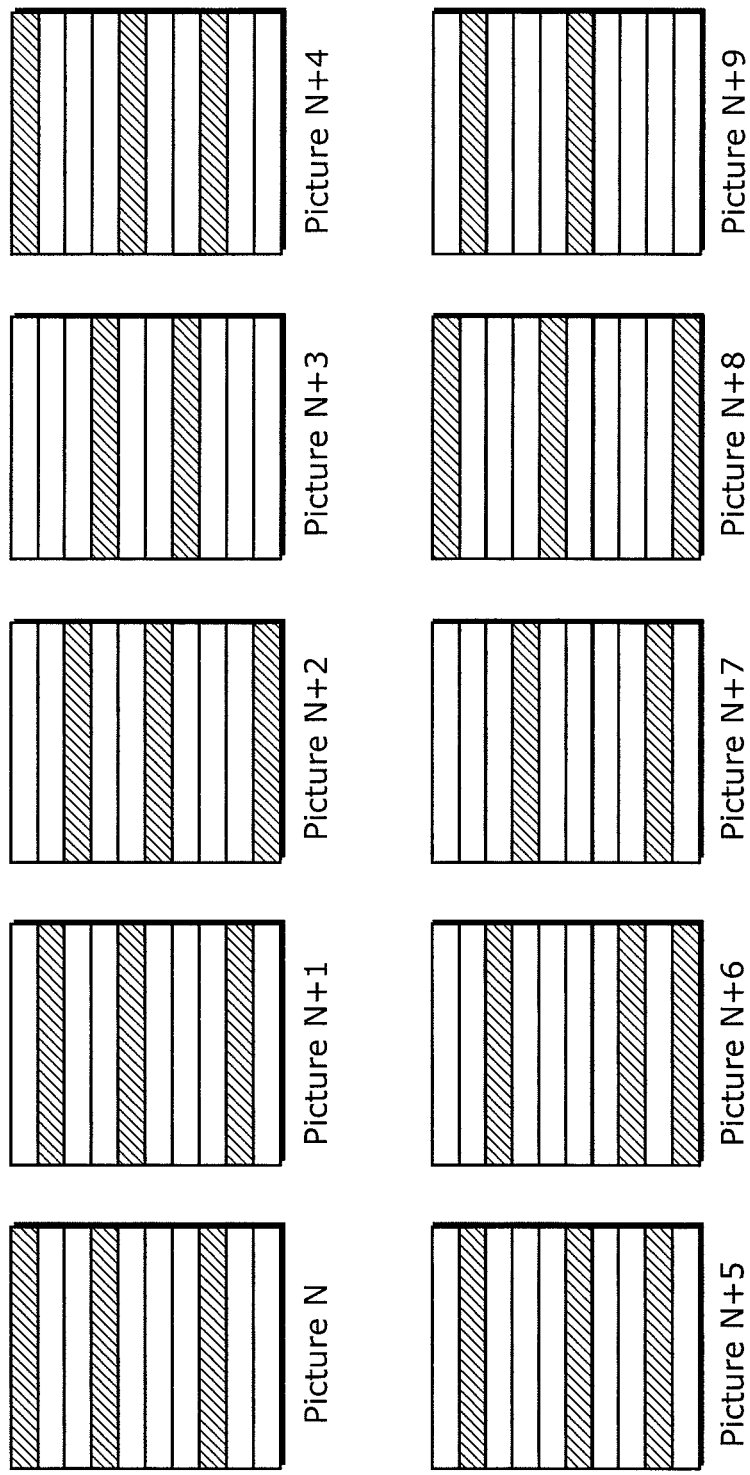
FIG. 31 illustrates another example of divided slices in pictures that are temporally consecutive according to Embodiment 7 in the present invention.

The slice division method in FIG. 31 shows that each of the temporally consecutive pictures includes three I-slices at most. Furthermore, the number of P slices between an I-slice and the subsequent I-slice in the temporally consecutive pictures are continuously 3, 3 and 2.

The number of P slices between an I-slice and the subsequent I-slice in the temporally consecutive pictures can be fixed in these cases, so that the number of bits for network transmission can be averaged and the same advantage as that of Embodiment 6 can be obtained.

The number of bits can be averaged by coding a picture subsequent to the picture where an I-slice is moved to the lowest row as a picture including only P slices having no I-slice. The example will be described as a variation.

Figure 32:
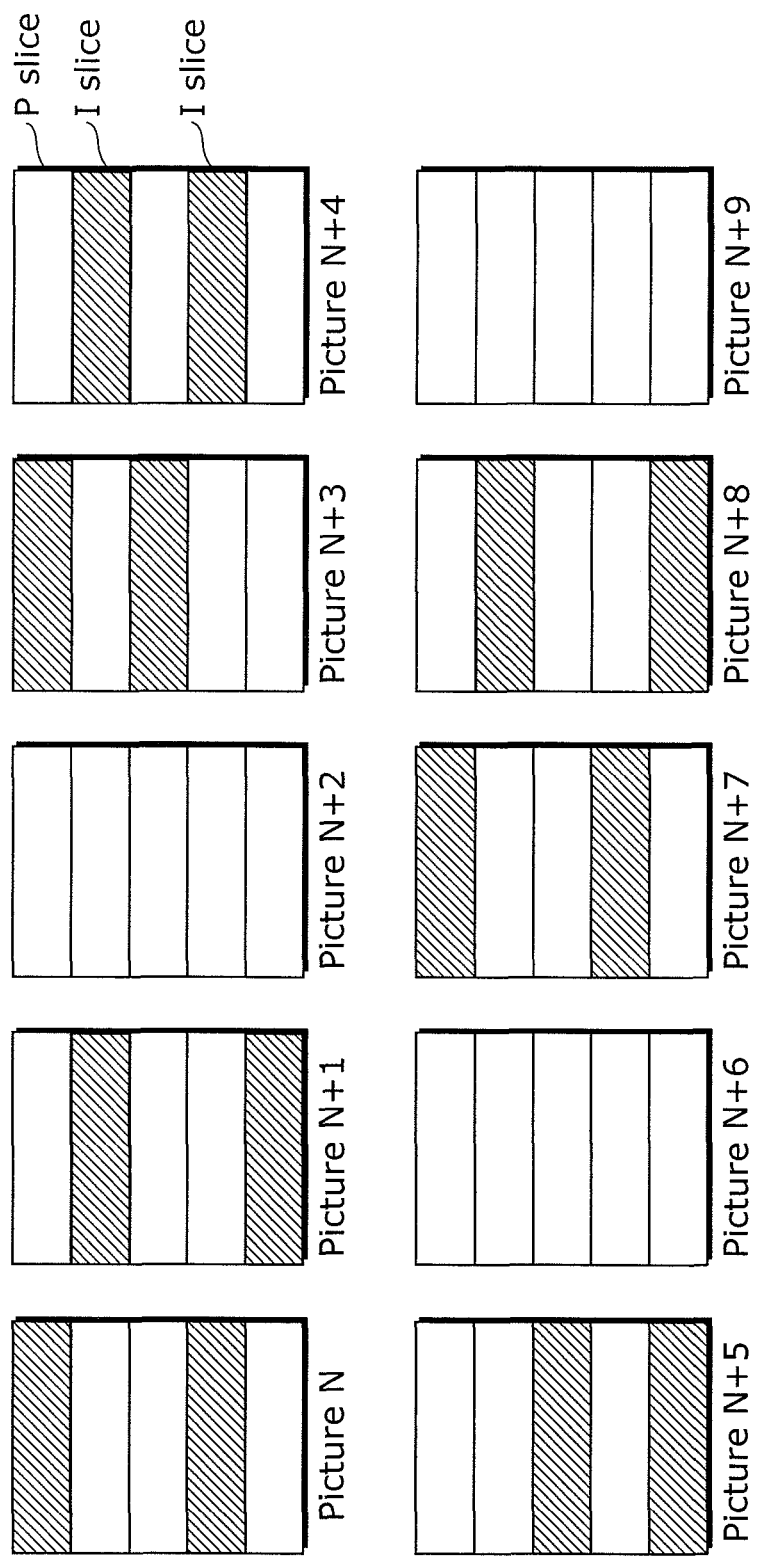
FIG. 32 illustrates an example of divided slices in pictures that are temporally consecutive according to Embodiment 7 in the present invention.
Figure 33A:
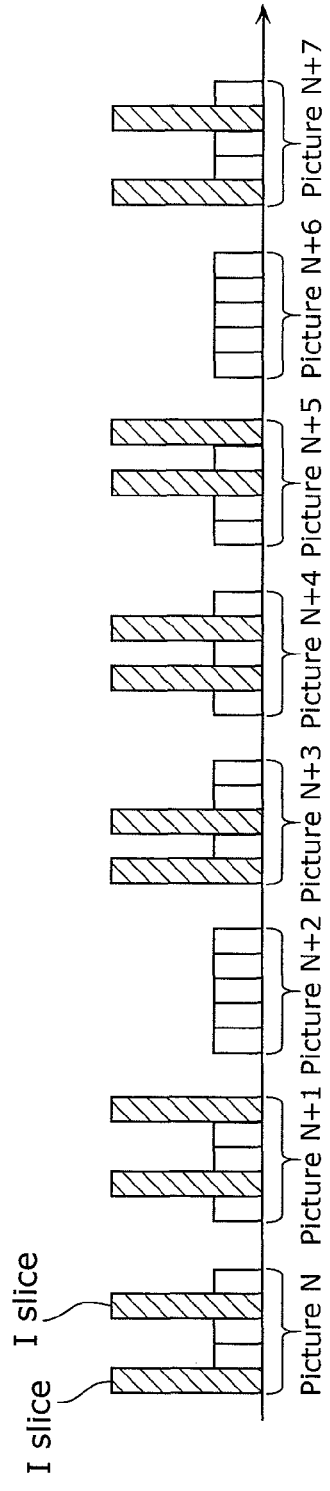
FIG. 33A illustrates an example of the number of bits obtained by coding each slice in time order in FIG. 32.
Figure 33B:
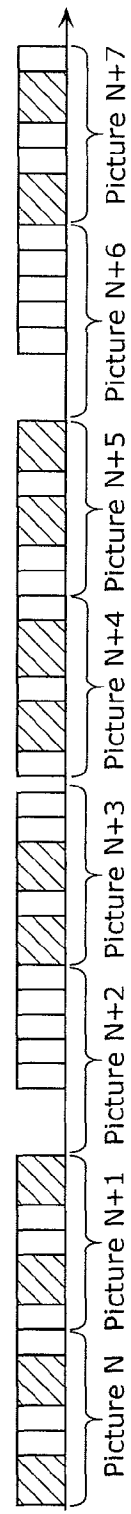
FIG. 33B illustrates an example of the number of bits obtained by coding each slice in time order in FIG. 32.

FIG. 32 illustrates the variation of divided slices in pictures that are temporally consecutive according to Embodiment 7 in the present invention. FIGS. 33A and 33B illustrate examples of the number of bits obtained by coding each of the slices in time order in FIG. 32.

The difference with the slice division method in FIG. 21 is that each of the temporally consecutive pictures includes not one I-slice but two I-slices in the slice division method in FIG. 32. Furthermore, a picture subsequent to the picture in which an I-slice is moved to the lowest row is coded as a picture including only P slices having no I-slice, and the next but one picture is coded so that the I-slice is moved to the highest row. As illustrated in FIGS. 33A and 33B, since I-slices having different numbers of bits can be prevented from being successively transmitted through a network, the number of bits for network transmission can be averaged. The slice division method in FIG. 32 is inferior in that the number of bits are different compared to a case where the number of P slices between an I-slice and the subsequent I-slice in the temporally consecutive pictures is fixed. However, the loss in a part of the stream in the network can be reduced because the I-slices are never adjacent to each other.

Furthermore, FIGS. 34, 35, 36, and 37 illustrate another variation of divided slices in pictures that are temporally consecutive according to Embodiment 7 in the present invention.

Figure 34:
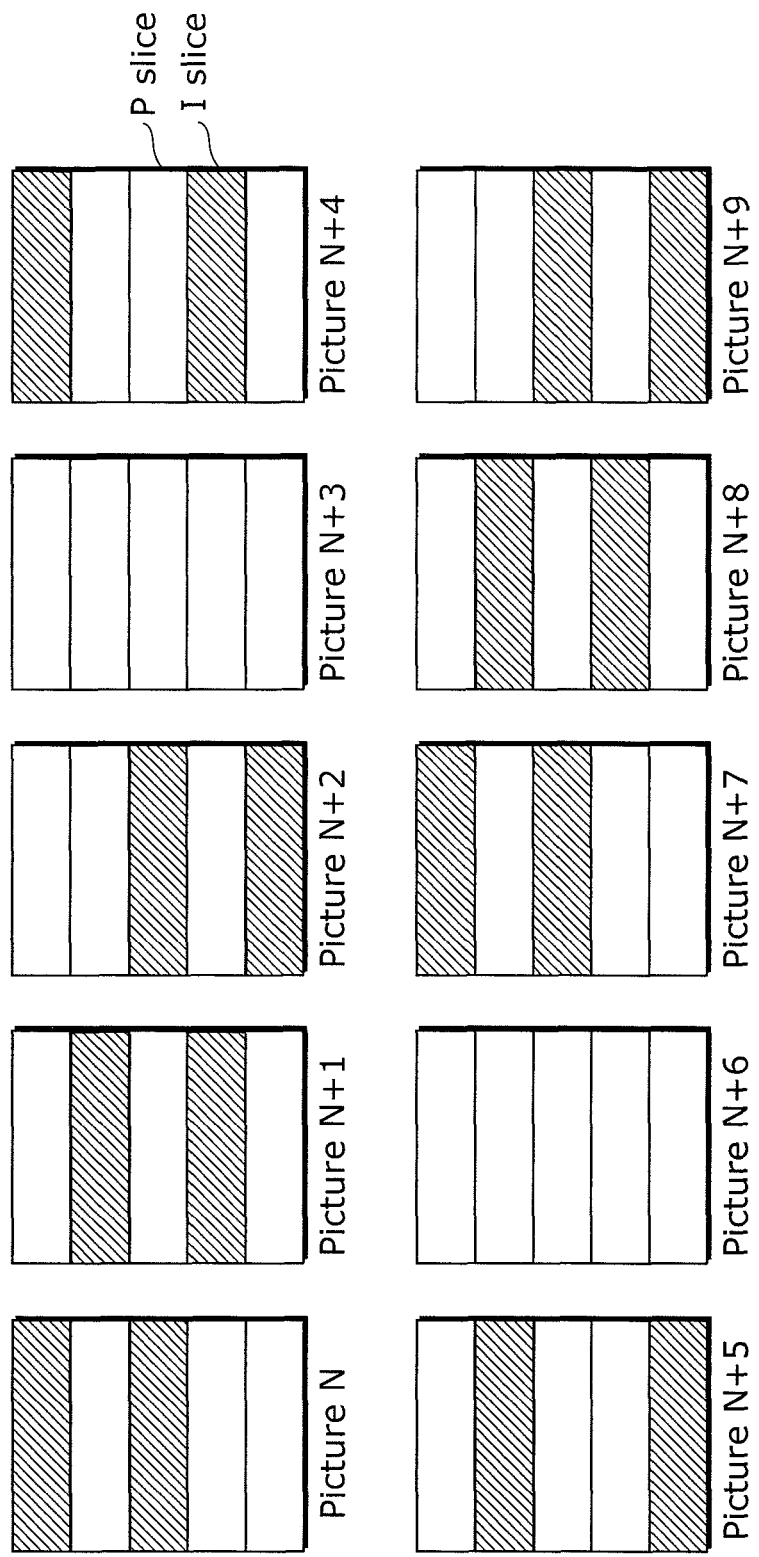
FIG. 34 illustrates another example of divided slices in pictures that are temporally consecutive according to Embodiment 7 in the present invention.
Figure 35:
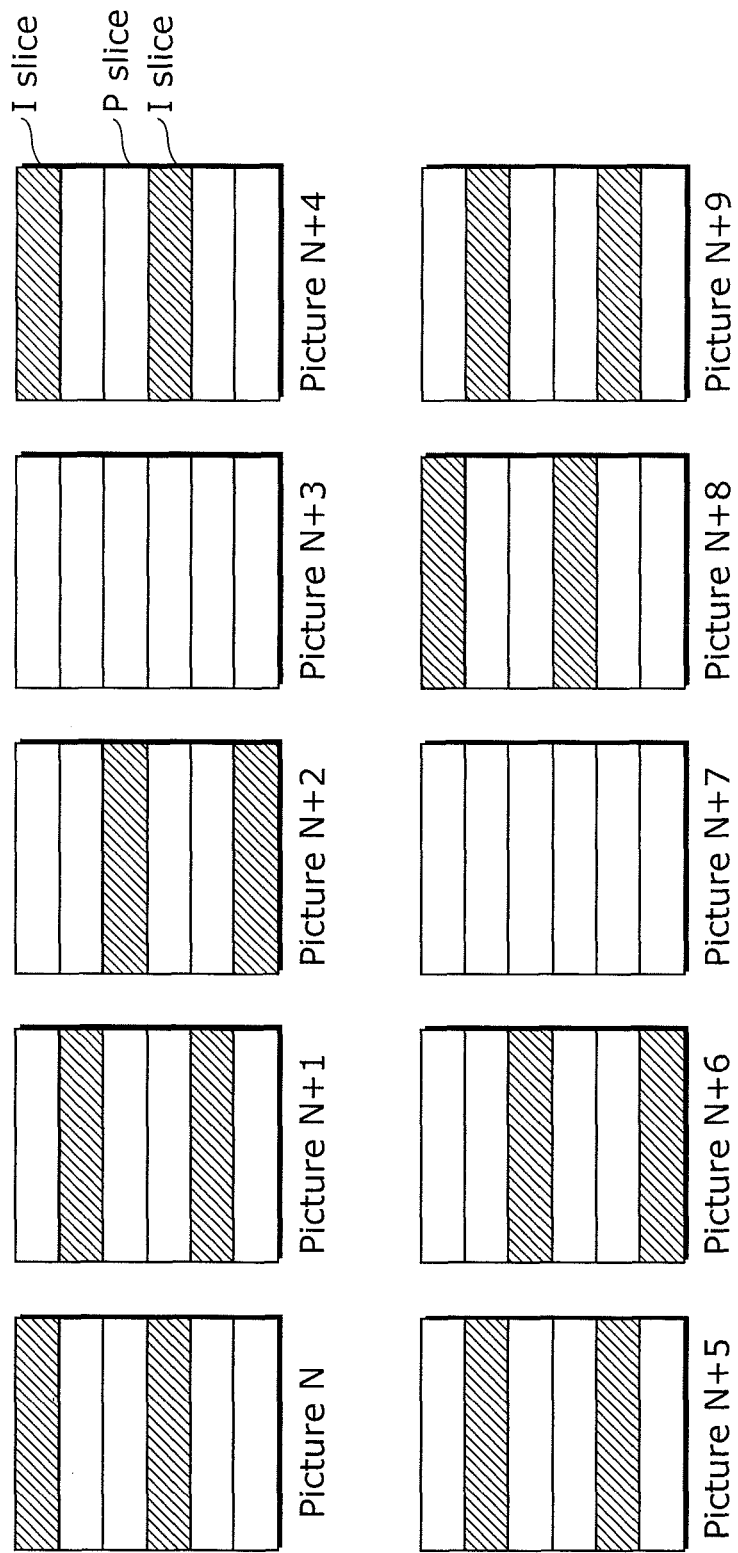
FIG. 35 illustrates another example of divided slices in pictures that are temporally consecutive according to Embodiment 7 in the present invention.
Figure 36:
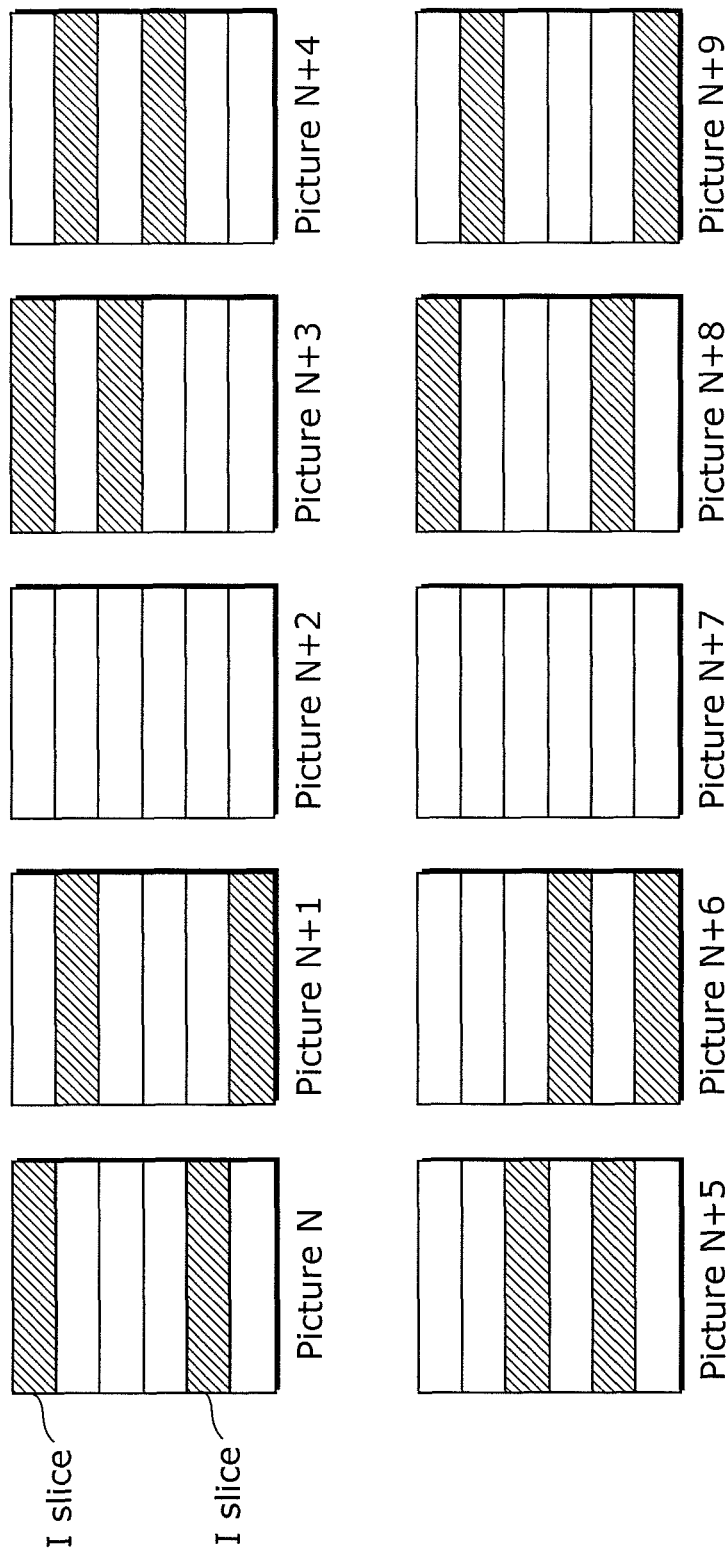
FIG. 36 illustrates another example of divided slices in pictures that are temporally consecutive according to Embodiment 7 in the present invention.

The slice division method in FIGS. 34, 35, and 36 show that each of the temporally consecutive pictures includes two I-slices at most. Furthermore, a picture subsequent to the picture in which an I-slice is moved to the lowest row (a picture N+3 in FIG. 34) is coded as a picture including only P slices having no I-slice, and the next but one picture (a picture N+4 in FIG. 34) is coded so that the I-slice is moved to the highest row. Here, the number of P slices between an I-slice and the subsequent I-slice is fixed in each of the pictures as illustrated in FIG. 34 (2 and 1 in FIG. 34).

Figure 37:
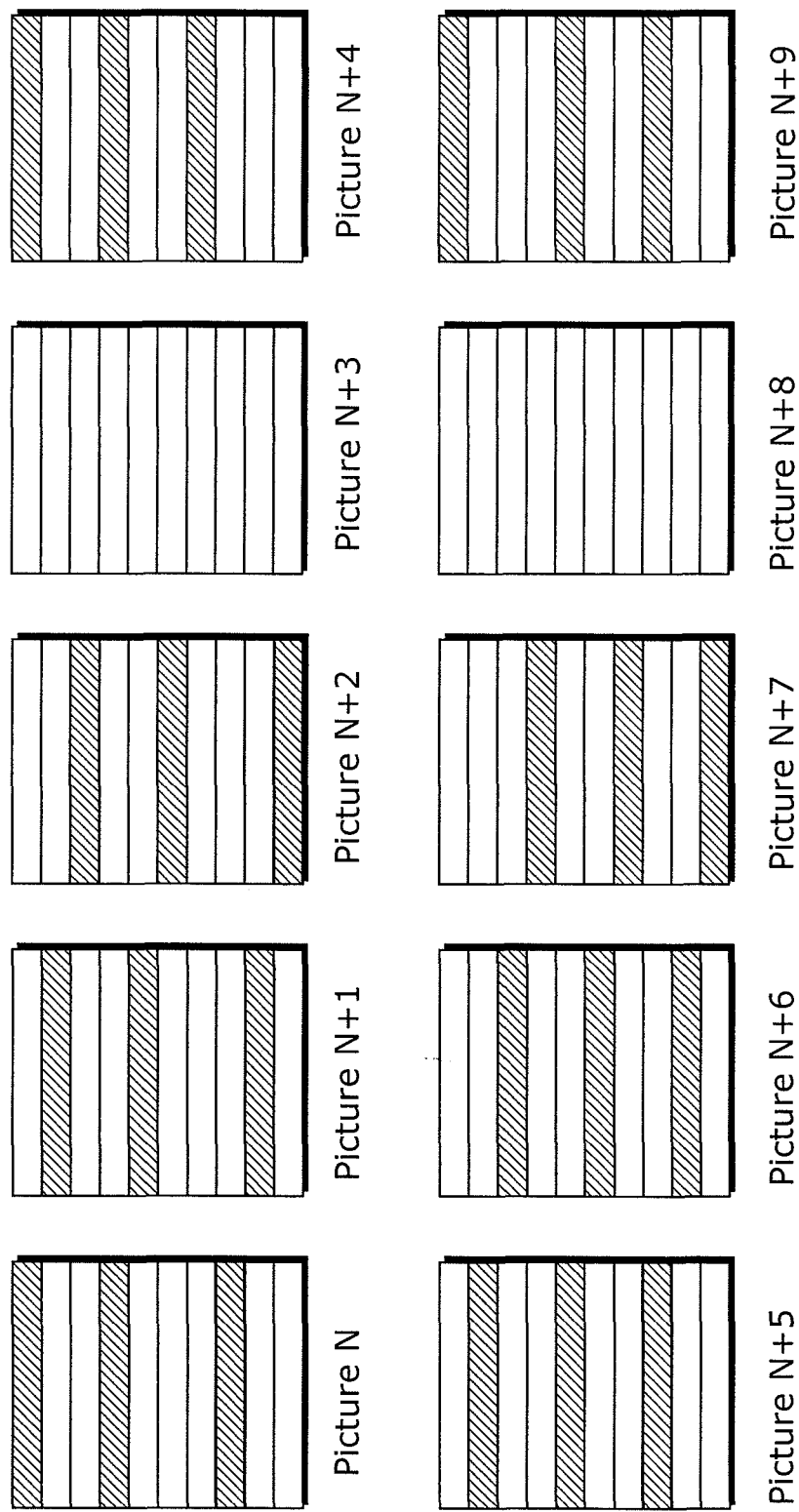
FIG. 37 illustrates another example of divided slices in pictures that are temporally consecutive according to Embodiment 7 in the present invention.

The slice division method in FIG. 37 shows that each of the temporally consecutive pictures includes three I-slices at most, and the other processes are the same as in FIGS. 34, 35, and 36.

The slice division method herein is not limited to the examples illustrated in FIGS. 26 to 37. The positions of I-slices included in each of the temporally consecutive pictures may be different from one another. Furthermore, the number of slices and the number of I-slices included in each of the temporally consecutive pictures may be arbitrarily determined, respectively.

According to Embodiment 7, even when a part of a stream is lost at some point in time and the picture quality of a P slice is deteriorated, in the case where a slice corresponding to the P slice where the stream is previously lost becomes an I-slice in the subsequent picture in time order, pictures subsequent to the picture including the I-slice can be accurately decoded and a stream having a deteriorated picture quality can be restored. Thus, the deterioration of picture quality can be prevented from being endlessly continued. Thus, the picture coding method and the picture coding apparatus for reducing the computational complexity and improving the compression rate can be implemented, while reducing the frequency of the stream transmission loss without interfering with the pipelining and paralleling.

Furthermore, the number of blocks of each P slice between an I-slice and the subsequent I-slice in temporally consecutive pictures is fixed to allow for easy control with a constant bit rate on a per group of consecutive slices basis. Thus, moving pictures whose motion are larger or moving pictures including change in scenes can be coded with a constant bit rate without any significant deterioration in the picture quality, further reducing the frequency of stream transmission loss.

Embodiment 8

Embodiments 1 to 7 describe the picture coding method and the picture coding apparatus for preventing endless continuation of deterioration in picture quality by moving an I-slice from the top to the bottom of each of the temporally consecutive pictures. The picture coding apparatus according to Embodiments 1 to 7 can accurately decode pictures even when a part of a stream is lost at some point in time and the picture quality of a P slice is deteriorated, in the case where a slice corresponding to the P slice where the stream is previously lost becomes an I-slice in the subsequent picture in time order. Thus, the deterioration of picture quality can be prevented from being endlessly continued.

However, since the stream of the picture coding apparatus according to Embodiments 1 to 7 has a structure in which each of pictures includes at least one I-slice and P slices, no I picture including only I-slices is used herein. Thus, the Group Of Pictures (GOP) structure in accordance with MPEG-2 cannot be clearly defined. Thus, the halfway reproduction of the stream might cause displaying moving pictures such that the viewer who watches the stream feels uncomfortable.

Hereinafter, after the description of the GOP structure, the possibility that the viewer may feel uncomfortable will be described.

When the compression using a correlation between pixels in different pictures is performed without pixels of the previous picture, the pixels cannot be accurately decoded. Thus, MPEG-1 and MPEG-2 have introduced the GOP structure using the combined coding of (i) I (intra-) pictures in each of which only compression using a correlation between pixels in a picture is used and (ii) P (inter) pictures in each of which only compression using the correlation between pixels in different pictures is used. Using the GOP structure, pictures subsequent to an I picture can be accurately decoded.

Figure 38:
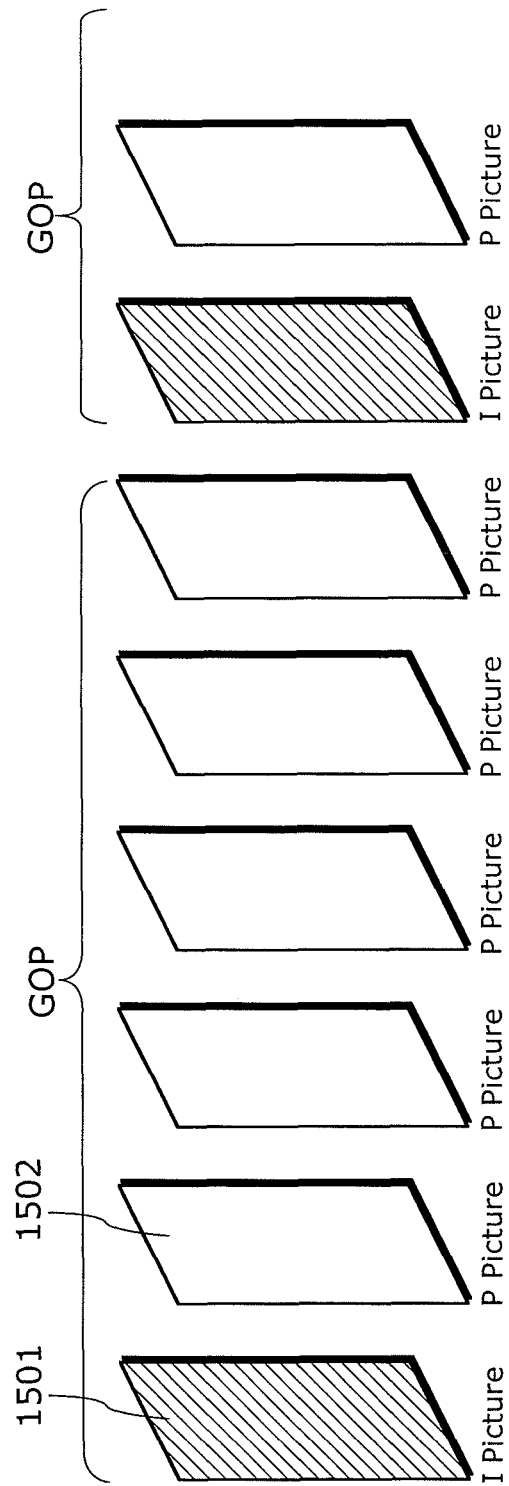
FIG. 38 illustrates a GOP structure in MPEG-2.

FIG. 38 illustrates the GOP structure of MPEG-2 pictures. As illustrated in FIG. 38, a group of pictures including an I picture 1501 and P pictures subsequent to the I picture 1501 is referred to as a GOP. Since the start picture of the GOP is the I picture 1501, no compression is performed using the correlation between pixels of different pictures in different GOPs. Thus, the picture decoding apparatus that receives the GOPs can accurately decode pictures per GOP. The picture decoding apparatus can use each of the GOPs as a unit in random access and for starting decoding in the middle of a decoding operation.

Furthermore, when coded picture data, that is, a stream is transmitted through a network, in the case where a part of the stream is lost due to network congestions, the receiver cannot accurately decode a picture corresponding to the lost part of the stream. Furthermore, the state where the compression using the correlation between pixels in different pictures cannot be used for accurately decoding the picture affects decoding of pictures subsequent to the picture. In other words, deterioration of picture quality continues in the subsequent pictures. However, since no compression using the correlation between pixels of different pictures in different GOPs is performed in the GOP structure, the deterioration of picture quality is restrained per GOP.

Figure 39:
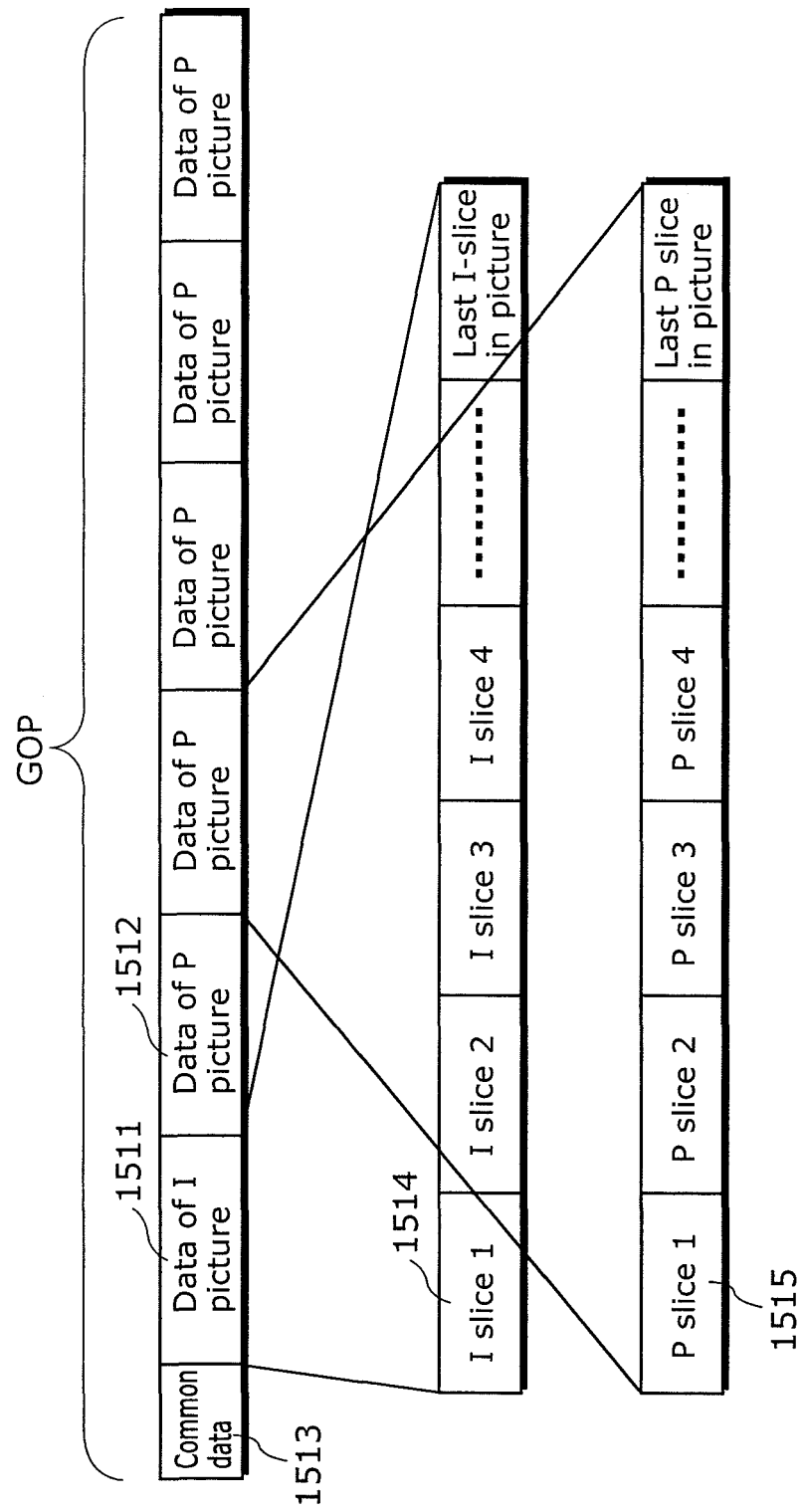
FIG. 39 illustrates a stream structure in MPEG-2.

FIG. 39 illustrates a structure of MPEG-2 streams. As illustrated in FIG. 39, coded data 1511 corresponding to the I picture 1501 and coded data 1512 corresponding to the P picture 1502 are respectively arranged in a stream, in an order defined for the GOP structure as illustrated in FIG. 38. Furthermore, each of the coded data 1511 corresponding to the I picture 1501 and the coded data 1512 corresponding to the P picture 1502 includes coded data of slices. Here, each of the slices is a unit of blocks for coding.

The I picture 1501 includes I (intra-) slices 1521 on which only the compression using the correlation between pixels in a picture is applied. The P picture 1502 includes P (inter) slices 1522 on which the compression using the correlation between pixels in different pictures is applied. In other words, the coded data 1511 corresponding to the I picture 1501 includes a plurality of coded data 1514 of the I-slices 1521, whereas the coded data 1512 corresponding to the P picture 1502 includes a plurality of coded data 1515 of the P slices 1522.

Each of the I-slices 1521 is coded using an intra-slice coding method in which the correlation between pixels in a corresponding one of the I-slices 1521 is applied. Furthermore, the P slices 1522 are coded using the intra-slice coding method or an inter-slice coding method in which a correlation between a pixel of one of the P slices 1522 and a pixel of the other one of the P slices 1522 is applied. In other words, the P slices 1522 are coded using a correlation between pixels within one of the P slices 1522, a correlation between pixels of one of the P slices 1522 and a slice other than the P slices 1522 in a picture, or a correlation between pixels of one of the P slices 1522 and a slice in another picture.

Furthermore, common data 1513 to be shared among all of the pictures in a GOP is given at the head of the GOP. Thus, as long as the picture decoding apparatus can accurately obtain a stream on a per GOP basis, it can accurately decode all of the pictures in the GOP.

Thus, the picture decoding apparatus can reproduce the stream on a per GOP basis in random access and for the halfway reproduction.

On the other hand, the I-slices 1521 and the P slices 1522 can be mixed within one picture in accordance with H.264. In accordance with H.264, each of the I-slices 1521 is coded using the intra-slice coding method, and the P slices 1522 are coded using the inter-slice coding method or the intra-slice coding method as in MPEG-2.

Figure 40:
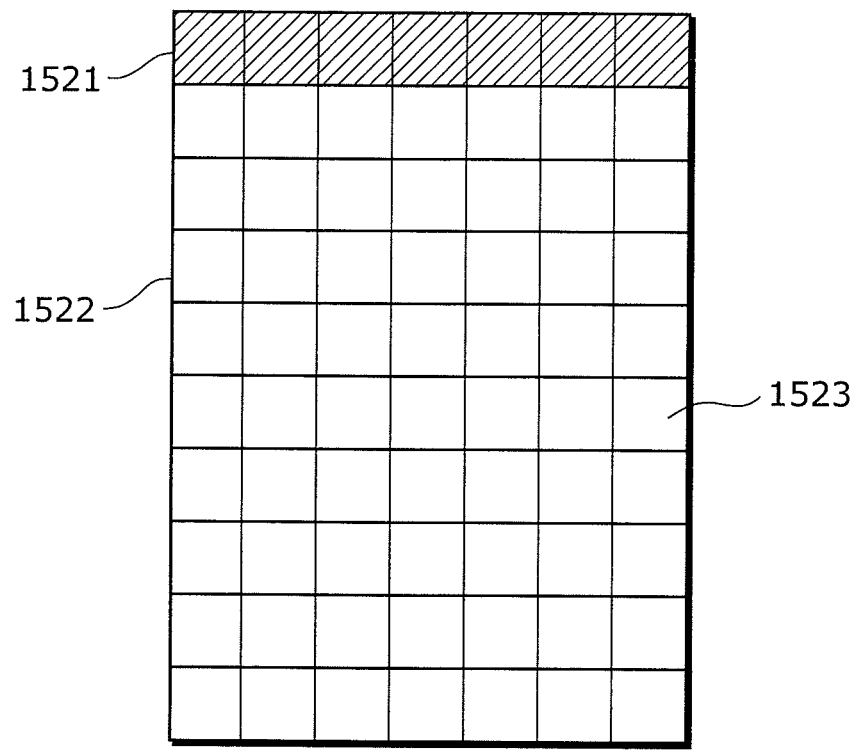
FIG. 40 illustrates an example of a slice structure in H.264.

FIG. 40 illustrates an example of divided slices in a picture in accordance with H.264. As illustrated in FIG. 40, the picture can be composed of the I-slice 1521 and the P slices 1522 in accordance with H.264, unlike the picture in MPEG-2. Here, since the I-slice 1521 is coded without using the correlation between pixels in different pictures (slices), the picture can be accurately decoded independent of the presence or absence of pixels in the previous picture.

However, when each picture includes the I-slice 1521 and the P slices 1522 as illustrated in FIG. 40, the I picture 1501 only including the I-slices 1521 is not present as in MPEG-2. Thus, the common data 1513 cannot be arranged immediately prior to the I picture 1501. In other words, since the GOPs cannot be clearly defined using the picture coding method according to Embodiments 1 to 7, there is a possibility that moving pictures for which the viewer may feel uncomfortable may be displayed during the halfway reproduction.

More specifically, when the I-slice 1521 is in the vicinity of the center of the picture, only the image in the vicinity of the center is first displayed. Thus, there is a possibility that the viewer may feel uncomfortable.

Thus, an example that the picture coding apparatus according to Embodiments 1 to 7 generates a moving picture stream with which moving pictures causing the viewer to hardly feel uncomfortable are displayed during the halfway reproduction of the stream.

Figure 41:
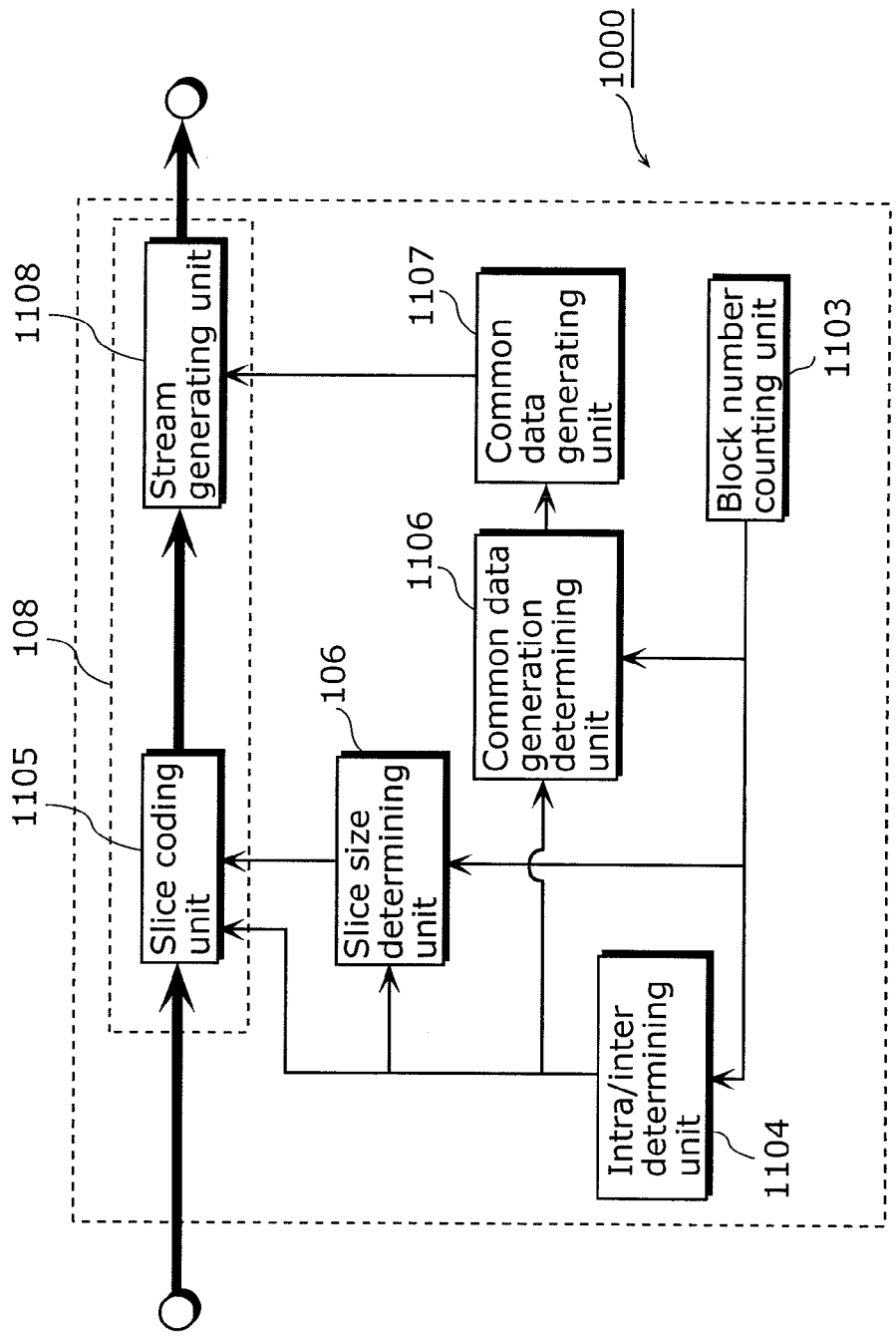
FIG. 41 is a block diagram of a picture coding apparatus according to Embodiment 8 in the present invention.

FIG. 41 is a block diagram of a picture coding apparatus 1000 according to an implementation of the present invention.

The picture coding apparatus 1000 includes a block number counting unit 1103, an intra/inter determining unit 1104, a slice size determining unit 106, a video encoder 108, a common data generation determining unit 1106, and a common data generating unit 1107. The same numerals are used for the same elements in FIG. 10, and thus the detailed description will be omitted.

The block number counting unit 1103 measures a position of a block to be coded in a picture by counting the number of blocks to be coded. Furthermore, the block number counting unit 1103 generates block position information indicating the position of a block to be coded in a picture, and notifies the intra/inter determining unit 1104 and the common data generation determining unit 1106 of the generated block position information.

The intra/inter determining unit 1104 determines whether a slice to be coded is one of an I-slice and a P slice, using the block position information notified by the block number counting unit 1103. In other words, the intra/inter determining unit 1104 divides a picture to be coded into at least an I-slice and P slices.

Furthermore, the intra/inter determining unit 1104 notifies the common data generation determining unit 1106 and a slice coding unit 1105 included in the video encoder 108 of slice information indicating the determined slice type (one of the I-slice and P slice).

The description of the slice size determining unit 106 including the same constituent elements described in Embodiments 1 to 7 will be omitted.

When the intra/inter determining unit 1104 notifies that the slice to be coded is the I-slice, the common data generation determining unit 1106 determines whether the I-slice to be coded is at the top of a picture, using the block position information notified by the block number counting unit 1103. Furthermore, the common data generation determining unit 1106 notifies the common data generating unit 1107 of a result of the determination.

When the common data generation determining unit 1106 notifies that the slice to be coded is the I-slice and is at the top of the picture, the common data generating unit 1107 generates common data by coding the common data referred to by a plurality of pictures.

The video encoder 108 includes the slice coding unit 1105 and a stream generating unit 1108. The video encoder 108 performs coding using a coding method (intra-picture coding or inter picture coding) enabling use of an input picture on a block unit basis, based on the slice information indicating the slice type notified by the intra/inter determining unit 104, per slice that is determined every slice division position notified by the slice size determining unit 106.

More specifically, the slice coding unit 1105 generates coded data per slice, by coding the input picture as one of the I-slice and the P slice, based on the slice information notified by the intra/inter determining unit 104, per slice that is determined every slice division position notified by the slice size determining unit 106. When the common data generating unit 1107 generates the common data, the stream generating unit 1108 provides a stream including common data generated by the common data generating unit 1107 and coded data obtained by the slice coding unit 1105 subsequent to the common data. When the common data generating unit 1107 does not generate the common data, the stream generating unit 1108 provides a stream including only coded data obtained by the slice coding unit 1105.

With the configuration, the picture coding apparatus 1000 moves the I-slice from the top to the bottom of each of the temporally consecutive pictures, as described in Embodiments 1 to 7. Furthermore, the picture coding apparatus 1000 generates a stream which includes common data referred to by the pictures, immediately prior to a picture in which the I-slice is at the top. Since an area to be accurately displayed increases from the top to the bottom of the pictures in the case of the halfway reproduction of this stream, the uncomfortable feeling of the viewer can be reduced.

The method of moving the I-slice from the top to the bottom of each of the pictures may be combined with the following one of 1) and 2) or both of 1) and 2) in the picture coding apparatus 1000.

1) Increasing the number of blocks included in a P slice rather than that of an I-slice.

2) Fixing the number of P slices to be inserted between an I-slice and the subsequent I-slice in the consecutive pictures.

Furthermore, the slice size determining unit 106 may not be explicitly included in the picture coding apparatus 1000. In such a case, a picture coding apparatus may generate a stream which includes common data referred to by the pictures, immediately prior to a picture in which the I-slice is at the top in order to move the I-slice from the top to the bottom of each of the pictures. Embodiment 9 will be described using the picture coding apparatus as a premise.

Embodiment 9

A picture coding apparatus 1100 moves an I-slice from the top to the bottom of each of temporally consecutive pictures, according to Embodiment 9 of the present invention. Furthermore, the picture coding apparatus 1100 generates a stream which includes common data referred to by the pictures, immediately prior to a picture in which the I-slice is at the top. Since an area to be accurately displayed increases from the top to the bottom of the pictures in the case of the halfway reproduction of this stream, the uncomfortable feeling of the viewer can be reduced. Furthermore, Embodiment 9 will be described under an assumption that each of the pictures is divided into slices on a row unit basis hereinafter.

First, a configuration of the picture coding apparatus 1100 according to Embodiment 9 in the present invention will be described.

Figure 42:
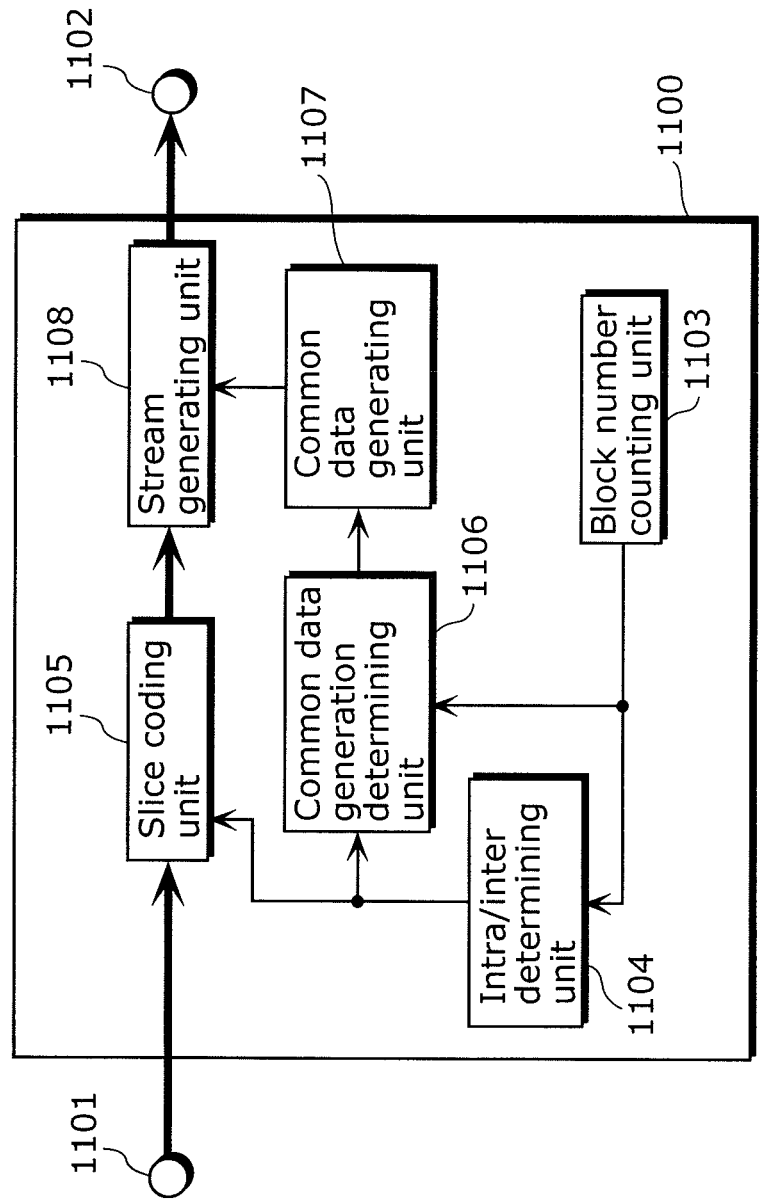
FIG. 42 is a block diagram of a picture coding apparatus according to Embodiment 9 in the present invention.

FIG. 42 is a block diagram of the picture coding apparatus 1100 according to Embodiment 9 in the present invention.

The picture coding apparatus 1100 in FIG. 42 divides each of the pictures included in an input picture into slices each including blocks. Furthermore, the picture coding apparatus 1100 codes each of the obtained slices per block to generate a stream 1102 including the coded data, and provides the generated stream 1102.

The picture coding apparatus 1100 includes a block number counting unit 1103, an intra/inter determining unit 1104, a slice coding unit 1105, a common data generation determining unit 1106, a common data generating unit 1107, and a stream generating unit 1108.

The block number counting unit 1103 measures a position of a block to be coded in a picture by counting the number of blocks to be coded. Furthermore, the block number counting unit 1103 generates block position information indicating the position of a block to be coded in a picture, and notifies the intra/inter determining unit 1104 and the common data generation determining unit 1106 of the generated block position information.

The intra/inter determining unit 1104 determines whether a slice to be coded is one of an I-slice 1201 and a P slice 1202, using the block position information notified by the block number counting unit 1103. In other words, the intra/inter determining unit 1104 divides a picture to be coded into the I-slice 1201 and the P slice 1202.

More specifically, the intra/inter determining unit 1104 determines the slice to be coded as one of the I-slice 1201 and the P slice 1202 so that the I-slices 1201 are moved (are displaced) one by one in display order, from the top to the bottom of the temporally consecutive pictures. Furthermore, the intra/inter determining unit 1104 determines the slice to be coded as one of the I-slice 1201 and the P slice 1202 so as to repeat the moving of the I-slice 1201 from the top to the bottom for each of a predetermined number of pictures.

Furthermore, the intra/inter determining unit 1104 notifies the slice coding unit 1105 and the common data generation determining unit 1106 of slice information indicating whether the determined slice to be coded is the I-slice 1201 or the P slice 1202.

Figure 43:
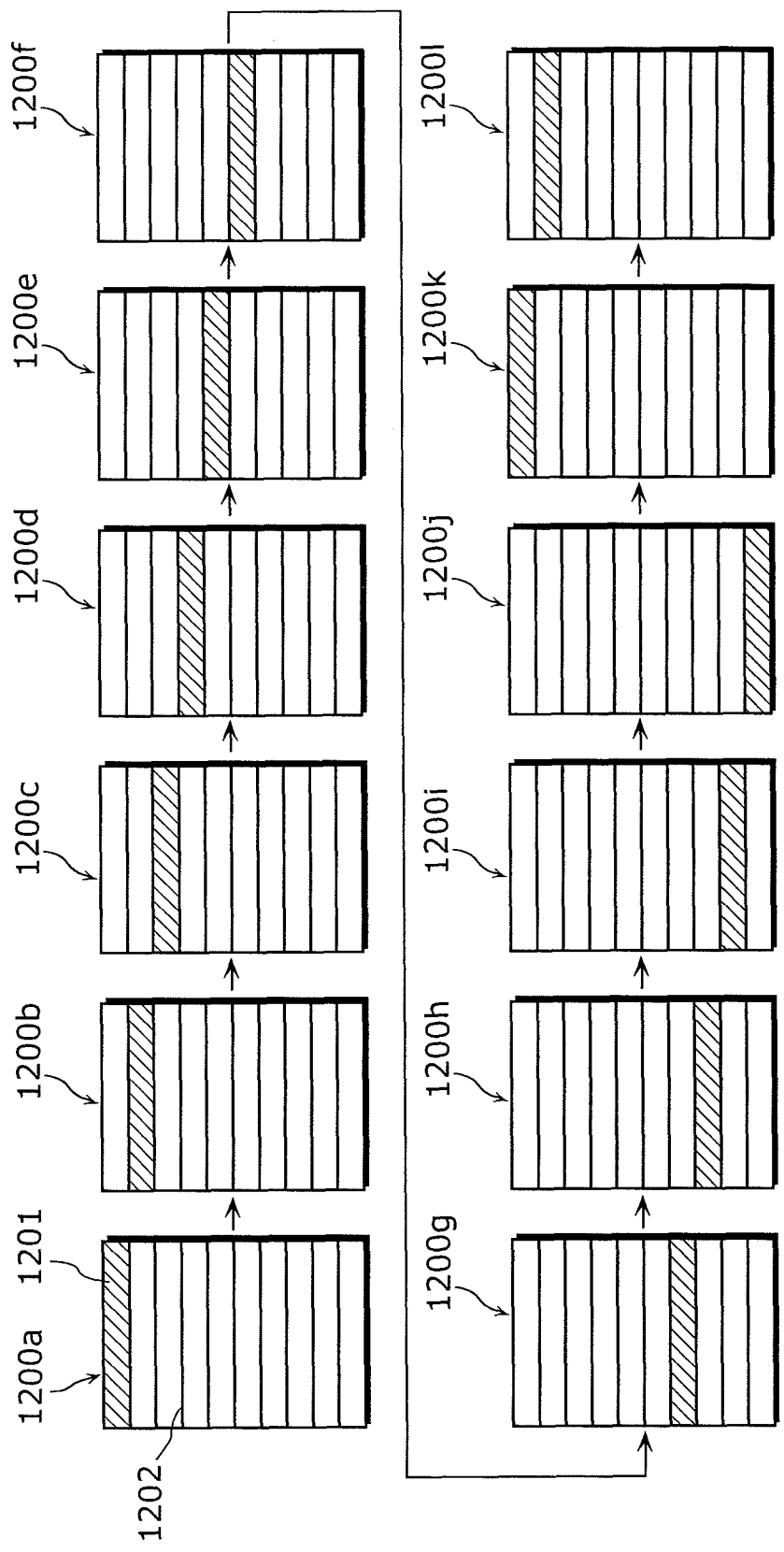
FIG. 43 illustrates an example of divided slices in each of pictures according to Embodiment 10 in the present invention.

FIG. 43 illustrates an example of divided slices in pictures 1200 by the picture coding apparatus 1100. The pictures 1200a to 1200l are the pictures consecutive in alphabetical order. When the pictures 1200a to 1200l are not particularly distinguished from one another, they are denoted as the pictures 1200.

As illustrated in FIG. 43, each of the pictures 1200 includes the (diagonally shaded) I-slice 1201 and the (not diagonally shaded) P slice 1202. Here, the I-slice 1201 is a slice on which only the compression (intra-slice coding) using a correlation between pixels in the I-slice 1201 (within one of the pictures 1200) is performed. Furthermore, the P slice 1202 is a slice on which one of compressions (i) to (iii) is performed: (i) the compression using a correlation between pixels in the P slice 1202 (intra-slice coding); (ii) the compression using a correlation between a pixel of the P slice 1202 and a pixel of another slice other than the P slice 1202 included in the one of pictures 1200; and (iii) the compression using a correlation between a pixel of the P slice 1202 and a pixel of a slice in one of the pictures 1200 except for a picture including the P slice 1202 (intra-slice coding). In other words, the I-slice 1201 includes only blocks in each of which the intra-slice coding is performed, and the P slice 1202 includes only blocks in each of which the inter-slice coding is performed, or blocks in each of which the intra-slice coding is performed and blocks in each of which the inter-slice coding is performed.

Furthermore, the I-slice 1201 is at the top of the picture 1200a, and the I-slice 1201 is moved down one slice in the subsequent picture 1200b. Furthermore, the I-slice 1201 is moved down slice by slice for each of the pictures 1200. In the picture 1200k that is subsequent to the picture 1200j in which the I-slice 1201 is at the bottom, the I-slice 1201 is returned to the top of the picture.

In Embodiment 9 of the present invention, the pictures 1200a and 1200k in each of which the I-slice 1201 is in the first row are the starting pictures in the GOP. Thus, the pictures 1200a to 1200j compose one GOP, and the pictures starting from the picture 1200k compose another GOP in FIG. 43.

Thus, each of the pictures 1200 according to Embodiment 9 of the present invention includes the I-slice 1201 resilient to loss in the stream due to a reference picture and the P slice 1202 that is not resilient to loss in the stream due to a reference picture but has a higher compression rate. Furthermore, the positions of the I-slices 1201 circulate in the pictures, per picture. Thereby, even when a part of the stream is lost due to a packet loss and/or others during the network transmission, resulting in deterioration of the picture quality of the P slice 1202, the subsequent picture in which the I-slice 1201 is located where the picture quality is previously deteriorated can be decoded without the deterioration in the picture quality. Thus, the picture coding apparatus 100 according to Embodiment 9 of the present invention can prevent the deterioration of picture quality from being endlessly continued.

Furthermore, each of the pictures includes, equally in number (including the same number of blocks), at least the I-slice 1201 having the larger number of bits than that of the P slice 1202, according to Embodiment 9 in the present invention. Thus, the number of bits of each of the pictures becomes almost constant. Here, when a coded stream is transmitted through a network at a fixed bit rate, in order that the receiver decodes the received stream and seamlessly displays the decoded pictures at fixed intervals, it is necessary to provide a delay time for securing sufficient time for completing the transmission of a corresponding one of the pictures 1200 that takes the longest time for transmission. Since the largest value of the number of bits of the pictures 1200 can be reduced by making the number of bits per picture constant (eliminating the pictures including the larger number of the I-slices 1201) according to Embodiment 9 in the present invention, the largest value of the time necessary for transmission of the corresponding one of the pictures 1200 can be reduced, leading to reduction in the delay time.

The slice coding unit 1105 codes the input picture 1101 as one of the I-slice 1201 and the P slice 1202, based on the slice information notified by the intra/inter determining unit 1104 to generate the coded data per slice (hereinafter referred to as slice coded data). More specifically, the slice coding unit 1105 codes the I-slice 1201 per block using the correlation between pixels within the I-slice 1201. Then, the slice coding unit 1105 codes the P slice 1202 per block using a correlation between pixels within the P slice 1202, a correlation between a pixel of the P slice 1202 and a pixel of a slice other than the P slice 1202 in one of the pictures 1200, or a correlation between a pixel of the P slice 1202 and a pixel of a slice in another picture. With these configurations, the coded data per picture (hereinafter referred to as picture coded data) is generated. The picture coded data includes a plurality of slice coded data.

When the intra/inter determining unit 1104 notifies that the slice to be coded is the I-slice 1201, the common data generation determining unit 1106 determines whether the I-slice 120 to be coded is at the top of a picture, using the block position information notified by the block number counting unit 1103. Furthermore, the common data generation determining unit 1106 notifies the common data generating unit 1107 of a result of the determination.

When the common data generation determining unit 1106 notifies that the slice to be coded is the I-slice 1201 and is at the top of the picture, the common data generating unit 1107 generates common data 1211 by coding the common data referred to by a plurality of pictures.

When the common data generating unit 1107 generates the common data, the stream generating unit 1108 provides a stream 1102 in which coded data obtained by the slice coding unit 1105 is arranged subsequent to the common data generated by the common data generating unit 1107. When the common data generating unit 1107 does not generate the common data 1211, the stream generating unit 1108 provides a stream including only coded data obtained by the slice coding unit 1105. In other words, the stream generating unit 1108 arranges the common data 1211 immediately prior to the picture coded data obtained by coding a picture in which the I-slice 1201 is either at the top or bottom of the picture. Furthermore, the stream generating unit 1108 arranges the common data 1211 only immediately prior to the picture coded data obtained by coding a picture in which the I-slice 1201 is either at the top or bottom of the picture.

Figure 44:
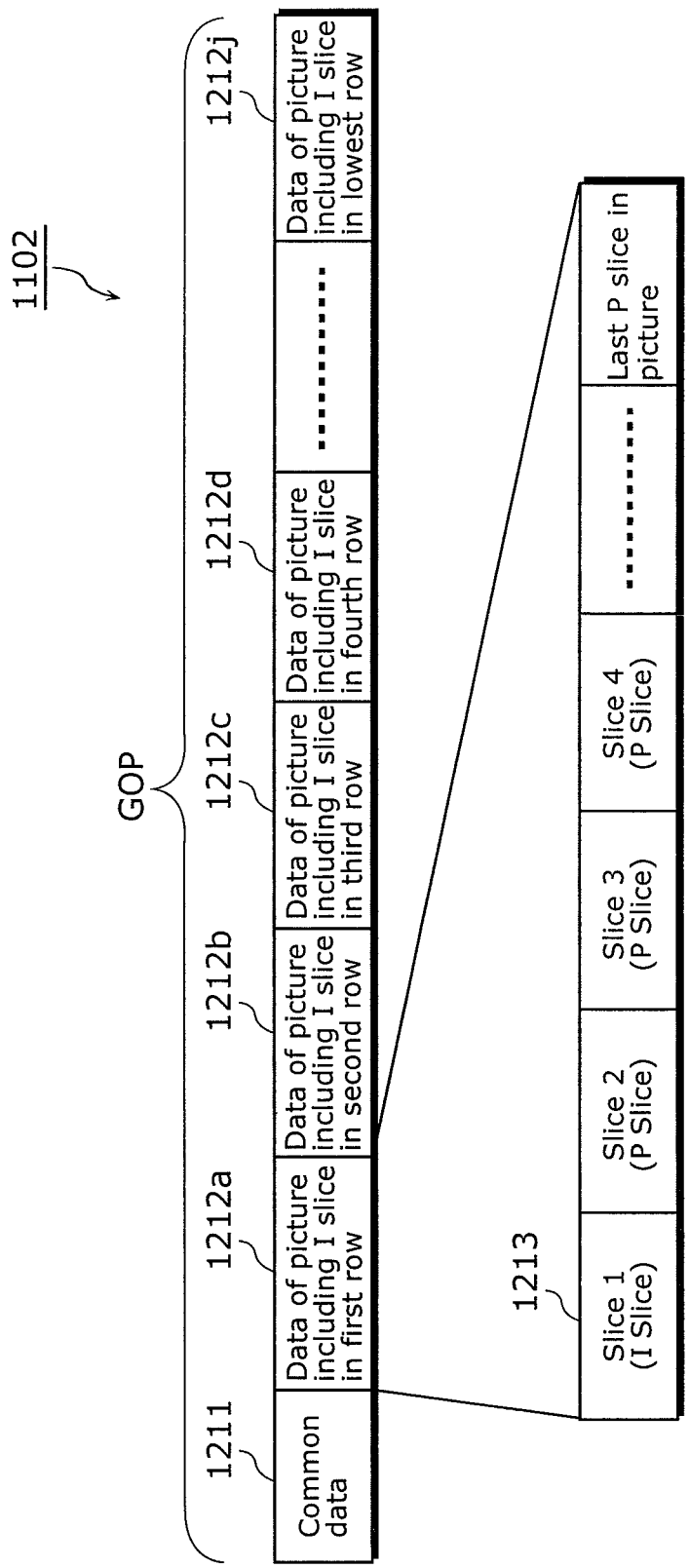
FIG. 44 illustrates a stream structure according to Embodiment 9 in the present invention.

FIG. 44 illustrates a coded stream 1102 generated by the picture coding apparatus 1100 according to Embodiment 9 in the present invention. Furthermore, FIG. 44 illustrates a structure of the coded stream 1102 obtained by coding the pictures in FIG. 43.

The stream 1102 includes the common data 1211 and a plurality of picture coded data 1212*a* to 1212*j* as illustrated in FIG. 44. The plurality of picture coded data 1212*a* to 1212*j* is coded data obtained by coding the pictures 1200*a* to 1200*j*, respectively. Furthermore, the picture coded data 1212*a* to 1212*j* are arranged in the stream 1102 in an order to correspond to the pictures 1200*a* to 1200*j*. When the plurality of picture coded data 1212*a* to 1212*j* is not particularly distinguished from one another, they are denoted as picture coded data 1212.

The picture coded data 1212 includes a plurality of slice coded data 1213. The plurality of slice coded data 1213 is coded data obtained by coding one of the I-slice 1201 and the P slice 1202. In other words, the picture coded data 1212 includes slice coded data 1213 obtained by coding the I-slice 1201, and slice coded data 1213 obtained by coding the P slice 1202.

Furthermore, the slice coded data 1213 obtained by coding the I-slice 1201 is moved one by one from the top to the bottom each in the picture coded data 1212. Furthermore, the slice coded data 1213 is arranged so as to be repeatedly moved from the top to the bottom each in the picture coded data 1212 for each of the GOPs.

Furthermore, the common data 1211 and an identifier (not illustrated) indicating the start of the GOP are arranged at the head of each of the GOPs. In other words, the common data 1211 and the identifier are arranged immediately prior to the picture coded data 1212*a* in which the slice coded data 1213 obtained by coding the I-slice 1201 is at the head of the picture coded data 1212.

The common data 1211 is data obtained by coding data to be used in common by a picture decoding apparatus for decoding pictures included in a GOP. More specifically, the data to be used in common includes a picture size of a picture, information of a reference picture, and a quantization matrix. Here, the information of a reference picture includes information indicating a range of a picture that can be referred to by each picture (how many previous pictures can be referred to and which picture can be referred to). The common data 1211 may be data to be used in common for decoding pictures included in the stream 1102.

Furthermore, until obtaining the common data 1211, the picture decoding apparatus cannot accurately decode the pictures 1200. In other words, in the case of the halfway reproduction and/or others, the picture decoding apparatus can display the decoded pictures only when pictures arranged subsequent to the common data 1211 are accurately decoded. In other words, the picture decoding apparatus can decode pictures per GOP in the case of the halfway reproduction and/or others.

Unlike MPEG-2, the picture 1200*a* at the head of the GOP includes the P slice 1202 according to Embodiment 9 in the present invention. Thus, the P slice 1202 in which inter picture coding is performed cannot be accurately decoded when it is included in the picture 1200*a* at the head of the GOP. On the other hand, the I-slice 1201 can be accurately decoded. Thus, the P slice 1202 that refers to the accurately decoded I-slice 1201 and that is included in the subsequent pictures can be accurately decoded.

Figure 45:
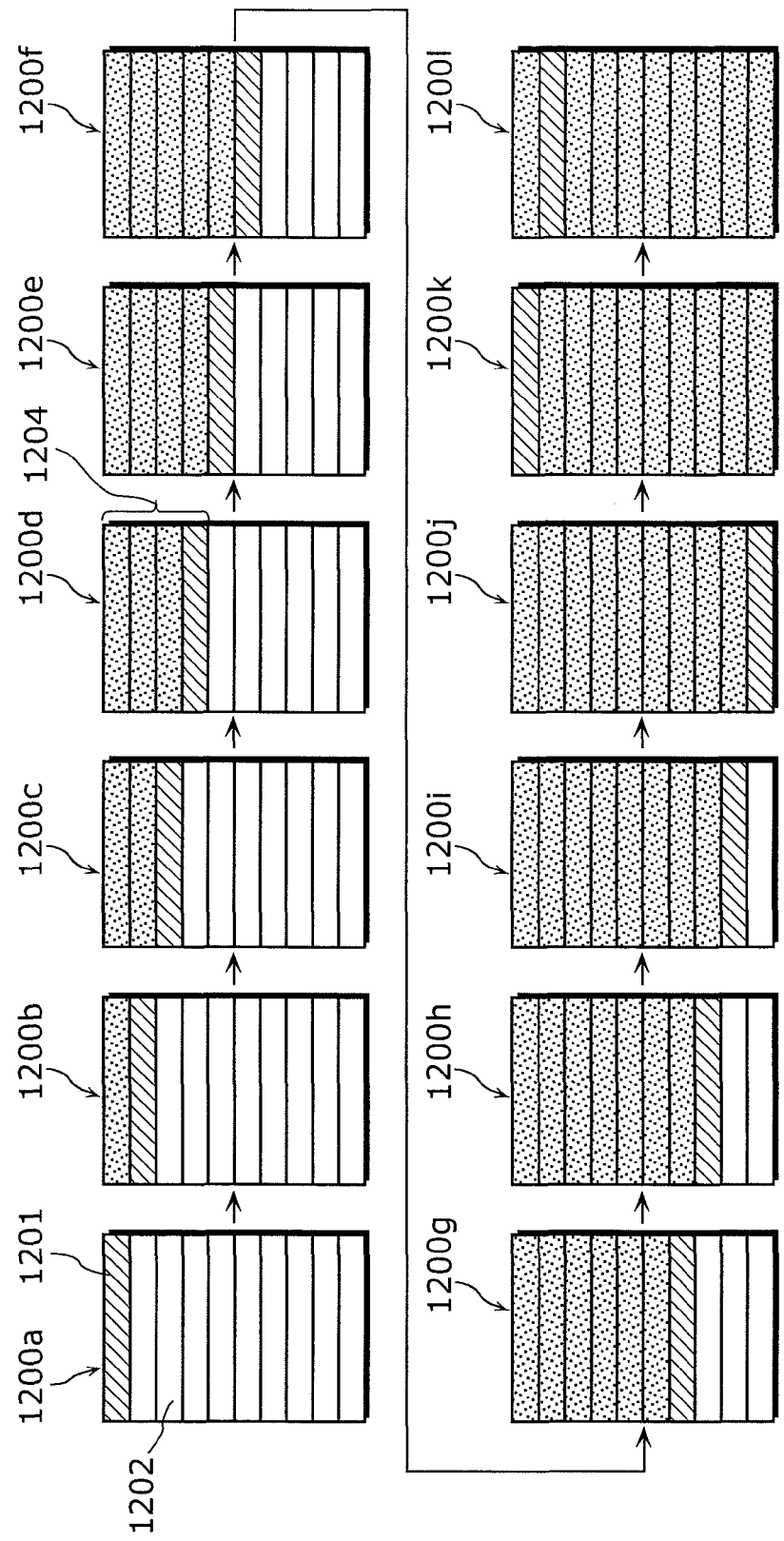
FIG. 45 illustrates slices that can be accurately decoded from the top of the GOP when each picture is divided into slices according to Embodiment 9 in the present invention.

FIG. 45 illustrates slices that can be accurately decoded from the top of the GOP in slice division according to Embodiment 9 in the present invention. As illustrated in FIG. 45, although one or more slices 1204 that can be accurately decoded is limited to the first one slice (I-slice 1201) in the starting picture 1200*a* in the GOP, the number of the slices 1204 increases as proceeds to the subsequent pictures 1200. Thereby, the slices in the lower position can be accurately decoded gradually. Furthermore, all slices in the last picture 1200*j* in the GOP can be accurately decoded.

Accurate decoding is ensured only when the range referred to (using the correlation between pixels) by the P slice 1202 is limited to slices above (heading) the I-slice 1201 or the I-slice 1201 in each of the pictures 1200. Thus, when the P slice 1202 is coded, the inter-slice coding in which pixels of slices above (heading) the I-slice 1201 are referred to or the intra-slice coding in which pixels of the I-slice 1201 are referred to is desirably performed. However, without such a limitation, in many cases, what is generally referred to is a slice in the same position as the slice in a temporally close (for example, immediately previous) picture. Thus, the probability that the previously occurring error is continued to pictures subsequent to a picture in which a slice including a pixel at the same position as the pixel where the picture quality deteriorates is an I-slice is largely reduced.

Thus, when decoding the stream 1102, the picture decoding apparatus can accurately decode and display pictures from the top gradually.

Figure 46:
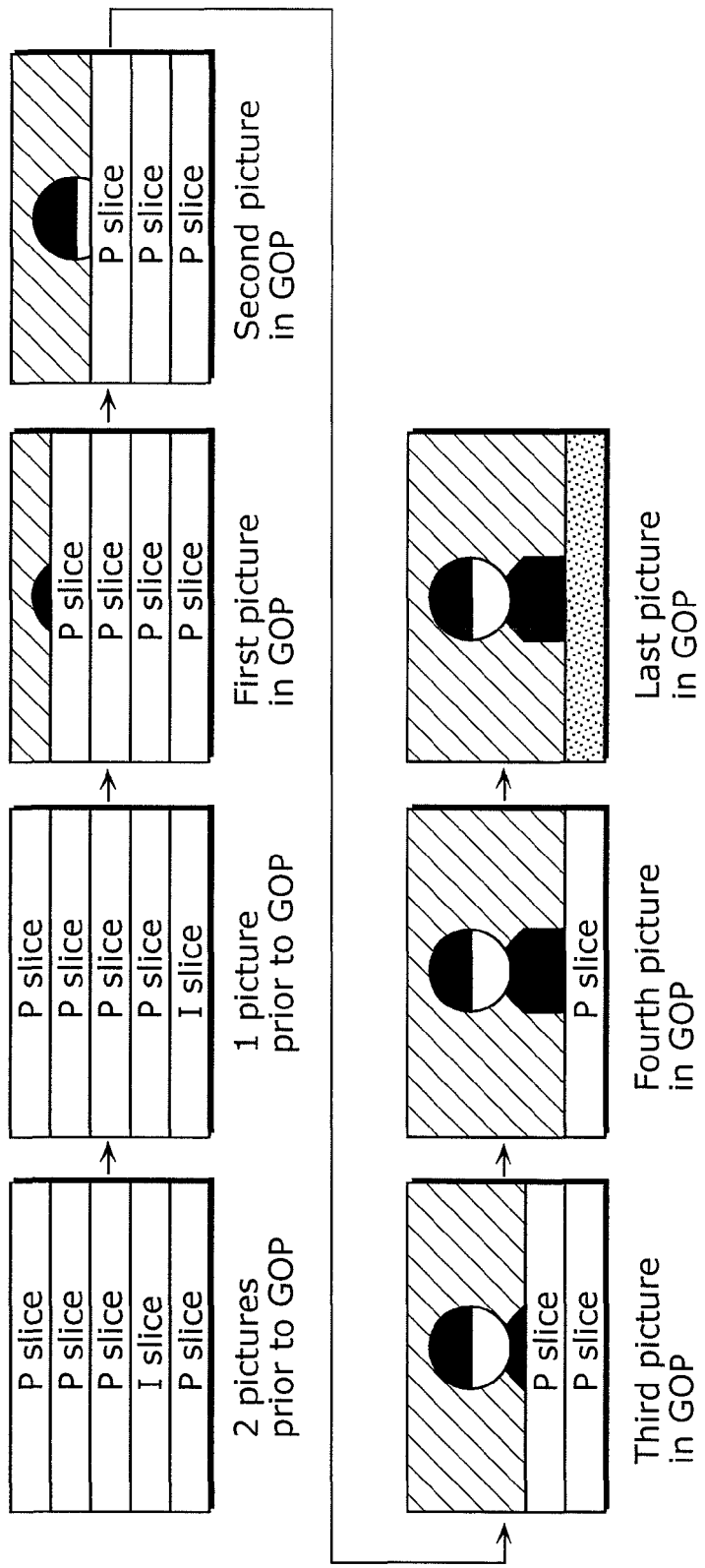
FIG. 46 illustrates a display example when a stream is coded according to Embodiment 9 in the present invention.

FIG. 46 illustrates an example of displaying the stream 1102 by a picture decoding apparatus.

An area in which an image is displayed gradually increases from the top to the bottom of the pictures 1200 as illustrated in FIG. 46. Since the display method is the same as scrolling a screen, and similar to the display method seen often on a daily basis, the viewer hardly feels it unconformable. Thus, the picture coding apparatus 1100 according to an implementation of the present invention can generate the stream 1102 of moving pictures that can be displayed by a picture decoding apparatus as moving pictures that the viewer hardly feel unconformable, during the halfway reproduction in which GOPs subsequent to a GOP indicated as the head of the halfway decoding are successively decoded.

Here, when the picture decoding apparatus randomly decodes pictures per GOP, since it cannot accurately decode all of the pictures to the last picture 1200*j* in the GOP, the present invention is not necessarily suitable for such a random access. However, as described above, with the present invention, all of the slices in the GOP can be accurately decoded from and subsequent to the picture 1200*k* when the halfway reproduction is performed, and the uncomfortable feeling of the viewer when the halfway reproduction is started can be reduced. Furthermore, when a part of a stream is lost during the network transmission, GOPs are successively decoded. In other words, the present invention has an advantage that the picture decoding apparatus can accurately decode all of slices included in pictures from the second GOP, even when a part of a stream is lost.

Furthermore, there is another advantage of starting the position of the I-slice 1201 from the top of the pictures 1200.

Figure 47:
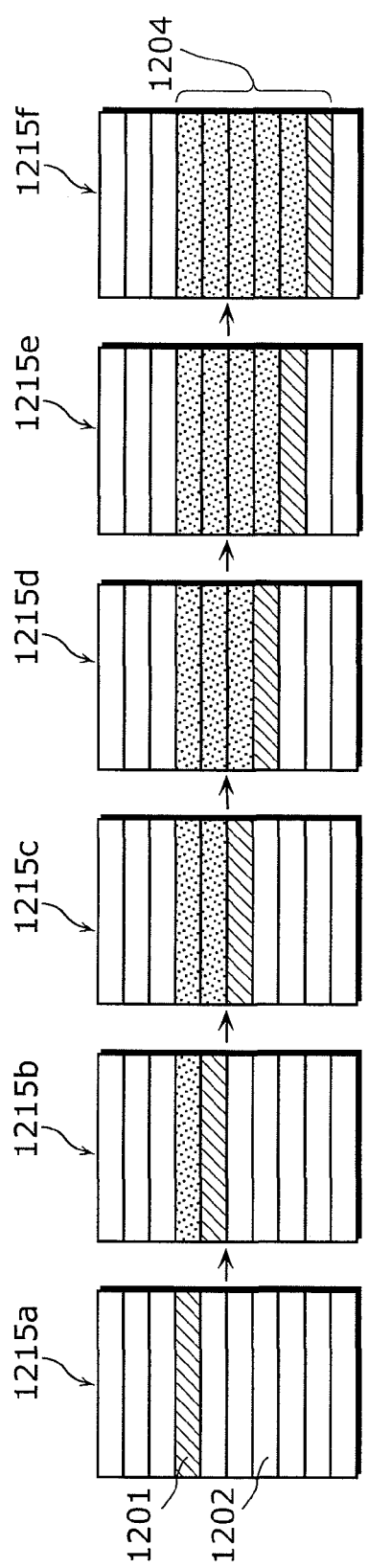
FIG. 47 illustrates slices that can be accurately decoded, when a GOP starts from a picture in which an I-slice is not at the top.

FIG. 47 is a drawing for comparison, and illustrates slices that can be accurately decoded, when a GOP starts from a picture in which the I-slice 1201 is at the third slice with respect to the first slice. Pictures 1215*a* to 1215*f* are pictures consecutive in alphabetical order, and the picture 1215*a* is a starting picture of the GOP.

FIGS. 48A to 48D illustrate a relationship between a reference picture and a current picture according to Embodiment 9 in the present invention. FIGS. 48A and 48B illustrate an example when the I-slice 1201 is in an upper portion of the starting picture of the GOP as the present invention, whereas FIGS. 48C and 48D illustrate an example when the I-slice 1201 is at the third slice with respect to the first slice of the starting picture of the GOP.

In order to accurately decode the P slice 1202, the prerequisite is: (i) coding a reference picture with reference to the I-slice 1201 that has been accurately decoded or with reference to the P slice 1202 that can be accurately decoded, or (ii) coding the reference picture with reference to pixels in a slice. When the pictures 1200 are decoded with reference to pixels of slices, as illustrated in FIG. 45 according to an implementation of the present invention, all of the slices above the I-slice 1201 can be accurately decoded in a corresponding one of the pictures 1200 to be processed. When a slice of a reference picture that can be referred to by the P slice 1202 in the current picture is determined according to a simple rule of "coding only with reference to pixels of a slice above the I-slice 1201 in the current picture" as illustrated in FIGS. 48A and 48B, the coding apparatus can be easily implemented.

In contrast, when the I-slice 1201 is at the fourth slice in the starting picture of the GOP, the slices above the third slice are not accurately decoded as illustrated in FIG. 47. Thus, as illustrated in FIGS. 48C and 48D, since the rule is added with additional conditions that the P slice 1202 in the current picture can refer to a slice in the reference picture whose slice position corresponds to a slice "(i) above the I-slice 1201 in the current picture and (ii) under the fourth slice from the top of the current picture", the implementation of the coding apparatus becomes complex.

For example, only a rule of "coding with reference to only pixels of a slice in the reference picture whose slice position corresponds to a slice above the I-slice 1201 in the current picture" is applied to P slices 1202*a* and 1202*b* in FIGS. 48A and 48B, respectively according to an implementation of the present invention, thus allowing for determination of a slice that can be referred to.

Furthermore, the rule of "coding with reference to only pixels of a slice above the I-slice 1201 in the current picture" is also applied to a P slice 1202*d* in FIG. 48D, thus allowing for determination that a slice in the same slice position as the P slice 1202*d* and slices immediately prior to or subsequent to the P slice 1202*d* as a slice can be referred to. However, since another rule of "coding with reference to only pixels of the fourth slice or pixels of slices under the fourth slice from the top of the current picture" is necessary for the P slice 1202*c* in FIG. 48C to determine a slice that can be referred to.

As described above, a picture to be referred to by a P slice can be easily controlled by arranging the I-slice 1201 at the top of the starting picture of a GOP according to an implementation of the present invention.

Furthermore, the P slice 1202 is coded per block under the control, using a correlation between pixels within the P slice 1202, a correlation between a pixel of the P slice 1202 and a pixel of the I-slice 1201 or a pixel of one of slices between the I-slice 1201 and the top of the reference picture, or a correlation between a pixel of the P slice 1202 and a pixel of the I-slice 1201 or a pixel of one of slices between the I-slice 1201 and the top of an other reference picture.

Next, a procedure of operations of the picture coding apparatus 1100 will be described.

FIG. 49 shows a flowchart of the slice coding operations by the picture coding apparatus 1100.

First, the intra/inter determining unit 1104 divides a picture to be coded into slices (S1101). Next, the intra/inter determining unit 1104 determines whether a slice to be coded is the I-slice 1201 or the P slice 1202 (S1102).

When the slice to be coded is the I-slice 1201 (Yes in S1102), the common data generation determining unit 1106 determines whether or not the I-slice 1201 to be coded is the first slice in a picture (S1103).

When the I-slice 1201 to be coded is the first slice in the picture (Yes in S1103), the common data generation determining unit 1107 generates the common data 1211 by coding the common data referred to by pictures (S1104). Furthermore, the slice coding unit 1105 codes the I-slice 1201 to be coded to generate slice coded data (S1105).

In contrast, when the slice to be coded is not the I-slice 1201 (in the case of the P slice 1202, that is, No in S1102) and when the I-slice 1201 to be coded is not the first slice in the picture (No in S1103), the common data generating unit 1107 does not generate the common data 1211. Furthermore, the slice coding unit 1105 codes the slice to be coded to generate the slice coded data (S1105).

When the common data generating unit 1107 generates the common data 1211 (S1104), the stream generating unit 1108 provides the stream 1102 in which the slice coded data obtained by the slice coding unit 1105 is arranged subsequent to the common data 1211. Furthermore, when the common data generating unit 1107 does not generate the common data 1211, the stream generating unit 1108 provides the stream 1102 including only slice coded data obtained by the slice coding unit 1105 (S1106).

As described above, the picture coding apparatus 1100 according to Embodiment 9 in the present invention generates the stream 1102 in which the common data 1211 is arranged immediately prior to a picture including the I-slice 1201 at the top. Thus, when the picture decoding apparatus performs the halfway reproduction, the area to be accurately displayed increases from the top to the bottom of the pictures. Since the display method is the same as scrolling a screen, and similar to the display method seen often on a daily basis, the viewer hardly feels it unconformable. Thus, with the picture coding method according to an implementation of the present invention, the stream 1102 that is displayed as moving pictures that the viewer hardly feel unconformable can be generated during the halfway reproduction.

Embodiment 10

Embodiment 10 in the present invention describes a variation of slice division.

Figure 50:
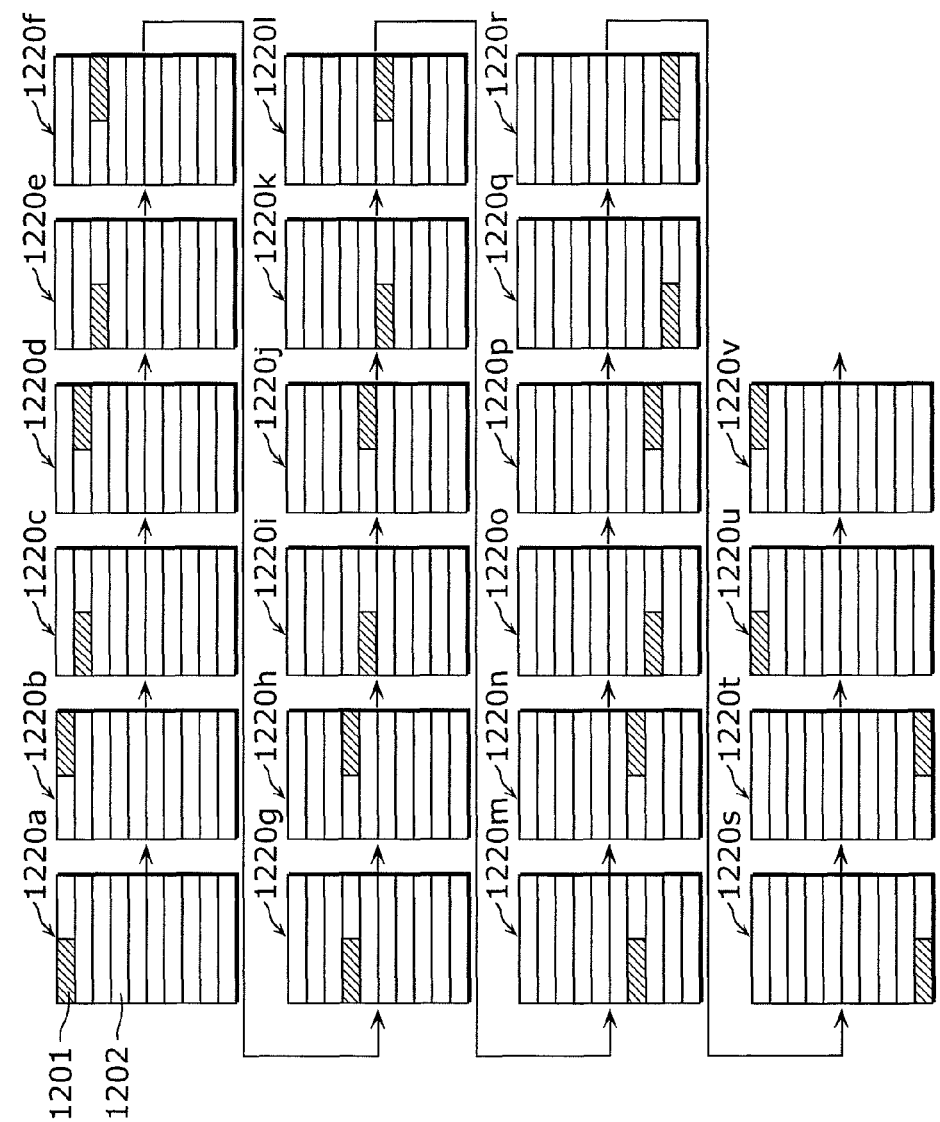
FIG. 50 illustrates an example of divided slices in each of pictures according to Embodiment 10 in the present invention.

FIG. 50 illustrates an example of divided slices in each of pictures according to Embodiment 10 in the present invention. Embodiment 9 shows an example of dividing each picture into slices per row as illustrated in FIG. 43. In Embodiment 10, slices are divided in the middle of the rows as illustrated in FIG. 50. In this case, a picture 1220*a* in which the first slice (upper left) is an I-slice 1201 is also a starting picture of a GOP as that of Embodiment 9.

Pictures 1220*a* to 1200*v* in FIG. 50 are pictures consecutive in alphabetical order. Furthermore, the pictures 1220*a* to 1220*t* compose one GOP, and pictures starting from the picture 1220*u* compose another GOP. In other words, the I-slice 1201 is moved one by one from upper left to lower right for each of the pictures 1200. Furthermore, the moving is repeated per GOP.

Figure 51:
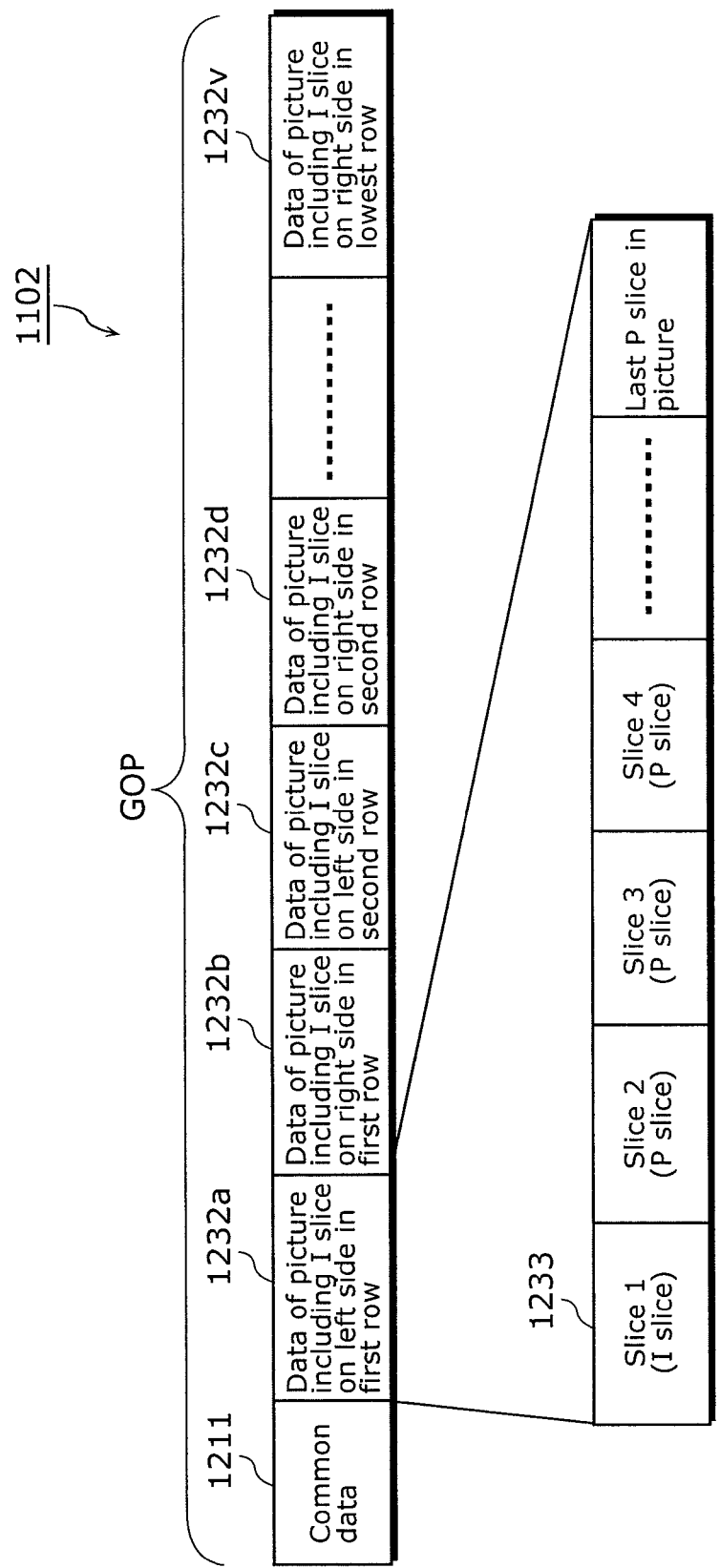
FIG. 51 illustrates a stream structure according to Embodiment 10 in the present invention.

FIG. 51 illustrates a structure of a stream 1102 according to Embodiment 10 in the present invention. Furthermore, FIG. 51 illustrates a structure of the coded stream 1102 obtained by coding the pictures in FIG. 50.

As illustrated in FIG. 51, the stream 1102 includes common data 1211 and a plurality of picture coded data 1232*a* to 1232*v*. The plurality of picture coded data 1232*a* to 1232*v* are obtained by coding the pictures 1220*a* to 1220*v*, respectively. Furthermore, the picture coded data 1232*a* to 1232*v* are arranged in the stream 1102 in an order to correspond to the pictures 1220*a* to 1220*v*.

The picture coded data 1232*a* to 1232*v* respectively include a plurality of slice coded data 1233 obtained by coding slices. The plurality of slice coded data 1233 is coded data obtained by coding one of the I-slice 1201 and the P slice 1202.

Furthermore, the common data 1211 and an identifier (not illustrated) indicating the start of the GOP are arranged at the head of each of the GOPs as Embodiment 9.

The described configuration can also obtain the same advantages as those of Embodiment 9.

Although the example of dividing 1 row into 2 slices is described herein, 1 row may be divided into at least 3 slices. Furthermore, the division of slices may be performed on any unit basis. For example, 2 rows may be divided into 3 slices.

Furthermore, I picture may be divided into slices composed of rows, and the first slice in the starting picture of a GOP may be defined as the I-slice 1201.

Furthermore, the unit of division may differ for each of the pictures. However, a coding rate varies when the size of the I-slice 1201 differs for each of the pictures.

Embodiment 11

Embodiment 11 in the present invention describes a variation of slice division.

Figure 52:
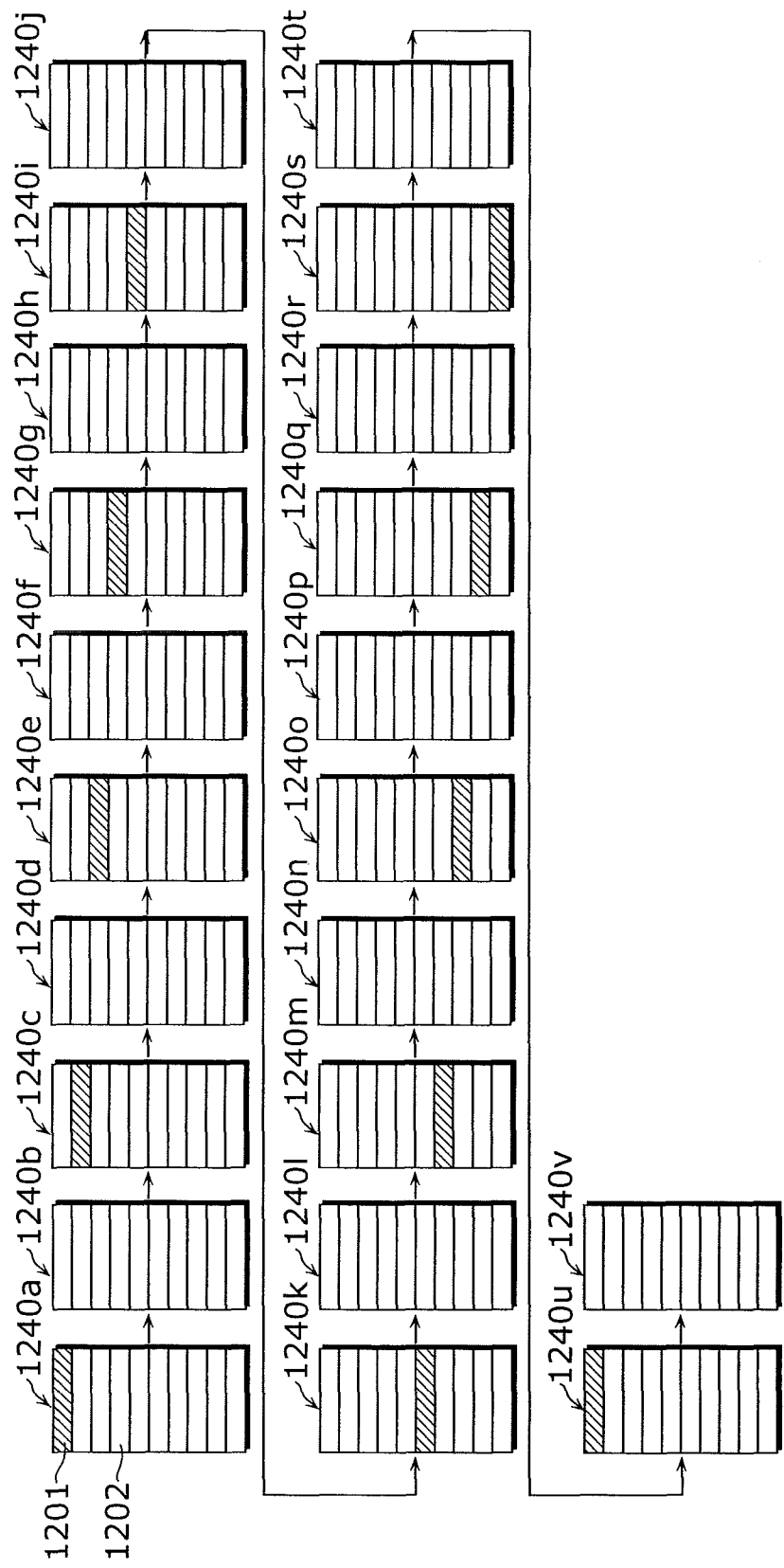
FIG. 52 illustrates an example of divided slices in each of pictures according to Embodiment 11 in the present invention.

FIG. 52 illustrates an example of divided slices in each of pictures according to Embodiment 11 in the present invention. Embodiment 9 describes the example in which each of the pictures 1200 includes the I-slice 1201 as illustrated in FIG. 43. In Embodiment 11, a GOP includes a picture excluding the I-slice 1201 as illustrated in FIG. 52. In this case, the starting picture of the GOP is a picture starting from the I-slice 1201 as that of Embodiment 9.

Pictures 1240*a* to 1240*v* in FIG. 52 are pictures consecutive in alphabetical order. Furthermore, the pictures 1240*a* to 1240*t* compose one GOP, and pictures starting from the picture 1240*u* compose another GOP.

As illustrated in FIG. 52, a picture including the I-slice 1201 and a picture excluding the I-slice 1201 (only including the P slices 1202) are alternatively arranged in the consecutive pictures. Furthermore, the I-slice 1201 is moved one by one from the top to the bottom in the pictures including the I-slices 1201. Furthermore, the moving is repeated per GOP.

Figure 53:
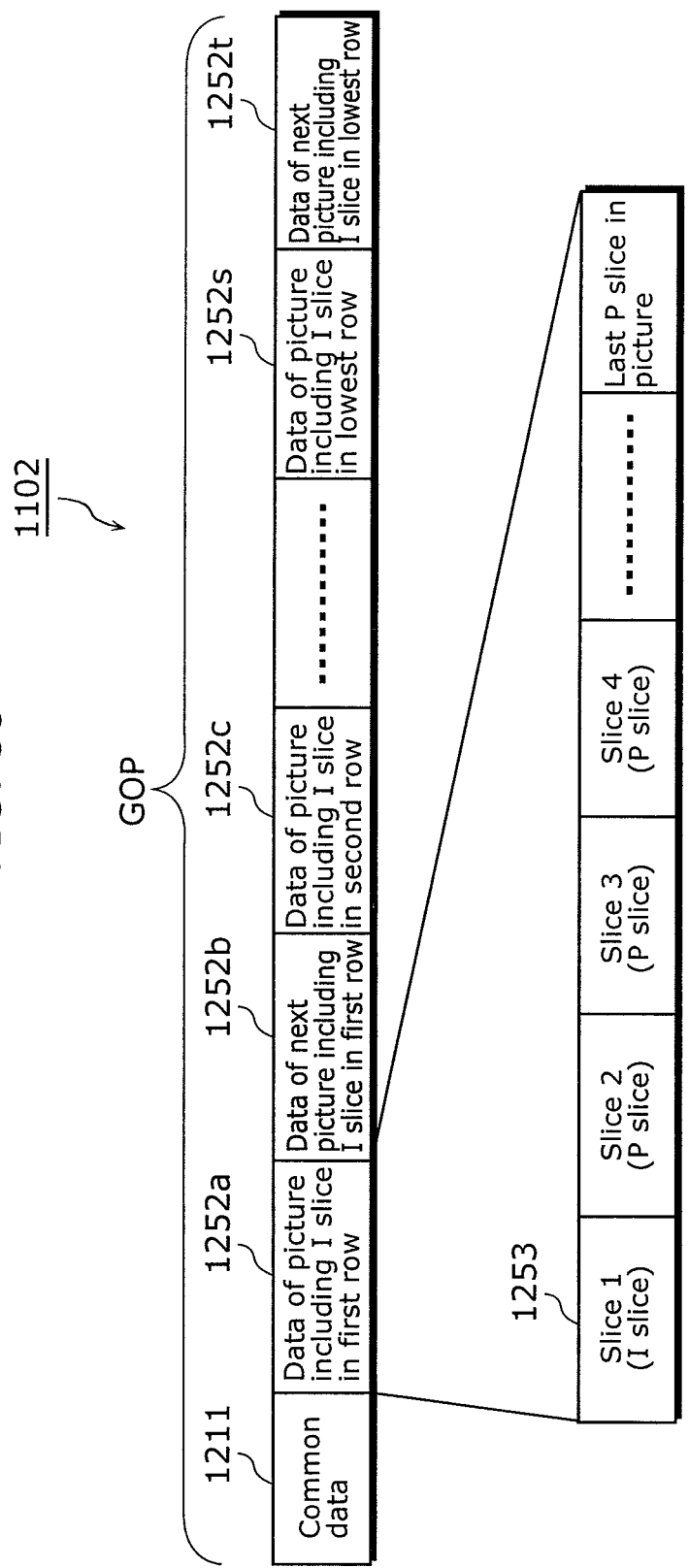
FIG. 53 illustrates a stream structure according to Embodiment 11 in the present invention.

FIG. 53 illustrates a structure of a stream 1102 according to Embodiment 11 in the present invention. Furthermore, FIG. 53 illustrates a structure of coded stream 1102 obtained by coding the pictures in FIG. 52.

As illustrated in FIG. 53, the stream 1102 includes the common data 1211 and a plurality of picture coded data 1252*a* to 1252*t*. The picture coded data 1252*a* to 1252*t* are obtained by coding the pictures 1240*a* to 1240*t*, respectively. Furthermore, the picture coded data 1252*a* to 1252*v* are arranged in the stream 1102 in an order to correspond to the pictures 1240*a* to 1240*v*.

The plurality of picture coded data 1252*a* to 1252*t* respectively includes a plurality of slice coded data 1253 obtained by coding slices. The plurality of slice coded data 1253 is coded data obtained by coding one of the I-slice 1201 and the P slice 1202.

Furthermore, the common data 1211 and an identifier (not illustrated) indicating the start of the GOP are arranged at the head of each of the GOPs as Embodiment 9.

The described configuration can also obtain the same advantages as those of Embodiment 9.

Although the example in which the picture including the I-slice 1201 and the picture excluding the I-slice 1201 are alternatively arranged is described herein, but is not limited to such an example, the same advantages as those of Embodiment 9 can be obtained even when each of the GOPs includes at least one picture excluding the I-slice 1201.

Embodiment 12

Embodiment 12 in the present invention describes a variation of slice division.

Embodiment 9 describes the example in which each of the pictures 1200 includes the I-slice 1201 as illustrated in FIG. 43. Embodiment 12 describes an example in which each of the pictures 1200 includes the two I-slices 1201. In this case, the starting picture of the GOP is a picture starting from the two I-slices 1201 as that of Embodiment 9.

Figure 54:
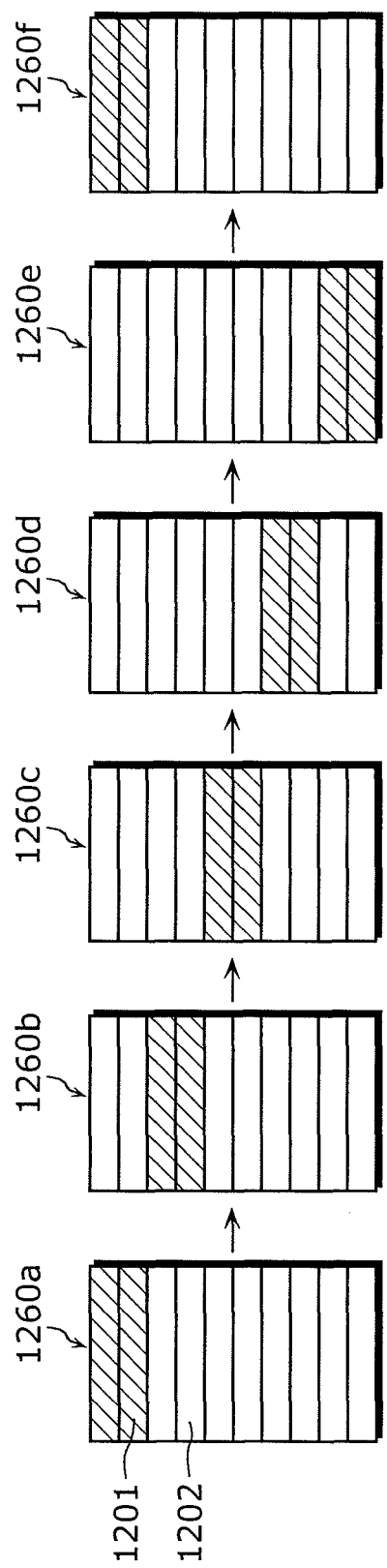
FIG. 54 illustrates an example of divided slices in each of pictures according to Embodiment 12 in the present invention.

FIG. 54 illustrates an example of divided slices in each of pictures according to Embodiment 12 in the present invention.

Pictures 1260a to 1260f in FIG. 54 are pictures consecutive in alphabetical order. Furthermore, the pictures 1260a to 1260e compose one GOP, and pictures starting from the picture 1260f compose another GOP. Furthermore, each of the pictures 1260a to 1260e includes the two I-slices 1201 that are consecutive as illustrated in FIG. 54. Furthermore, the two consecutive I-slices 1201 are successively moved from the top to the bottom in the pictures. Furthermore, the moving is repeated per GOP.

The described structure illustrated in FIG. 54 can also obtain the same advantages as those of Embodiment 9.

The structure of a stream 1102 according to Embodiment 12 in the present invention is the same as that of the stream 1102 according to Embodiment 9. More specifically, the stream 1102 includes the common data 1211 and a plurality of picture coded data obtained by coding the pictures 1260a to 1260e. Furthermore, the common data 1211 and an identifier (not illustrated) indicating the start of the GOP are arranged at the head of each of the GOPs as Embodiment 9.

Furthermore, although described herein is the example in which the I-slices 1201 are consecutively arranged, each of the pictures may include a plurality of the I-slices 1201 that are not consecutive.

Figure 55:
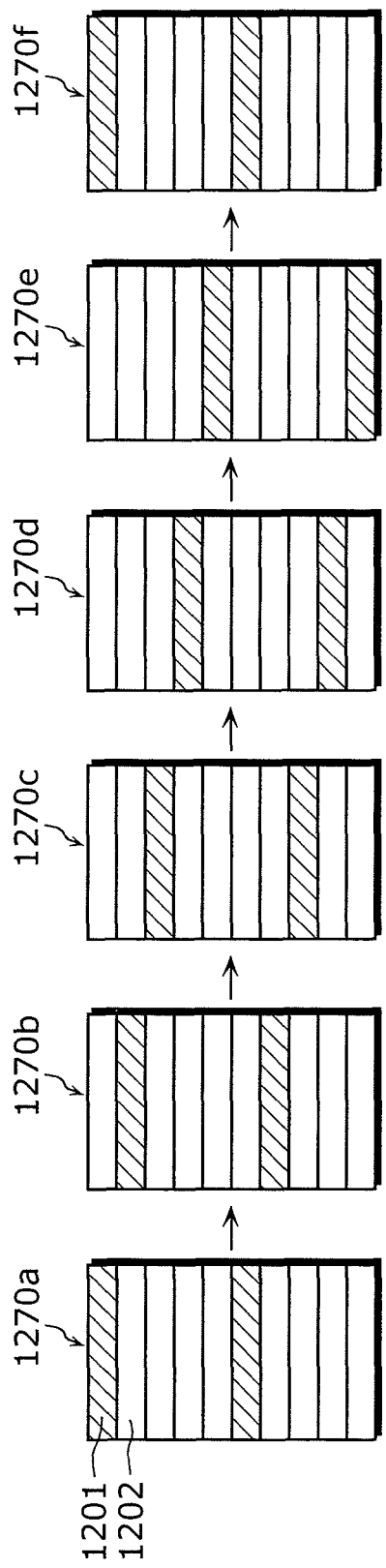
FIG. 55 illustrates an example of divided slices in each of pictures according to Embodiment 12 in the present invention.

FIG. 55 illustrates an example of divided slices in each of pictures according to Embodiment 12 in the present invention.

Pictures 1270a to 1270f in FIG. 55 are pictures consecutive in alphabetical order. Furthermore, the pictures 1270a to 1270e compose one GOP, and pictures starting from the picture 1270f compose another GOP.

Furthermore, each of the pictures 1270a to 1270e includes the two I-slices 1201 as illustrated in FIG. 55. The two I-slices 1201 are arranged to sandwich one or more of the P slices 1202. For example, the four P slices 1202 are arranged between the two I-slices 1201.

The described structure illustrated in FIG. 55 can also obtain the same advantages as those of Embodiment 9.

Here, each of the pictures may include two or more of the I-slices 1201.

Embodiment 13

Embodiment 13 in the present invention describes a variation of slice division.

Figure 56:
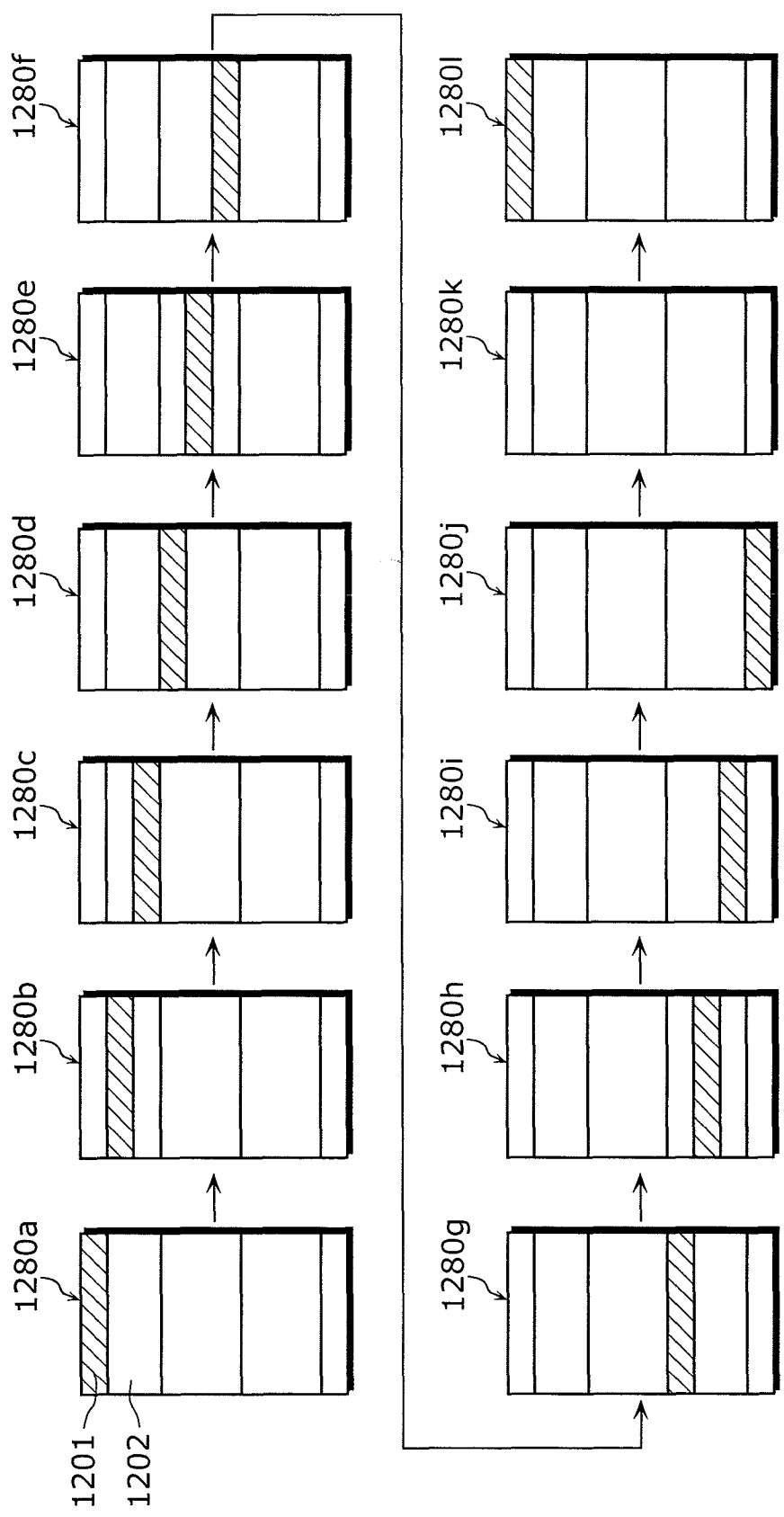
FIG. 56 illustrates an example of divided slices in each of pictures according to Embodiment 13 in the present invention.

FIG. 56 illustrates an example of divided slices in each of pictures according to Embodiment 13 in the present invention. Embodiment 9 describes the example in which the size of the I-slice 1201 (the number of blocks included) is the same as that of the P slice 1202 in each of the pictures 1200 as illustrated in FIG. 43. In Embodiment 13, the P slice 1202 is larger than the I-slice 1201 as illustrated in FIG. 56. In this case, the starting picture of the GOP is a picture starting from the I-slice 1201 as that of Embodiment 9.

The pictures 1280a to 1280l in FIG. 56 are pictures consecutive in alphabetical order. Furthermore, the pictures 1280a to 1280k compose one GOP, and pictures starting from the picture 1280l compose another GOP.

In other words, the I-slice 1201 is moved one by one from the top to the bottom for each of the pictures. Furthermore, the moving is repeated per GOP.

The described structure illustrated in FIG. 56 can also obtain the same advantages as those of Embodiment 9.

Furthermore, each of the pictures 1280a to 1280j and 1280l includes the P slice 1202 larger than the I-slice 1201.

As such, enlarging the P slice 1202 can lead to reduction in the number of slices included in a picture. Thus, since the number of reset at the head of the slices can be reduced, the computational complexity can be reduced when pictures are coded. Furthermore, the coded amount in a slice header can be reduced, thus improving the efficiency of compression.

Here, when the I-slice 1201 is as large as the P slice 1202, the number of bits of the I-slice 1201 is larger than that of the P slice 1202. For example, the number of bits of the I-slice 1201 is twofold to 10-fold larger than that of the P slice 1202. In contrast in Embodiment 13 according to the present invention, making the P slice 1202 larger than the I-slice 1201 can reduce a difference in the number of bits between the I-slice 1201 and the P slice 1202.

Furthermore, there is a problem that the I-slices 1201 in the pictures 1200a to 1200l in FIG. 45 are not at regular intervals. More specifically, a plurality of the P slices 1202 including blocks corresponding to I picture are arranged between the I-slice 1201 in the picture 1200a and the I-slice 1201 in the picture 1200b. However, the I-slice 1201 in the picture 1200j and the I-slice 1201 in the picture 1200k are consecutively arranged. In other words, the average number of bits for a short period of time does not become constant.

Here, when pictures are coded, the number of bits obtained by coding a slice to be coded is estimated based on the generated number of bits of a slice immediately prior to the slice to be coded. When the average number of bits for a short period of time does not become constant as described above, there is a problem that the estimation of the number of bits becomes difficult.

In contrast, the picture 1280k at the end of the GOP does not include the I-slice 1201 according to Embodiment 13 in the present invention. Thus, the number of bits of a series of the P slices 1202 between the I-slice 1201 in the picture 1280j and the subsequent I-slice 1201 in the picture 1280l can be made constant. Thus, the number of bits when pictures are coded can be estimated easily.

The structure of the stream 1102 according to Embodiment 13 in the present invention is the same as that of the stream 1102 according to Embodiment 9. More specifically, the stream 1102 includes the common data 1211 and a plurality of coded data obtained by coding the pictures 1280a to 1280l. Furthermore, the common data 1211 and an identifier (not illustrated) indicating the start of the GOP are arranged at the head of each of the GOPs as Embodiment 9.

Although the example of moving the I-slice 1201 from the top (upper left) to the bottom (lower right) of each of the pictures per GOP according to Embodiments 10 to 13 is described, the moving may be from the bottom (lower right) to the top (upper left). In other words, the I-slice 1201 may be moved from an edge in a picture to a edge in another picture per GOP.

Furthermore, the stream generating unit 1108 does not always need to arrange the common data 1211 immediately prior to a picture where the I-slice 1201 is at the top (edge), in the stream 1102. In other words, pictures including the aforementioned GOPs may compose one GOP. Putting it another way, the I-slice 1201 may be repeatedly moved from an edge in a picture to another edge in a picture, within a GOP.

Furthermore, although the variations of slice division are separately described in Embodiments 10 to 13, the variations of Embodiments 10 to 13 may be combined together.

Embodiment 14

Furthermore, Embodiment 14 in the present invention describes an example of executing the processing described in Embodiments 1 to 13 in an independent computer system by recoding a program for implementing the picture coding apparatus described in Embodiments 1 to 13 on a recording medium such as a flexible disk.

Figure 57A:
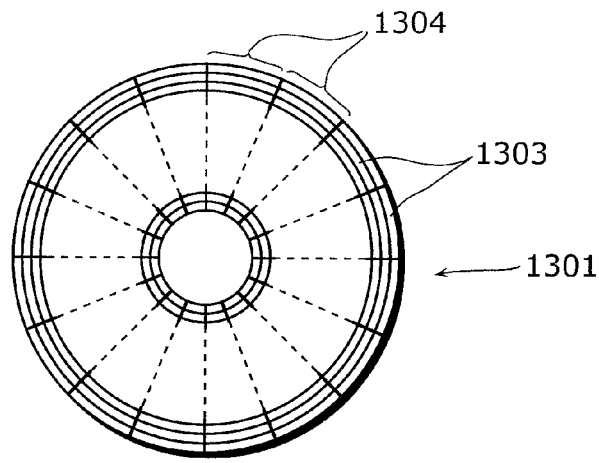
FIG. 57A illustrates a structure of a recording medium according to Embodiment 14 in the present invention.
Figure 57B:
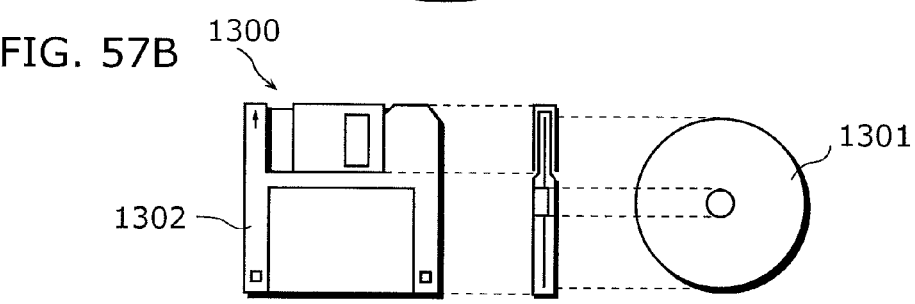
FIG. 57B illustrates a structure of a recording medium according to Embodiment 14 in the present invention.
Figure 57C:
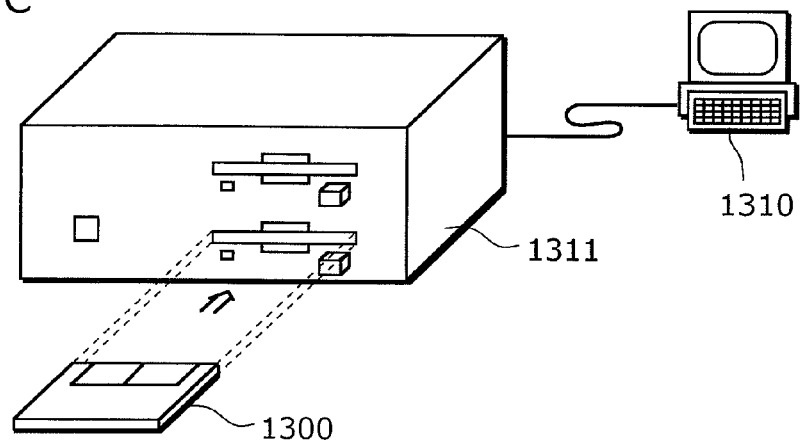
FIG. 57C illustrates a configuration of a computer system according to Embodiment 14 in the present invention.

FIGS. 57A to 57C show a case where the picture coding apparatus in each of Embodiments is implemented on a computer system using the program recorded on a recording medium such as a flexible disk.

FIG. 57A illustrates an example of a physical format of a flexible disk that is a recording medium body. FIG. 57B illustrates an external front view and a cross-sectional view of a flexible disk 1300, and a disk 1301.

The flexible disk 1300 includes a case 1302, and the disk 1301 included in the case 1302. The disk 1301 has a surface where tracks 1303 are formed concentrically from the outermost circumference toward the innermost circumference. Each of the tracks 1303 is divided into 16 sectors 1304 in an angular direction. Thus, the program is recorded on one of the sectors assigned to the disk 1301.

Furthermore, FIG. 57C illustrates a configuration of a computer system 1310 for recording the program on the flexible disk 1300 and reading and reproducing the program from the flexible disk 1300. For example, when the program for implementing the picture coding apparatus 1000 is recorded on the flexible disk 1300, the program is written to the flexible disk 1300 via a flexible disk drive 1311.

When functions of the picture coding apparatus 1000 are constructed in the computer system 1310 by causing a computer to execute the program in the flexible disk 1300, the program is read from the flexible disk 1300 using the flexible disk drive 1311, and is transferred to the computer system 1310. The computer system 1310 implements the functions of the picture coding apparatus 1000 by causing a computer to execute the transferred program.

Although the flexible disk 1300 is used as an example of a recording medium in the description, an optical disk may be used instead. Furthermore, the recording medium is not limited to such. As long as the program is recorded, any recording medium may be used, such as an IC card and a ROM cassette. Furthermore, not only a recording medium that can be attached to and removed from the computer system 1310, the computer system 1310 may execute a program recoded on a hard disk drive (HDD), a non-volatile memory, a RAM, and a ROM. Furthermore, the computer system 1310 may execute a program obtained via a wired or wireless communication network.

Furthermore, the computer system 1310 can implement the picture coding apparatus described in Embodiments 1 to 13.

Each of the functional blocks included in the picture coding apparatus 1000 in FIG. 41 may be implemented as an integrated circuit or a Large Scale Integrated (LSI) circuit. The LSIs may be separately made into one chip, or each LSI may be partly or entirely made into one chip. For example, the functional blocks other than a memory may be made into one chip. The name used here is LSI, but it may also be called IC, system LSI, super LSI, or ultra LSI depending on the degree of integration.

Moreover, ways to achieve integration are not limited to the LSI, and a special circuit or a general purpose processor may also achieve the integration. Field Programmable Gate Array (FPGA) that can be programmed after manufacturing an LSI or a reconfigurable processor that allows re-configuration of the connection or configuration of an LSI can be used for the same purpose.

Furthermore, in the future, with advancement in semiconductor technology, a brand-new technology may replace LSI. The functional blocks can be integrated using such a technology. The possibility is that the present invention is applied to biotechnology.

Furthermore, out of the functional blocks, only a means for storing data to be coded may be separately configured without making it into one chip.

Although the picture coding method and the picture coding apparatus according to an implementation of the present invention are described based on Embodiments, the present invention is not limited to Embodiments. Without departing from the scope of the present invention, the present invention includes an embodiment with some modifications on Embodiments that are conceived by a person skilled in the art, and another embodiment obtained through combinations of the constituent elements of different Embodiments in the present invention.

INDUSTRIAL APPLICABILITY

The present invention is applicable to a moving picture decoding apparatus, in particular, to a communication device or an equipment set for bi-directionally communicating moving pictures using a network, distributing the moving pictures, and coding the moving pictures, such as a monitoring camera.

The invention claimed is:
1. A picture coding apparatus that divides a picture signal into slices each including blocks, and codes, per block, each of the slices, said picture coding apparatus comprising:
   a dividing unit configured to divide a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and
   a coding unit configured to code each of the slices per block so as to code pictures that are temporally consecutive, each of the pictures being the picture,
   wherein said dividing unit is configured (i) to change a position of the I-slice in each of the temporally consecutive pictures so that positions of I-slices each of which is the I-slice circulate in a to-be-determined number of pictures among the temporally consecutive pictures, and (ii) to divide each of the temporally consecutive pictures so that a sum of the number of blocks included in the I-slice and the number of blocks included in one or more P slices that are all of P slices between the I-slice and an I-slice subsequent to the I-slice becomes a predetermined value, each of the one or more P slices being the P slice,
   wherein said dividing unit is configured to divide at least one of the to-be-determined number of pictures among the temporally consecutive pictures, into P slices having no I-slice,
   wherein said dividing unit is configured to divide the picture into the I-slice including M blocks, and the one or more P slices each of which includes N blocks and which exclude a P slice that is in a specific position within the picture, M being an integer value equal to or larger than zero, N being a positive integer value, and M<N,
   wherein said dividing unit is configured to divide the picture into the I-slice and the one or more P slices so that the position of the I-slice is repeatedly moved from an edge of one of the pictures to an other edge of an other one of the pictures, for each group of a predetermined number of pictures in the temporally consecutive pictures, wherein said coding unit includes:
- a coded data generating unit configured to code (i) the I-slice using a correlation between pixels in the I-slice and (ii) each of the one or more P slices using a correlation between pixels in the slices or a correlation between pixels in the different slices to generate coded data of the temporally consecutive pictures; and
- a stream generating unit configured to generate a stream including common data referred to by the temporally consecutive pictures and the coded data of the temporally consecutive pictures, and wherein said stream generating unit is configured to arrange the common data immediately prior to a part of the coded data obtained by coding one of the temporally consecutive pictures at the edge of which the I-slice is located.

2. The picture coding apparatus according to claim 1, wherein said dividing unit is configured to divide the temporally consecutive pictures so that the number of P slices between a predetermined one of the I-slices and an I-slice subsequent to the predetermined one of the I-slices becomes a predetermined value, in the temporally consecutive pictures.

3. The picture coding apparatus according to claim 1, wherein each of the temporally consecutive pictures includes at least two I-slices each of which is the I-slice, and wherein said dividing unit is configured to divide each of the temporally consecutive pictures so that the number of blocks in each of P slices between the I-slice and an I-slice subsequent to the I-slice becomes a predetermined value, in the temporally consecutive pictures, the I-slice and the subsequent I-slice being included in the at least two I-slices included in a corresponding one of the temporally consecutive pictures.

4. A picture coding method of dividing a picture signal into slices each including blocks, and coding, per block, each of the slices, said picture coding method comprising:

dividing a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and coding each of the slices per block so as to code pictures that are temporally consecutive, each of the pictures being the picture, wherein a position of the I-slice is changed in each of the temporally consecutive pictures so that positions of I-slices each of which is the I-slice circulate in a to-be-determined number of pictures among the temporally consecutive pictures, wherein each of the temporally consecutive pictures is divided so that a sum of the number of blocks included in the I-slice and the number of blocks included in one or more P slices that are all of P slices between the I-slice and an I-slice subsequent to the I-slice becomes a predetermined value, each of the one or more P slices being the P slice, wherein said dividing includes dividing at least one of the to-be-determined number of pictures among the temporally consecutive pictures into P slices having no I-slice, wherein said dividing includes dividing the picture into the I-slice including M blocks, and the one or more P slices each of which includes N blocks and which exclude a P slice that is in a specific position within the picture, M being an integer value equal to or larger than zero, N being a positive integer value, and M<N, wherein said dividing includes dividing the picture into the I-slice and the one or more P slices so that the position of the I-slice is repeatedly moved from an edge of one of the pictures to an other edge of an other one of the pictures, for each group of a predetermined number of pictures in the temporally consecutive pictures, wherein said coding includes:
coding (i) the I-slice using a correlation between pixels in the I-slice and (ii) each of the one or more P slices using a correlation between pixels in the slices or a correlation between pixels in the different slices to generate coded data of the temporally consecutive pictures; and generating a stream including common data referred to by the temporally consecutive pictures and the coded data of the temporally consecutive pictures, and wherein said generating includes arranging the common data immediately prior to a part of the coded data obtained by coding one of the temporally consecutive pictures at the edge of which the I-slice is located.

5. A non-transitory computer readable recording medium having stored therein a program for dividing a picture signal into slices each including blocks, and coding, per block, each of the slices, said program causing a computer to execute a method comprising:

dividing a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and coding each of the slices per block so as to code pictures that are temporally consecutive, each of the pictures being the picture, wherein a position of the I-slice is changed in each of the temporally consecutive pictures so that positions of I-slices each of which is the I-slice circulate in a to-be-determined number of pictures among the temporally consecutive pictures, wherein each of the temporally consecutive pictures is divided so that a sum of the number of blocks included in the I-slice and the number of blocks included in one or more P slices that are all of P slices between the I-slice and an I-slice subsequent to the I-slice becomes a predetermined value, each of the one or more P slices being the P slice, wherein said dividing includes dividing at least one of the to-be-determined number of pictures among the temporally consecutive pictures into P slices having no I-slice, wherein said dividing includes dividing the picture into the I-slice including M blocks, and the one or more P slices each of which includes N blocks and which exclude a P slice that is in a specific position within the picture, M being an integer value equal to or larger than zero, N being a positive integer value, and M<N, wherein said dividing includes dividing the picture into the I-slice and the one or more P slices so that the position of the I-slice is repeatedly moved from an edge of one of the pictures to an other edge of an other one of the pictures, for each group of a predetermined number of pictures in the temporally consecutive pictures, wherein said coding includes:
  coding (i) the I-slice using a correlation between pixels in the I-slice and (ii) each of the one or more P slices using a correlation between pixels in the slices or a correlation between pixels in the different slices to generate coded data of the temporally consecutive pictures; and
  generating a stream including common data referred to by the temporally consecutive pictures and the coded data of the temporally consecutive pictures, and
wherein said generating includes arranging the common data immediately prior to a part of the coded data obtained by coding one of the temporally consecutive pictures at the edge of which the I-slice is located.

6. An integrated circuit that divides a picture signal into slices each including blocks, and codes, per block, each of the slices, said integrated circuit comprising:
  a dividing unit configured to divide a picture into an intra- (I-) slice and an inter (P) slice, the I-slice being coded using a correlation between pixels in a slice, the P slice being coded using the correlation between pixels in the slice and a correlation between pixels in different slices, and each of the I-slice and the P slice including blocks; and
  a coding unit configured to code each of the slices per block so as to code pictures that are temporally consecutive, each of the pictures being the picture,
  wherein said dividing unit is configured (i) to change a position of the I-slice in each of the temporally consecutive pictures so that positions of I-slices each of which is the I-slice circulate in a to-be-determined number of pictures among the temporally consecutive pictures, and (ii) to divide each of the temporally consecutive pictures so that a sum of the number of blocks included in the I-slice and the number of blocks included in one or more P slices that are all of P slices between the I-slice and an I-slice subsequent to the I-slice becomes a predetermined value, each of the one or more P slices being the P slice,
  wherein said dividing unit is configured to divide at least one of the to-be-determined number of pictures among the temporally consecutive pictures, into P slices having no I-slice,
  wherein said dividing unit is configured to divide the picture into the I-slice including M blocks, and the one or more P slices each of which includes N blocks and which exclude a P slice that is in a specific position within the picture, M being an integer value equal to or larger than zero, N being a positive integer value, and M<N,
  wherein said dividing unit is configured to divide the picture into the I-slice and the one or more P slices so that the position of the I-slice is repeatedly moved from an edge of one of the pictures to an other edge of an other one of the pictures, for each group of a predetermined number of pictures in the temporally consecutive pictures,
  wherein said coding unit includes:
    a coded data generating unit configured to code (i) the I-slice using a correlation between pixels in the I-slice and (ii) each of the one or more P slices using a correlation between pixels in the slices or a correlation between pixels in the different slices to generate coded data of the temporally consecutive pictures; and
    a stream generating unit configured to generate a stream including common data referred to by the temporally consecutive pictures and the coded data of the temporally consecutive pictures, and
  wherein said stream generating unit is configured to arrange the common data immediately prior to a part of the coded data obtained by coding one of the temporally consecutive pictures at the edge of which the I-slice is located.

* * * * *